United States Patent [19]

Honda et al.

[11] Patent Number: 4,798,776

[45] Date of Patent: Jan. 17, 1989

[54] LIGHT RECEIVING MEMBERS WITH SPHERICALLY DIMPLED SUPPORT

[75] Inventors: Mitsuru Honda; Atsushi Koike, both of Chiba; Kyosuke Ogawa, Miye; Keiichi Murai, Chiba, all of Japan

[73] Assignee: Canon Kabushiki Kaisha, Tokyo, Japan

[*] Notice: The portion of the term of this patent subsequent to Mar. 22, 2005, has been disclaimed.

[21] Appl. No.: 909,892

[22] Filed: Sep. 19, 1986

[30] Foreign Application Priority Data

| Sep. 21, 1985 | [JP] | Japan | 60-209678 |
| Sep. 25, 1985 | [JP] | Japan | 60-210257 |
| Oct. 2, 1985 | [JP] | Japan | 60-219912 |
| Oct. 8, 1985 | [JP] | Japan | 60-224460 |
| Oct. 15, 1985 | [JP] | Japan | 60-227648 |
| Oct. 16, 1985 | [JP] | Japan | 60-228737 |

[51] Int. Cl.$^4$ .................. G03G 5/082; G03G 5/10; G03G 5/14
[52] U.S. Cl. .................. 430/39; 430/56; 430/65; 430/66; 430/67; 430/69; 430/84
[58] Field of Search .................. 430/56, 69, 84, 31; 427/74

[56] References Cited

U.S. PATENT DOCUMENTS

| 2,599,542 | 6/1952 | Carlson | 430/69 |
| 4,551,406 | 11/1985 | Schaedlich et al. | 430/56 X |
| 4,617,245 | 10/1986 | Tanaka et al. | 430/58 |
| 4,650,736 | 3/1987 | Saitoh et al. | 430/69 X |
| 4,732,834 | 3/1988 | Honda et al. | 430/84 |

FOREIGN PATENT DOCUMENTS

| 55-144251 | 11/1980 | Japan | 430/69 |
| 60-31144 | 2/1985 | Japan | 430/69 |
| 60-166956 | 8/1985 | Japan | 430/69 |

Primary Examiner—Roland E. Martin
Attorney, Agent, or Firm—Fitzpatrick, Cella, Harper & Scinto

[57] ABSTRACT

A light receiving member has a support and a light receiving layer. The support has an uneven-shaped surface of a plurality of spherical dimples formed by the impact of a plurality of rigid true spheres on the surface of the support. Each of the dimples has an identical radius of curvature R and an identical width D, wherein the radio D/R of the width D to the radius of curvature R is from 0.03 to 0.07. The light receiving layer is a multi-layered structure having a free surface which formed from an amorphous material containing silicon atoms as the main constituent, at least one of oxygen atoms, carbon atoms and nitrogen atoms, and at least one of hydrogen atoms and halogen atoms. The light receiving layer contains a layer region which functions as a photosensitive layer.

The light receiving member, when used with a coherent laser beam as an optical source, acts to prevent the occurrence of an interference fringe pattern during image formation. Further, the light receiving member has a high photosensitivity in the entire visible light region; is photosensitive to longer wavelengths; exhibits a rapid optical response; shows better electrical, optical and electroconductive properties; resists electrical voltage breakdown and is resistant to the effects of harsh environments.

45 Claims, 43 Drawing Sheets

(A)

(B)

(C)

FIG. 20
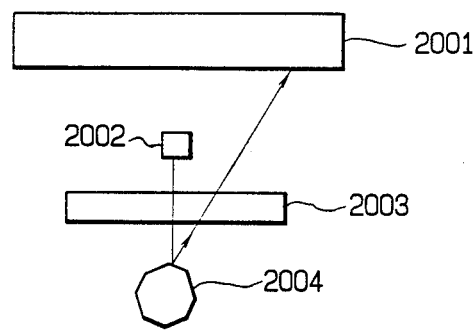
(A)
FIG. 21
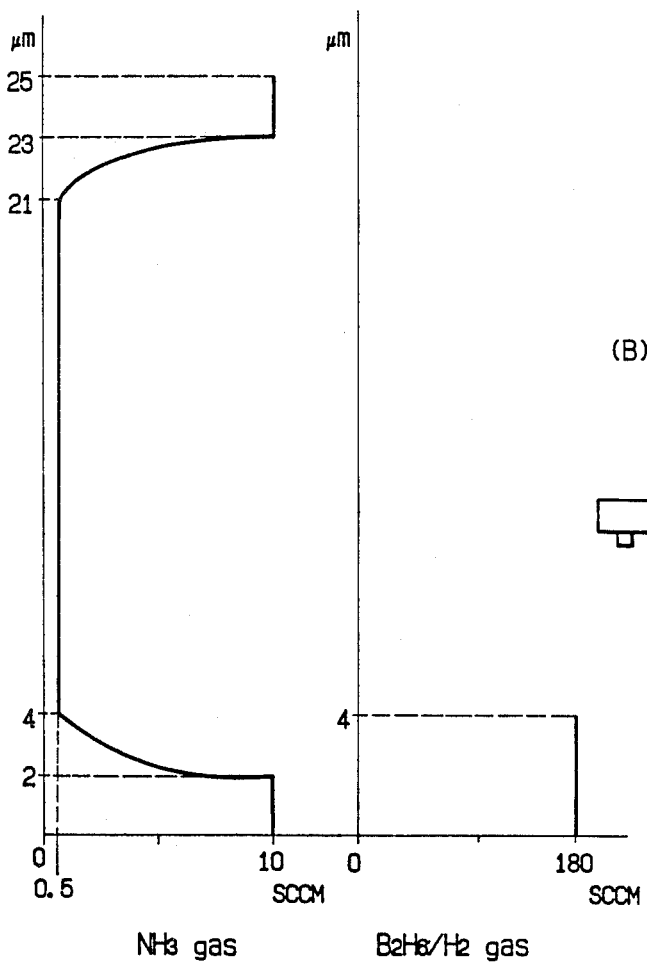
(B)
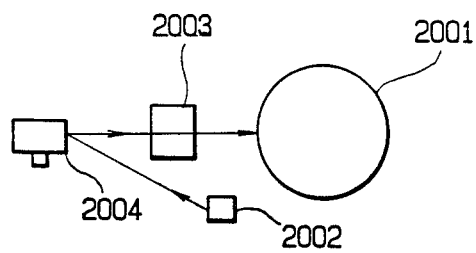

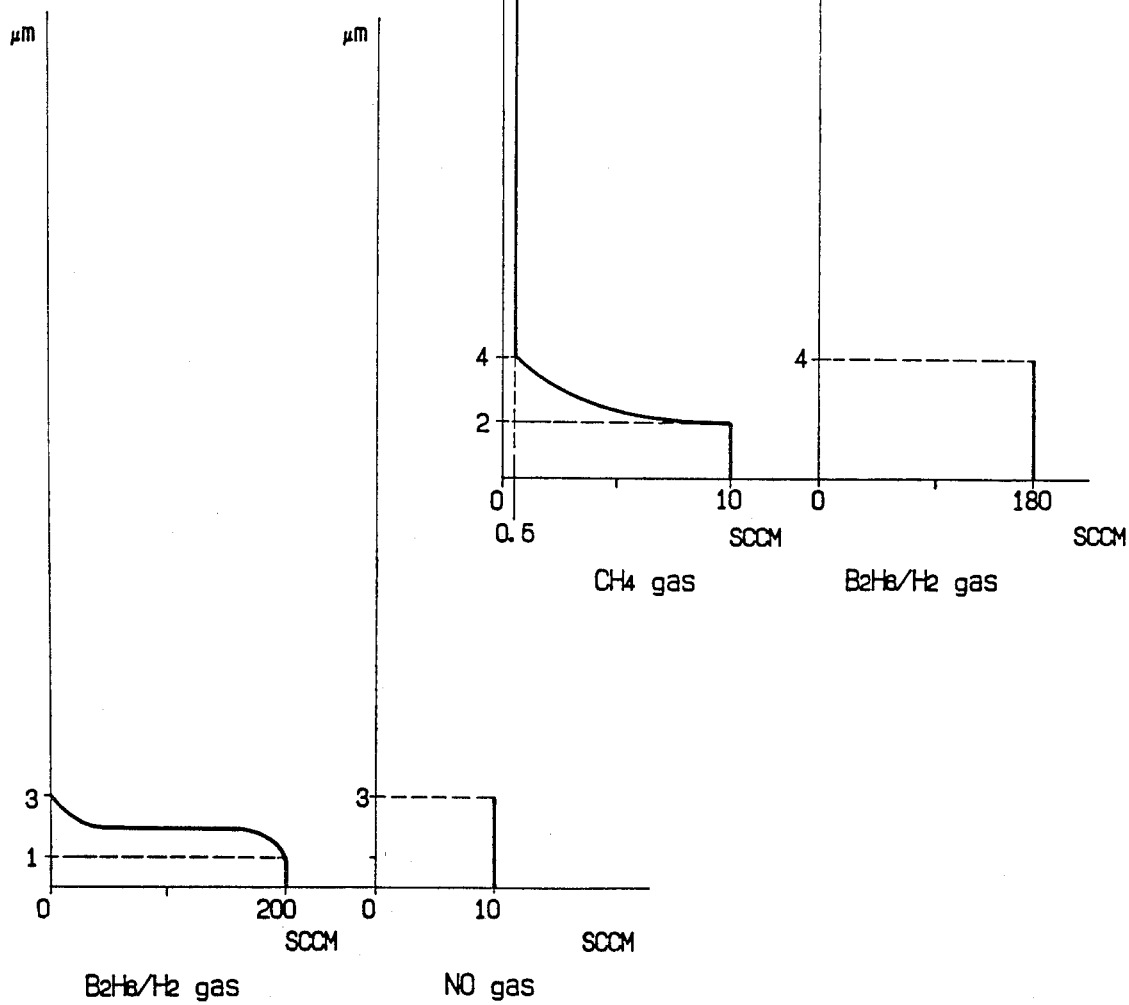

LIGHT RECEIVING MEMBERS WITH SPHERICALLY DIMPLED SUPPORT

BACKGROUND OF THE INVENTION

1. Field of the Invention

This invention concerns light receiving members sensitive to electromagnetic waves such as light (which herein means in a broader sense those lights such as ultra-violet rays, visible rays, infrared rays, X-rays and γ-rays). More specifically, the invention relates to light receiving members suitable to such applications using coherent light such as laser beams.

2. Description of the Prior Art

For recording of digital image information, there have been known such a method as forming electrostatic latent images by optically scanning a light receiving member with laser beams modulated in accordance with the digital image information, and then developing the latent images or further applying transfer, fixing or like other treatment as required. Particularly, in the method of forming images by an electrophotographic process, image recording has usually been conducted by using a He, Ne laser or a semiconductor laser (usually having emission wavelength at from 650 to 820 nm), which is small in size and inexpensive in cost as the laser source.

Further, as the light receiving members for use in electrophotography suitable to the case of using the semiconductor laser, those light receiving members comprising amorphous materials containing silicon atoms (hereinafter referred to as "a-Si"), for example, as disclosed in Japanese Patent Laid-Open Nos. 86341/1979 and 83746/1981 have been evaluated. They have high Vickers hardness and cause less problems in the public pollution, in addition to their excellent matching property in the photosensitive region as compared with other kind of light receiving members.

However, when the light receiving layer constituting the light receiving member as described above is formed as an a-Si layer of a mono-layer structure, it is necessary to structurally incorporate hydrogen or halogen atoms or, further, boron atoms within a range of specific amount into the layer in order to maintain the required dark resistance of greater than $10^{12}$ Ωcm as for the electrophotography while maintaining their high photosensitivity. Therefore, the degree of freedom for the design of the light receiving member undergoes a rather severe limit such as the requirement for the strict control for various kind of conditions upon forming the layer. Then, there have been made several proposals to overcome such problems for the degree of freedom in view of the design in that the high photosensitivity can effectively be utilized while reducing the dark resistance to some extent. That is, the light receiving layer is constituted as two or more layers prepared by laminating those layers of different conductivity in which a depletion layer is formed to the inside of the light receiving layer as disclosed in Japanese Patent Laid-Open Nos. 171743/1979, 4053/1982 and 4172/1982, or the apparent dark resistance is improved by providing a multi-layered structure in which a barrier layer is disposed between a support and a light receiving layer and/or on the upper surface of the light receiving layer as disclosed, for example, in Japanese Patent Publication Nos. 52178, 52179, 52180, 58159, 58160 and 58161/1981.

However, the light receiving members comprising the light receiving layer of the multi-layered structure have unevenness in the thickness for each of the layers. In the case of conducting the laser recording by using such members, since the laser beams comprise coherent light, the respective light beams reflected from the free surface of the light receiving layer on the side of the laser beam irradiation and from the layer boundary between each of the layers constituting the light receiving layer and between the support and the light receiving layer (hereinafter both of the free surface and the layer interface are correctively referred to as "interface") often interfere with each other.

The interference results in a so-called interference fringe pattern in the formed visible images which causes defective images. Particularly, in the case of forming intermediate tone images with high gradation, the images obtained are extremely poor in quality.

Another important point to be referred to is a problem that the foregoing interference phenomena becomes remarkable as the wavelength region of the semiconductor laser beamsused is increased since the absorption of the laser beams in the light receiving layer is decreased.

That is, in the two or more layer (multi-layered) structure, interference occurs between each of the layers and the respective interferences are synergistically acted with each other to exhibit an interference fringe pattern, which directly gives an effect on the transfer material to transfer and fix the interference fringe on the member and thus in the visible images corresponding to the interference fringe pattern thus bringing about defective images.

In order to overcome these problems, there have been proposed, for example, (a) a method of cutting the surface of the support with diamond to form a light scattering surface formed with unevenness of ±500 Å–±10,000 Å (refer, for example, to Japanese Patent Laid-Open No. 162975/1983), (b) a method of disposing a light absorbing layer by treating the surface of an aluminum support with black alumite or dispersing carbon, colored pigment or dye into a resin (refer, for example, to Japanese Patent Laid-Open No. 165845/1982) and (c) a method of disposing a light scattering reflection preventive layer on the surface of an aluminum support by treating the surface of the support with a satine-like alumite processing or by disposing a fine grain-like unevenness by means of sand blasting (refer, for example, to Japanese Patent Laid-Open No. 16554/1982).

Although these proposed methods provide satisfactory results to some extent, they are not sufficient for completely eliminating the interference fringe pattern which forms in the images.

That is, referring to the method (a), since a plurality of irregularities with a specific t are formed at the surface of the support, occurrence of the interference fringe pattern due to the light scattering effect can be prevented to some extent. However, since the positive reflection light component is still left as the light scattering, the interference fringe pattern due to the positive reflection light still remains and, in addition, the irradiation spot is widened due to the light scattering effect at the support surface to result in a substantial reduction in the resolution power.

Referring to the method (b), it is impossible to obtain complete absorption only by the black alumite treatment and the reflection light is still remained at the support surface. In the case of disposing the resin layer dispersed with the pigmented dye, there are various problems in that degasification is resulted from the resin layer upon forming an a-Si layer to remarkably reduce the layer quality of the thus formed light receiving layer, the resin layer is damaged by the plasmas upon forming the a-Si layer in which the inherent absorbing function is reduced and undesired effects are given to the subsequent formation of the a-Si layer due to the worsening in the surface state.

Referring to the method (c), a portion of the incident light is reflected at the surface of the light receiving layer, while the remaining portion intrudes as the transmission light to the inside of the light receiving layer. While a portion of the transmission light is scattered as a diffused light at the surface of the support and the remaining portion is positively reflected as a reflection light and a portion of which goes out as the emission light. However, the emission light is a component interferring the reflection light. In any event, since the light remains, the interference fringe pattern can not completely be eliminated.

For preventing the interference in this case, attempts have been made to increase the diffusibility at the surface of the support so that no multi-reflection occurs at the inside of the light receiving layer. However, this somewhat diffuses the light in the light receiving layer thereby causing halation and, accordingly, reducing the resolution power.

Particularly, in the light receiving member of the multi-layered structure, if the support surface is roughened irregularly, the reflection light at the surface of the first layer, the reflection layer at the second layer and the positive reflection light at the support surface interfere with each other which results in the interference fringe pattern in accordance with the thickness of each layer in the light receiving member. Accordingly, it is impossible to completely prevent the interference fringe by unevenly roughening the surface of the support in the light receiving member of the multi-layered structure.

In the case of unevenly roughening the surface of the support by the sand blasting or like other method, scattering of the roughness is often caused between the lots and the unevenness in the roughness occurs even in an identical lot thereby causing problems in view of the production control. In addition, relatively large protrusions are frequently formed at random and such large protrusions cause local break down in the light receiving layer.

Further, even if the surface of the support is regularly roughened, since the light receiving layer is usually deposited along with the uneven shape at the surface of the support, the inclined surface on the unevenness at the support are in parallel with the inclined surface on the unevenness at the light receiving layer, where the incident light brings about bright and dark areas. Further, in the light receiving layer, since the layer thickness is not uniform over the entire light receiving layer, a dark and bright stripe pattern results. Accordingly, mere orderly roughening to the surface of the support can not completely prevent the occurrence of the interference fringe pattern.

Furthermore, in the case of depositing the light receiving layer of a multi-layered structure on the support the surface of which is regularly roughened, since the interference due to the reflection light at the interface between each of the layers is joined to the interference between the positive reflection light at the surface of the support and the reflection light at the surface of the light receiving layer, the situation is more complicated than the occurrence of the interference fringe in the light receiving member of a single layer structure.

Furthermore, the problem of the interference due to the reflection light in the receiving member of such multilayered structure also concerns with the surface layer. That is, as can be seen from the foregoing, if the thickness of the surface layer is not uniform, interference occurs due to the reflected light at the interface between the surface layer and the photosensitive layer to result in trouble in the functioning of the light receiving member.

The unevenness of the thickness of the surface layer is brought about upon forming the surface layer, as well as by abrasion, particularly, partial abrasion during use of the light receiving member. Particularly, in the latter case, it results in the occurrence of the interference pattern as described above and, in addition, also results in the change in the sensitivity, uneven sensitivity or the like over the entire light receiving member.

To eliminate such problems regarding the surface layer, it has been attempted to increase the thickness of the surface layer as much as possible. However this leads to the increase in the residual potential and rather increases the unevenness in the layer thickness of the surface layer. Since the light receiving member having such a surface layer involves the factors for causing problems such as changes in the sensitivity and uneven sensitivity already when the layer has been formed the member will provide those images that can not be appreciated from the initial time of use.

SUMMARY OF THE INVENTION

The object of this invention is to provide a light receiving member comprising a light receiving layer mainly composed of a-Si, free from the foregoing problems and capable of satisfying various kind of requirements.

That is, the main object of this invention is to provide a light receiving member comprising a light receiving layer constituted with a-Si in which electrical, optical and photoconductive properties are always substantially stable scarcely depending on the working circumstances, and which is excellent against optical fatigue, causes no degradation upon repeated use, excellent in durability and moisture-proofness, exhibits no or scarcely any residual potential and provides easy production control.

Another object of this invention is to provide a light receiving member comprising a light receiving layer composed of a-Si which has a high photosensitivity in the entire visible region of light, particularly, an excellent matching property with a semiconductor laser and shows rapid light response.

Other object of this invention is to provide a light receiving member comprising a light receiving layer composed of a-Si which has high photosensitivity, high S/N ratio and high electrical voltage withstanding property.

A further object of this invention is to provide a light receiving member comprising a light receiving layer composed of a-Si which is excellent in the close bondability between a support and a layer disposed on the support or between each of the laminated layers, dense and stable in view of the structural arrangement and of high layer quality. A further object of this invention is to provide a light receiving member comprising a light receiving layer composed of a-Si which is suitable to the image formation by using coherent light, free from the occurrence of interference fringe pattern and spots upon reversed development even after repeated use for a long period of time, free from defective images or blurring in the images, shows high density with clear half tone, and has a high resolution power and can provide high quality images.

BRIEF DESCRIPTION OF THE DRAWINGS

These and other objects, as well as the features of this invention will become apparent by reading the following descriptions of preferred embodiments according to this invention while referring to the accompanying drawings, wherein:

FIGS. 2 and 3 are enlarged views for a portion illustrating the principle of preventing the occurrence of interference fringe in the light receiving member according to this invention, in which FIG. 2 is a view illustrating that occurrence of the interference fringe can be prevented in the light receiving member in which unevenness constituted with spherical dimples is formed to the surface of a support and FIG. 3 is a view illustrating that the interference fringe results in the conventional light receiving member in which the light receiving layer is deposited on a support roughened regularly at the surface;

FIGS. 6(A) and 6(B) are views schematically illustrating a constitutional example of a device suitable for forming the uneven shape formed to the support of the light receiving member according to this invention, in which FIG. 6(A) is a front elevational view and FIG. 6(B) is a vertical cross-sectional view;

FIGS. 20A and 20B are views for illustrating the image exposing device by the laser beams; and FIGS. 21 through 45 are views illustrating the variations in the gas flow rates in forming the light receiving layer according to this invention, in which ordinate represents the position along the layer thickness and the abscissa represents the gas flow rate.

DETAILED DESCRIPTION OF THE INVENTION

Figure 1:
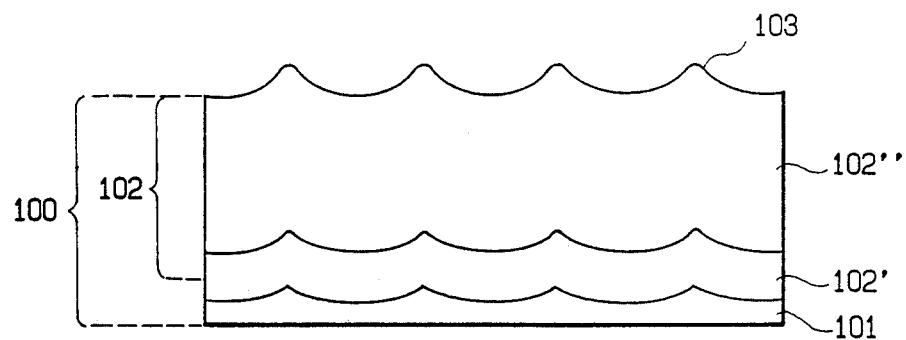
FIGS. 1(A)–(C) are views schematically illustrating the typical examples of light receiving members according to this invention.
Figure 1:
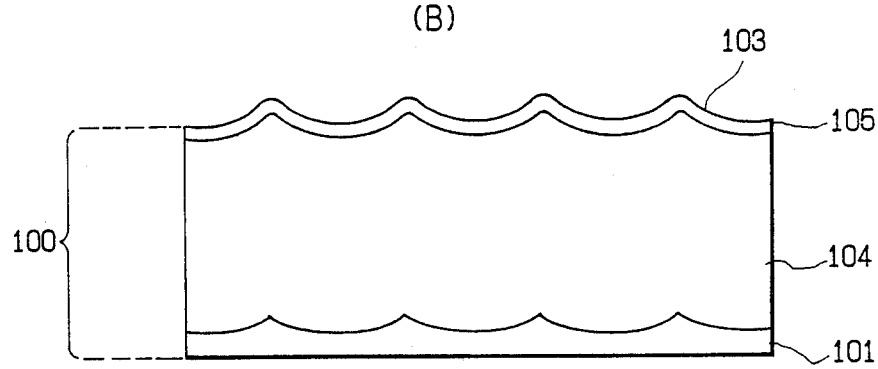
Figure 1:
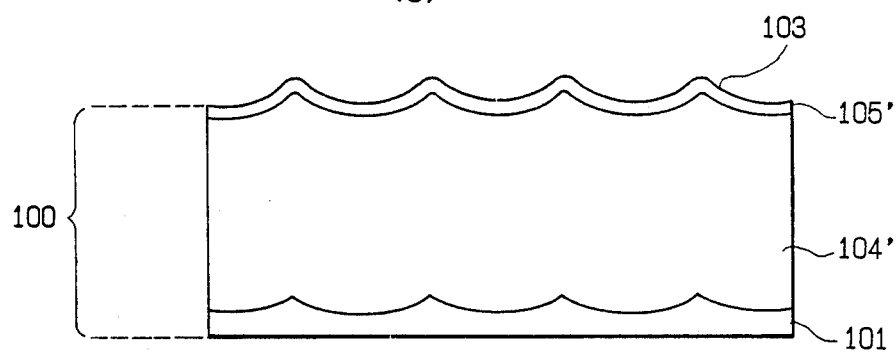

The present inventors have made an earnest study for overcoming the foregoing problems on the conventional light receiving members and attaining the objects as described above and, as a result, have accomplished this invention based on the findings as described below.

That is, one of the findings is that the problems for the interference fringe pattern occurring upon image formation in the light receiving member having a plurality of layers on a support can be overcome by disposing unevenness constituted with a plurality of spherical dimples on the surface of the support.

Another finding is that in a case where the optical band gap possessed by a surface layer and the optical band gap possessed by a photosensitive layer to which the surface layer is disposed directly are matched at the interface between the surface layer and the photosensitive layer, in the light receiving member comprising the surface layer and the photosensitive layer on the support, the reflection of the incident light at the interface between the surface layer and the photosensitive layer can be prevented and the problems such as the interference fringe or uneven sensitivity resulted from the uneven layer thickness upon forming the surface layer and/or uneven layer thickness due to the abrasion of the surface layer can be overcome.

A further finding is that in a case where the surface layer is constituted as a multi-layered structure having an abrasion-resistant layer at the outermost side and at least the reflection preventive layer in the inside in the light receiving member comprising the surface layer and the photosensitive layer on the support, the reflection of the incident light at the interface between the surface layer and the photosensitive layer can be prevented and the problems such as the interference fringe or uneven sensitivity resulted from the uneven layer thickness upon forming the surface layer and/or uneven layer thickness due to the abrasion of the surface layer can be overcome.

This invention has been accomplished based on the findings as described above and one of the aspect thereof resides in a light receiving member comprising a light receiving layer of a multi-layered structure at least having, on a support, a photosensitive layer composed of amorphous material containing silicon atoms, and at least one of elements selected from oxygen atoms, carbon atoms and nitrogen atoms, wherein the surface of the support has an uneven shape formed by a plurality of spherical dimples.

Another aspect of this invention resides in a light receiving member comprising a light receiving layer having, on a support, a photosensitive layer composed of amorphous material based on silicon atoms and a surface layer, wherein the surface of the support has an uneven shape formed by a plurality of spherical dimples.

A further aspect of this invention resides in a light receiving member comprising a light receiving layer having, on a support, a photosensitive layer composed of amorphous material containing silicon atoms, and at least one of elements selected from oxygen atoms, carbon atoms and nitrogen atoms and a surface layer, wherein the surface of the support has an uneven shape formed by a plurality of spherical dimples.

A still further aspect of this invention resides in a light receiving member comprising a light receiving layer having on a support, a photosensitive layer composed of amorphous material at least containing silicon atoms and a surface layer composed of amorphous material containing silicon atoms, and at least one of elements selected from oxygen atoms, carbon atoms and nitrogen atoms, wherein optical band gaps are matched at the interface between the photosensitive layer and the surface layer, and the surface of the support has an uneven shape formed by a plurality of spherical dimples recesses.

A still further aspect of this invention resides in a light receiving member comprising a light receiving layer having on a support, a photosensitive material composed of amorphous material at least containing silicon atoms and a surface layer, wherein the surface layer is in a multilayered structure comprising an abrasion-resistant layer at the outermost side and at least a reflection preventive layer to the inside, and the surface of the support has an uneven shape formed by a plurality of spherical dimples.

The findings regarding the surface shape of the support as described above is based on the facts obtained by various experiments attempted by the present inventors.

For better understanding the above-mentioned facts description will now be made referring to the drawings.

FIGS. 1(A)–(C) are schematic views illustrating the layer constitution of a light receiving member 100 according to this invention, which show the light receiving member having a light receiving layer of a multi-layered structure on a support 101 having an uneven shape formed with a plurality of fine spherical dimples along the inclined surface of the unevenness thereof.

Figure 3:
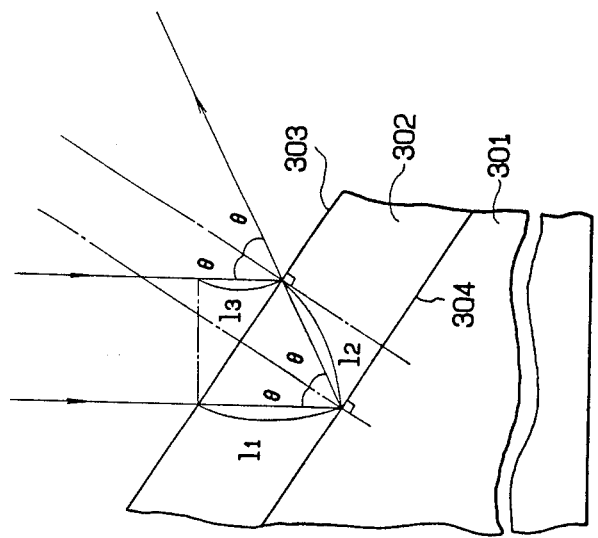
Figure 2:
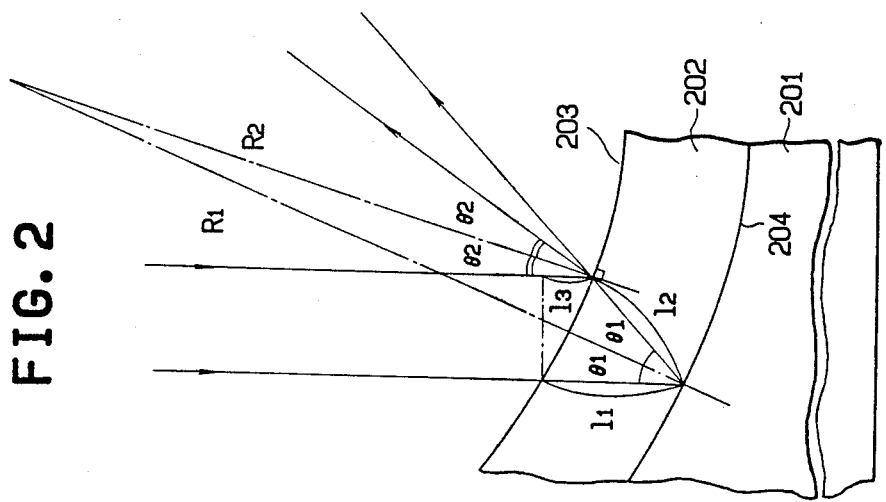

FIGS. 2 and 3 are views for illustrating that the problems of the interference fringe pattern can be overcome in the light receiving member according to this invention.

FIG. 3 is an enlarged view for a portion of a conventional light receiving member in which a light receiving layer of a multi-layered structure is deposited on a support the surface of which is regularly roughened. In the drawing, a first layer 301, a second layer 302, a free surface 303 and an interface 304 between the first and the second layers are shown respectively. As shown in FIG. 3, in the case of merely roughening the surface of the support regularly by grinding or like other means, since the light receiving layer is usually formed along the uneven shape at the surface of the support, the inclined surface of the unevenness at the surface of the support and the inclined surface of the unevenness of the light receiving layer are in parallel with each other. Owing to the parallelism, the following problems always occur, for example, in a light receiving member of a multi-layered structure in which the light receiving layer comprises two layers, that is, a first layer 301 and the second layer 302. Since the interface 304 between the first layer and the second layer is in parallel with the free surface 303, the direction of the reflection light $R_1$ at the interface 304 and that of the reflection light $R_2$ at the free surface coincide with each other and, accordingly, an interference fringe is resulted depending on the thickness of the second layer.

FIG. 2 is an enlarged view for a portion shown in FIG. 1. As shown in FIG. 2, an uneven shape composed of a plurality of fine spherical dimples is formed at the surface of a support in the light receiving member according to this invention and the light receiving layer thereover is deposited along with the uneven shape. Therefore, in the light receiving member of the multi-layered structure, for example, in which the light receiving layer comprises a first layer 201 and a second layer 202, the interface 204 between the first layer 201 and the second layer 202 and the free surface 203 are respectively formed with the uneven shape composed of the spherical dimples along the uneven shape at the surface of the support. Assuming the radius of curvature of the spherical dimples formed at the interface 204 as $R_1$ and the radius of curvature of the spherical dimples formed at the free surface as $R_2$, since $R_1$ is not identical with $R_2$, the reflection light at the interface 204 and the reflection light at the free surface 203 have reflection angles different from each other, that is, $\theta_1$ is not identical with $\theta_2$ in FIG. 2 and the direction of their reflection lights are different. In addition, the deviation of the wavelength represented by $l_1 + l_2 - l_3$ by using $l_1$, $L_2$ and $l_3$ shown in FIG. 2 is not constant but varies, by which a shearing interference correspondig to a so-called Newton ring phenomenon occurs and the interference fringe is dispersed within the dimples. Then, if the interference fringe should appear in the microscopic point of view in the images resulted by way of the light receiving member, it is not visually recognized.

That is, in a light receiving member having a light receiving layer of a multi-layered structure formed on the support having such a surface shape, the fringe pattern resulted in the images due to the interference between lights passing through the light receiving layer and reflecting on the layer interface and at the surface of the support thereby enabling to obtain a light receiving member capable of forming excellent images.

By the way, the radius of curvature R and the width D of the uneven shape formed by the spherical dimples, at the surface of the support of the light receiving member according to this invention constitute an important factor for effectively attaining the advantageous effect of preventing the occurrence of the interference fringe in the light receiving member according to this invention. The present inventors have made various experiments and, as a result, found the following facts.

That is, if the radius of curvature R and the width D satisfy the following equation:

$$D/R \geq 0.035,$$

0.5 or more Newton rings due to the sharing interference are present in each of the dimples. Further, if they satisfy the following equation:

$$D/R \geq 0.055,$$

one or more Newton rings due to the sharing interference are present in each of the dimples.

From the foregoings, it is preferred that the ratio D/R is greater than 0.035 and, preferably, greater than 0.055 for dispersing the interference fringes resulted throughout the light receiving member in each of the dimples thereby preventing the occurrence of the interference fringe in the light receiving member.

Further, it is desired that the width D of the unevenness formed by the scraped dimple is about 500 μm at the maximum, preferably, less than 200 μm and, preferably, less than 100 μm.

The light receiving member according to this invention will now be explained more specifically referring to the drawings.

FIG. 1(A) is a schematic view for illustrating the typical layer structure of the light receiving member that embodies the first feature of this invention, in which are shown a light receiving member 100, a support 101, a light receiving layer 102, a first layer 102', a second layer 102" and a free surface 103. Explanation will be made for the support 101 and the light receiving layer 102.

Support 101

The support 101 in the light receiving member according to this invention has a surface with fine unevenness smaller than the resolution power required for the light receiving member and the unevenness is composed of a plurality of spherical dimples.

Figure 4:
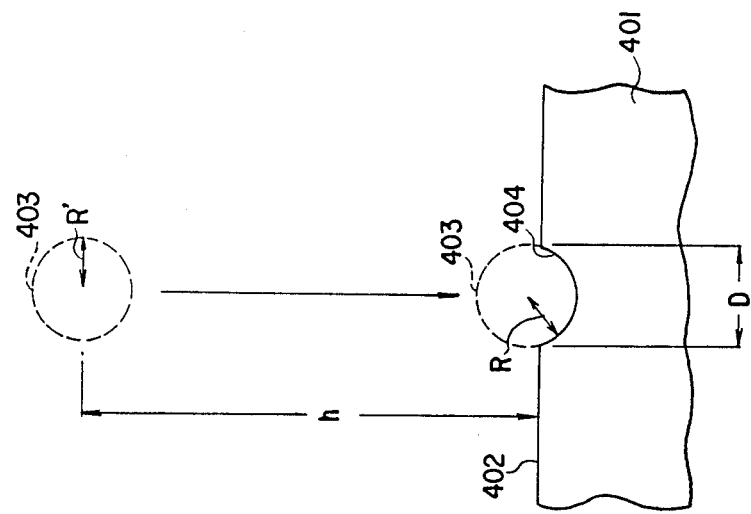
FIGS. 4 and 5 are schematic views for illustrating the uneven shape at the surface of the support of the light receiving member according to this invention and a method of preparing the uneven shape.
Figure 5:
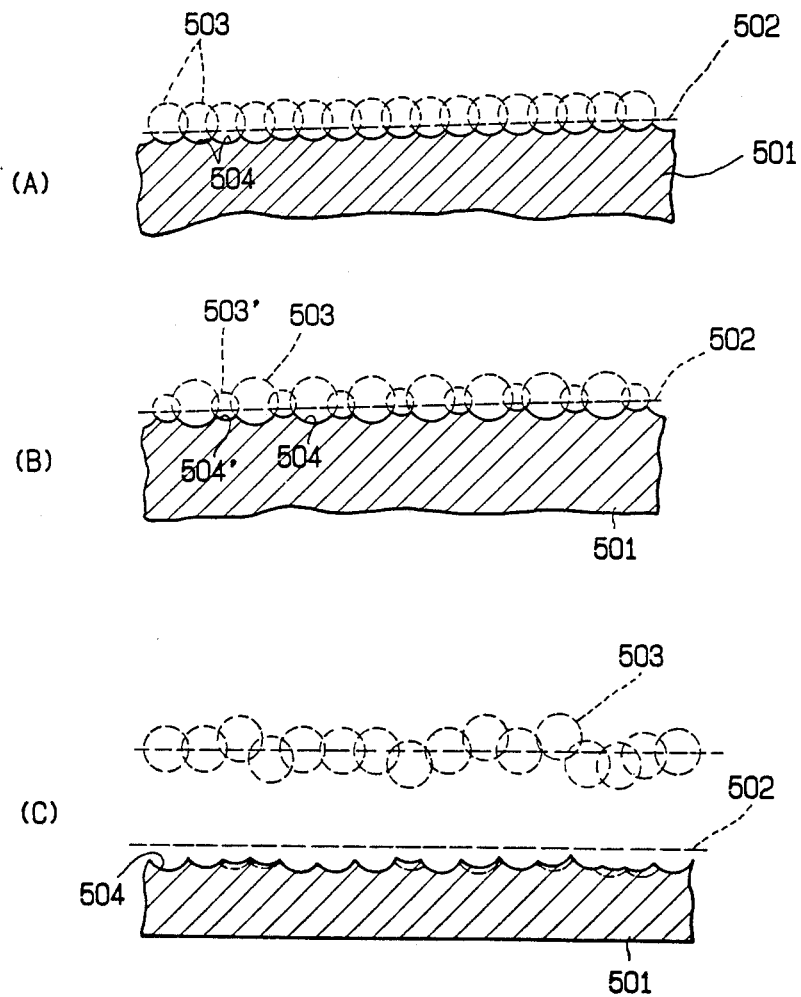

The shape of the surface of the support and an example of a preferred method of preparing the shape are specifically explained referring to FIGS. 4 and 5 but it should be noted that the shape of the support in the light receiving member of this invention and the method of preparing the same are no way limited only thereto.

FIG. 4 is a schematic view for a typical example of the shape at the surface of the support in the light receiving member according to this invention, in which a portion of the uneven shape is enlarged. In FIG. 4, are shown a support 401, a support surface 402, a rigid true sphere 403 and a spherical dimple 404.

FIG. 4 also shows an example of a preferred method of preparing the surface shape of the support. That is, the rigid true sphere 403 is caused to fall gravitationally from a position at a predetermined height above the support surface 402 and collide against the support surface 402 thereby forming the spherical dimple 404. A plurality of spherical dimples 404 each substantially of an identical radius of curvature R and of an identical width D can be formed to the support surface 402 by causiing a plurality of rigid true spheres 403 substantially of an identical diameter R' to fall from identical height h simultaneously or sequentially.

FIG. 5 shows several typical embodiments of supports formed with the uneven shape composed of a plurality of spherical dimples at the surface as described above.

In the embodiment shown in FIG. 5(A), a plurality of dimples pits 604, 604, - - - substantially of an identical radius of curvature and substantially of an identical width are formed while being closely overlapped with each other thereby forming an uneven shape regularly by causing to fall a plurality of spheres 503, 503, - - - regularly substantially from an identical height to different positions at the surface 502 of the support 501. In this case, it is naturally required for forming the dimples 504, 504, - - - overlapped with each other that the spheres 503, 503, - - - are gravitationally impact such that the times of collision of the respective spheres 503 to the support 502 are displaced from each other.

Further, in the embodiment shown in FIG. 5(B), a plurality of dimples 504, 504', - - - having two kind of radius of curvature and two kind of width are formed being densely overlapped with each other to the surface 503 of the support 501 thereby forming an unevenness with irregular height at the surface of falling two kind of spheres 503, 503', - - - of different diameters from the heights substantially identical or different with each other.

Furthermore, in the embodiment shown in FIG. 5(C) (front elevational and cross-sectional views for the support surface), a plurality of dimples 504, 504 - - - substantially of an identical radius of curvature and a plurality kinds of width are formed while being overlapped with each other thereby forming an irregular unevenness by causing to fall a plurality of spheres 503, 503, - - - substantially of an identical diameter from substantially identical height irregularly to the surface 502 of the support 501.

As described above, uneven shape composed of the spherical dimples can be formed by falling the rigid true spheres to the support surface. In this case, a plurality of spherical dimples having desired radius of curvature and width can be formed at a predetermined density at the support surface by properly selecting various conditions such as the diameter of the rigid true spheres, falling height, hardness for the rigid true sphere and the support surface or the amount of the fallen spheres. That is, the height and the pitch of the uneven shape formed at the support surface can optionally be adjusted depending on the purpose by selecting various conditions as described above thereby enabling to obtain a support having a desired uneven shape at the surface.

For making the surface of the support into an uneven shape in the light receiving member, a method of forming such a shape by the grinding work by means of a diamond cutting tool using lathe, milling cutter, etc. has been proposed, which is effective to some extent. However, the method leads to problems in that it requires to use cutting oils, remove cutting dusts inevitably resulted during cutting work and to remove the cutting oils remaining on the cut surface, which after all complicates the fabrication and reduce the working efficiency. In this invention, since the uneven surface shape of the support is formed by the spherical dimples as described above, a support having the surface with a desired uneven shape can conveniently be prepared with no problems as described above at all.

The support 101 for use in this invention may either be electroconductive or insulative. The electroconductive support can include, for example, metals such as NiCr, stainless steel, Al, Cr, Mo, Au, Nb, Ta, V, Ti, Pt and Pb or the alloys thereof.

The electrically insulative support can include, for example, films or sheets of synthetic resins such as polyester, polyethylene, polycarbonate, cellulose acetate, polypropylene, polyvinyl chloride, polyvinylidene chloride, polystyrene, and polyamide, glass, ceramic and paper. It is preferred that the electrically insulative support is applied with electroconductive treatment to at least one of the surfaces thereof and disposed with a light receiving layer on the thus treated surface.

In the case of glass, for instance, electroconductivity is applied by disposing, at the surface thereof, a thin film made of NiCr, Al, Cr, Mo, Au, Ir, Nb, Ta, V, Ti, Pt, Pd, $In_2O_3$, $SnO_2$, ITO ($In_2O_3+SnO_2$), etc. In the case of the synthetic resin film such as a polyester film, the electroconductivity is provided to the surface by disposing a thin film of metal such as NiCr, Al, Ag, Pv, Zn, Ni, Au, Cr, Mo, Ir, Nb, Ta, V, Tl and Pt by means of vacuum deposition, electron beam vapor deposition, sputtering, etc, or applying lamination with the metal to the surface. The support may be of any configuration such as cylindrical, belt-like or plate-like shape, which can be properly determined depending on the application uses. For instance, in the case of using the light receiving member shown in FIG. 1 as image forming member for use in electronic photography, it is desirably configurated into an endless belt or cylindrical form in the case of continuous high speed reproduction. The thickness of the support member is properly determined so that the light receiving member as desired can be formed. In the case flexibility is required for the light receiving member, it can be made as thin as possible within a range capable of sufficiently providing the function as the support. However, the thickness is usually greater than 10 um in view of the fabrication and handling or mechanical strength of the support.

Explanation will then be made to one embodiment of a device for preparing the support surface in the case of using the light receiving member according to this invention as the light receiving member for use in electronic photography while referring to FIGS. 6(A) and 6(B), but this invention is no way limited only thereto.

In the case of the support for the light receiving member for use in electronic photography, a cylindrical substrate is prepared as a drawn tube obtained by applying usual extruding work to aluminum alloy or the like other material into a boat hall tube or a mandrel tube and further applying drawing work, followed by optional heat treatment or tempering. Then, an uneven shape is formed at the surface of the support as the cylindrical substrate by using the fabrication device as shown in FIGS. 6(A) and 6(B). The sphere used for forming the uneven shape as described above at the support surface can include, for example, various kinds of rigid spheres made of stainless steels, aluminum, steels, nickel and brass and like other metals, ceramics and plastics. Among all, rigid spheres of stainless steels or steels are preferred in view of the durability and the reduced cost. The hardness of such sphere may be higher or lower than that of the support. In the case of using the spheres repeatingly, it is desired that the hardness of sphere is higher than that of the support. FIGS. 6(A) and 6(B) are schematic cross sectional views for the entire fabrication device, in which are shown an aluminum cylinder 601 for preparing a support and the cylinder 601 may previously be finished at the surface to an appropriate smoothness. The cylinder 601 is journaled by a rotating shaft 602, driven by an appropriate drive means 603 such as a motor and made rotatable around the axial center. The rotating speed is properly determined and controlled while considering the density of the spherical dimples to be formed and the amount of rigid true spheres supplied.

A falling device 604 for gravitationally falling rigid true spheres 605 comprises a ball feeder 606 for storing and falling the rigid true spheres 605, a vibrator 607 for vibrating the rigid true spheres 605 so as to facilitate the falling from feeders 609, a recovery vessel 608 for recovering the rigid true spheres 605 falling after the collision against the cylinder, a ball feeder for transporting the rigid true spheres 605 recovered in the recovery vessel 608 to the feeder 606 through the pipe, washers 610 for liquid-washing the rigid true spheres in the midway to the feeders 609, liquid reservoirs 611 for supplying a cleaning liquid (solvent or the like) to the washers 610 by way of nozzles or the likes, recovery vessels 612 for recovering the liquid used for the washing, etc.

The amount of the rigid true spheres gravitationally falling from the feeder 606 is properly controlled by the opening degree of a falling port 613, the extent of vibrations given by the vibrator, etc.

Light receiving layer 102

The light receiving layer 102 is a layer disposed on the support 102 as described above and it comprises an amorphous material based on silicon atoms and, particularly preferably, an amorphous material containing silicon atoms (Si) and at least one of hydrogen atoms (H) and halogen atoms (X) (hereinafter referred to as "a-Si (H, X)") and also, optionally, containing electroconductive substances. The light receiving layer 102 in the light receiving member according to this invention has a multi-layered structure. For instance, in the embodiment shown in FIG. 1(A), it comprises a first layer 102' and a second layer 102" and has a free surface 103 on the side of the light receiving layer opposite to the support.

The halogen atom (X) contained in the light receiving layer include, specifically, fluorine, chlorine, bromine and iodine, fluorine and chlorine being particularly preferred. The amount of the hydrogen atoms (H), the amount of the halogen atoms (X) or the sum of the amounts for the hydrogen atoms and the halogen atoms (H+X) contained in the light receiving layer 102 is usually from 1 to 40 atm% and, preferably, from 5 to 30 atm%.

In the light receiving member according to this invention, the thickness of the light receiving layer is one of the important factors for effectively attaining the purpose of this invention and a sufficient care has to be taken therefor upon designing the light receiving member so as to provide the member with desired performances. The layer thickness is usually from 1 to 100 $\mu$m, preferably, from 1 to 80 $\mu$m and, more preferably, from 2 to 50 $\mu$m.

Further, at least one of the elements selected from oxygen atoms, carbon atoms, nitrogen atoms is contained in the light receiving layer of the light receiving member according to this invention mainly with a purpose of increasing the photosensitivity and the dark resistance of the light receiving member, as well as improving the close bondability between the support and the light receiving layer.

In the case of incorporating at least one of the elements selected from the oxygen atoms, carbon atoms and nitrogen atoms into the light receiving layer 102, it is contained at a uniform distribution or not uniform distribution in the direction of the layer thickness depending on the purpose or the expected effects as described above and, accordingly, the content is also varied depending on them.

That is, in the case of increasing the photosensitivity and dark resistance of the light receiving member, the element is contained at a uniform distribution over the entire layer region of the light receiving layer. In this case, the amount of at least one of the elements selected from carbon atoms, oxygen atoms and nitrogen atoms contained in the light receiving layer may be a relatively small amount.

In the case of improving the close bondability between the support and the light receiving layer, at least one of the elements selected from the carbon atoms, oxygen atoms and nitrogen atoms is contained uniformly in a portion of the layer region at the end of the light receiving layer on the side of the support or the element is contained such that the distribution density of at least one of the elements selected from the carbon atoms, oxygen atoms and nitrogen atoms is higher at the end of the light receiving layer on the side of the support. In this case, the amount of at least one of the elements selected from the oxygen atoms, carbon atoms and nitrogen atoms is made relatively great in order to ensure the improvement for the close bondability with the support.

On the other hand, the amount of at least one of the elements selected from the oxygen atoms, carbon atoms and nitrogen atoms contained in the light receiving layer of the light receiving member according to this invention is also determined while considering the organic relationship such as the performance at the interface in contact with the support, in addition to the performances required for the light receiving layer as described above and it is usually from 0.001 to 50 atm%, preferably, from 0.002 to 40 atm% and, most suitably, from 0.003 to 30 atm%. By the way, in the case of incorporating the element in the entire layer region of the photosensitive layer or the proportion of the layer thickness of the layer region incorporated with the element is greater in the layer thickness of the light receiving layer, the upper limit for the content is made smaller. That is, if the thickness of the layer region incorporated with the element is 2/5 of the thickness for the light receiving layer, the content is usually less than 30 atm%, preferably, less than 20 atm% and, most suitably, less than 10 atm%.

Then, several examples are explained referring to FIGS. 7 through 15 in which a relatively large amount of at least one of the elements selected from oxygen atoms, carbon atoms and nitrogen atoms are contained in the light receiving layer according to this invention on the side of the support, then the amount is gradually decreased from the end on the side of the support to the end on the side of the free surface and decreased further to a relatively small amount or substantially zero near the end of the light receiving layer on the side of the free surface. However, this invention is no way limited only to those examples. At least one of the elements selected from carbon atoms, oxygen atoms and nitrogen atoms is referred to hereinafter as "atoms (O, C, N)".

In FIGS. 7 through 15, the abscissa represents the distribution density C of the atoms (O, C, N), the ordinate represent the thickness of the light receiving layer, $t_B$ represents the position of the interface between the support and the light receiving layer and $t_T$ represents the position for the free surface of the light receiving layer.

Figure 7:
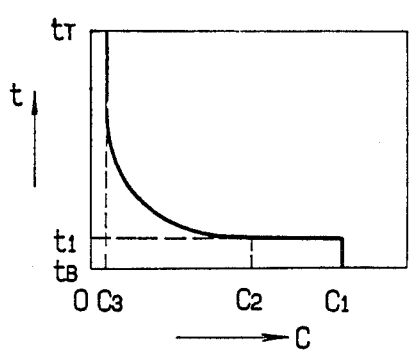
FIGS. 7 through 15 are views illustrating the distribution state, in the direction of the layer thickness, of at least one of the elements selected from oxygen atoms, carbon atoms and nitrogen atoms, and group III or group V atoms in the photosensitive layer in this invention.

FIG. 7 shows the first typical embodiment of the distribution state of the atoms (O, C, N) contained in the light receiving layer in the direction of the layer thickness. In this embodiment, the distribution density of the atoms (O, C, N) is at a constant value $C_1$ from the interface position $t_B$ between the light receiving layer and the support to the position $t_1$, the distribution density C is continuously decreased from the density $C_2$ from the position $t_1$ to the position $t_T$ at the free surface and then the distribution density C of the atoms (O, C, N) is decreased to $C_3$ at the position $t_T$.

Figure 8:
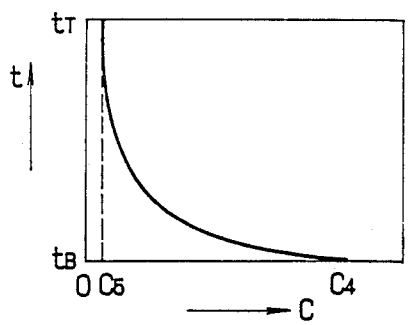

In another typical embodiment shown in FIG. 8, the distribution density C of the atoms (O, C, N) contained in the light receiving layer is such that the density $C_4$ is continuously decreased from the position $t_B$ to the position $t_T$ where it attains $C_5$.

Figure 9:
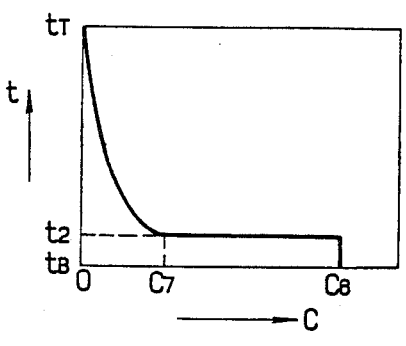

In the embodiment shown in FIG. 9, the distribution density C of the atoms (O, C, N) is kept at a constant value $C_6$ from the position $t_B$ to the position $t_2$, the distribution density C of the atoms (O, C, N) is continuously decreased gradually from the density $C_7$ from the position $t_2$ to the position $t_T$ and the distribution density C of the atoms (O, C, N) is substantially zero at the position $t_T$.

Figure 10:
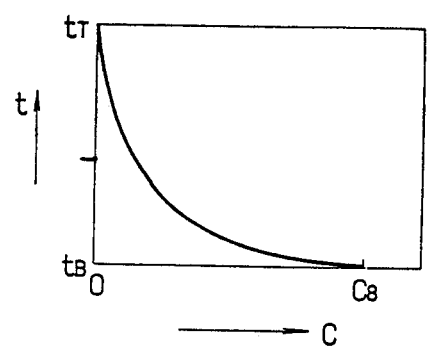

In the embodiment shown in FIG. 10, the distribution density C of the atoms (O, C, N) is continuously decreased from $C_8$ gradually from the position $t_B$ to the position $t_T$ and the distribution density C of the atoms (O, C, N) at the position $t_T$ is substantially zero.

Figure 11:
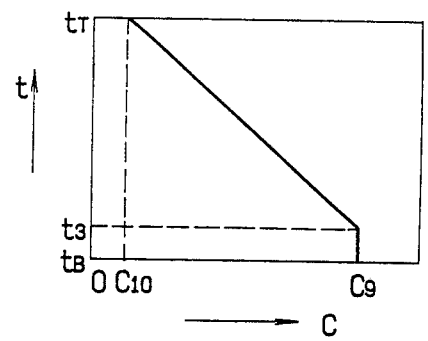

In the embodiment shown in FIG. 11, the distribution density C of the atoms (O, C, N) is at a constant density $C_9$ between the position $t_B$ and the position $t_3$ and the density is decreased linearly from the density $C_9$ to a density $C_{10}$ between the position $t_3$ and the position $t_T$.

Figure 12:
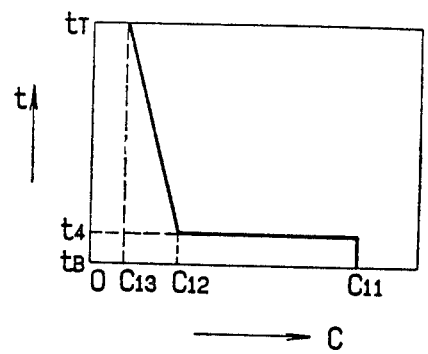

In the embodiment shown in FIG. 12, the distribution density C of the atoms (C, O, N) is at at constant density $C_{11}$ from the position $t_B$ to the position $t_4$ and the density is decreased linearly from the density $C_{12}$ to the density $C_{13}$ between the position $t_4$ and the position $t_T$.

Figure 13:
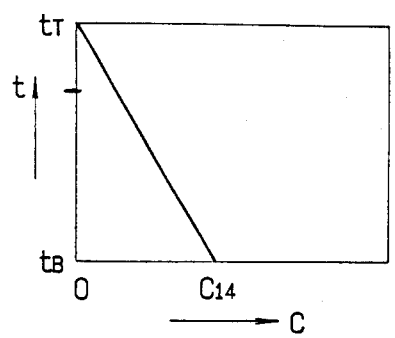

In the embodiment FIG. 13, the distribution density C of the atoms (O, C, N) is decreased along linearly till the density $C_{14}$ is decreased to substantially zero from the position $t_B$ to the position $t_T$.

Figure 14:
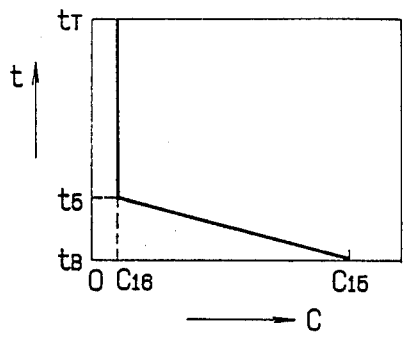

In the embodiment shown in FIG. 14, the distribution density C of the atoms (O, C, N) is decreased linearly till the density $C_{15}$ is decreased to the density $C_{16}$ and from the position $t_B$ to the position $t_5$ then kept at a constant density $C_{16}$ from the position $t_5$ to the position $t_T$.

Figure 15:
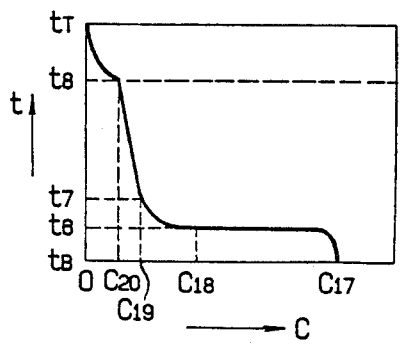

Finally in the embodiment shown in FIG. 15, the distribution density C of the atoms (O, C, N) is at a density $C_{17}$ at the position $t_B$, gradually decreased initially from the density $C_{17}$ and rapidly decreased to a density $C_{18}$ near the position $t_6$ and then decreased at the position t (from the position $t_5$ to the position $t_6$). Then, from the position $t_6$ to the position $t_7$, the density is initially decreased rapidly and, thereafter, gradually decreased slowly to a density $C_{19}$ at the position $t_7$. Further, between the position $t_7$ and the position $t_8$, the density is decreased extremely gradually to a density $C_{20}$ at the position $t_8$. Further, the density is gradually decreased from the density $C_{20}$ substantially to zero from the position $t_6$ to the position $t_T$.

As shown by the embodiments shown in FIGS. 7 through 15, in the case where the distribution density C of the atoms (O, C, N) is higher at the end of the light receiving layer on the side of the support, while the distribution density C is considerably lower or substantially equal to zero at the end of the first layer on the side of the free surface, improvement in the close bondability between the support and the light receiving layer can be attained more effectively by disposing a localized region at the end of the light receiving layer on the side of the support where the distribution densityy of the atoms (O, C, N) is relatively higher and, preferably, by disposing the localllized region at a position within 5 μm from the interface position $t_B$ between the support surface and the light receiving layer.

The localllized region may be disposed partially or entirely at the end of the light receiving layer to be contained with the atoms (O, C. N) on the side of the support, which may be properly determined in accordance with the performances required for the light receiving layer to be formed. It is desired that the amount of the atoms (O, C, N) contained in the localized region is such that the maximum value of the distribution density C of the atoms (O, C, N) is greater than the 500 atm ppm, preferably, greater than 800 atm ppm and, most suitably, greater than 1000 atm ppm in the distribution.

In the light receiving member according to this invention, substance for controlling the electroconductivity may be contained to the light receiving layer 102 in a uniform or not-uniform distribution state to the entire or partial layer region.

As the substance for controlling the conductivity, so-called impurities in the field of the semiconductor can be mentioned and those usable herein can include atoms belonging to the group III of the periodical table that provide P-type conductivity (hereinafter simply referred to as "group III atom") or atoms belonging to the group V of the periodical table that provide n-type conductivity (hereinafter simply referred to as "group V atom"). Specifically, the group III atoms can include B (boron), Al (aluminum) Ga (gallium), In (indium) and Tl (thallium), B and Ga being particularly preferred. The group V atoms can include, for example, P (phosphor), As (arsenic), Sb (antimony) and Bi (bismuth), P and Sb being particularly preferred.

In the case of incorporating the group III or group V atoms as the substance for controlling the conductivity into the light receiving layer according to this invention, they are contained in the entire layer region or partial layer region depending on the purpose or the expected effects as described below and the content is also varied.

That is, if the main purpose resides in the control for the conduction type and/or conductivity of the light receiving layer, the substance is contained in the entire layer region of the photosensitive layer, in which the content of group III or group V atoms may be relatively small and it is usually from $1 \times 10^{-3}$ to $1 \times 10^3$ atm ppm, preferably from $5 \times 10^{-2}$ to $5 \times 10^2$ atm ppm and, most suitably, from $1 \times 10^{-1}$ to $2 \times 10^2$ atm ppm.

In the case of incorporating the group III or group V atoms in a uniform distributed state to a portion of the layer region in contact with the support, or the atoms are contained such that the distribution density of the group III or group V atoms in the direction of the layer thickness is higher on the side adjacent with the support, a partial layer region containing such group III or group V atoms or the region containing them at a higher density functions as a charge injection inhibition layer. That is, in the case of incorporating the group III atoms, movement of electrons injected from the side of the support into the light receiving layer can effectively be inhibited upon applying the charging treatment of at positive polarity at the free surface of the light receiving layer. While on the other hand, in the case of incorporating the group III atoms, movement of positive holes injected from the side of the support into the light receiving layer can effectively be inhibited upon applying the charging treatment at negative polarity at the free surface of the light receiving layer. The content in this case is relatively great. Specifically, it is generally from 30 to $5 \times 10^4$ atm ppm, preferably, from 50 to $1 \times 10^4$ atm ppm and, most suitably, from $1 \times 10^2$ to $5 \times 10^3$ atm ppm. Then, for effectively attaining the foregoing effect, it is desirable that the relationship: $t/t + t_0 \leq 0.4$ is established between the layer thickness $t$ for the portion of the layer region or the layer region containing the substance at a high density and the layer thickness $t_0$ for the photosensitive layer other than above. More preferably, the value for the relationship is less than 0.35 and, most suitably, less than 0.3. Further, the thickness of the layer region is generally from $3 \times 10^{-3}$ to $10\mu$, preferably, $4 \times 10^{-5}$ to $8\mu$ and, most suitably, from $5 \times 10^{-5}$ to $5\mu$.

Further, typical embodiments in which the group III or group V atoms incorporated into the light receiving layer is so distributed that the amount therefor is relatively great on the side of the support, decreased from the support toward the free surface and is relatively smaller or substantially equal to zero near the end on the side of the free surface can be explained by the same embodiments as those in FIGS. 7 through 15 that exemplify those cases of incorporating at least one of the elements selected from oxygen atoms, carbon atoms and nitrogen atoms to the light receiving layer as described above. However, this invention is no way limited only to these embodiments.

As shown in the embodiments of FIGS. 7 through 15, in the case where the distribution density C of the group III or group V atoms is higher at the portion of the light receiving layer near the side of the support, while the distribution density C is considerably lower or substantially reduced to zero in the portion of the light receiving layer on the side of the free surface, the foregoing effect that the layer region where the group III or group V atoms are distributed at a higher density can form the charge injection inhibition layer as described above more effectively, by disposing a localized region where the distribution density of the group III or group V atoms is relatively higher at the portion near the side of the support, preferably, by disposing the localized region at a position within $5\mu$ from the interface position in adjacent with the support surface.

While the individual effects have been described above for the distribution state of the group III or group V atoms, the distribution state of the group III or group V atoms and the amount of the group III or group V atoms are, of course, combined proeperly as required for obtaining the light receiving member having performances capable of attaining a desired purpose. For instance, in the case of disposing the charge injection inhibition layer at the end of the light receiving layer on the side of the support, a substance for controlling the conductivity of a polarity different from that of the substance for controlling the conductivity contained in the charge injection inhibition layer may be contained in the light receiving layer other than the charge injection inhibition layer, or a substance for controlling the conductivity of the same polarity may be contained by an amount substantially smaller than that contained in the charge inhibition layer.

Further, in the light receiving member according to this invention, a so-called barrier layer composed of electrically insulating material may be disposed instead of the charge injection inhibition layer as the constituent layer disposed at the end on the side of the support, or both of the barrier layer and the charge injection inhibition layer may be disposed as the constituent layer. The material for constituting the barrier layer can include, for example, those inorganic electrically insulating materials such as $Al_2O_3$, $SiO_2$ and $Si_3N_4$ or organic electrically insulating material such as polycarbonate.

FIG. 1(B) is a schematic view for illustrating the typical layer structure of the light receiving member that embodies the second aspect of this invention, in which are shown a light receiving member 100, a support 101, a free surface 103, a photosensitive layer 104 and a surface layer 105. As shown in FIG. 1(B), the light receiving member in this embodiment is different from the light receiving layer that embodies the first aspect of this invention shown in FIG. 1(A) as described above in that it comprises a light receiving layer having the photosensitive layer 104 and the surface layer 105 on the support 101 and identical with the embodiment shown in FIG. 1(A) with respect to the support 101.

Explanation will then be made to the photosensitive layer 104 and the surface layer 105.

Photosensitive layer 104

The photosensitive layer 104 is a layer disposed on the support 101 and it comprises an amorphous material based on silicon atoms and, preferably, an amorphous material containing silicon atoms (Si) and at least one of hydrogen atoms (H) or halogen atoms (X) (hereinafter referred to as "a-Si (H, X)"). The photosensitive layer 104 preferably contains further a substance for controlling the conductivity. The photosensitive layer 104 may be a multi-layered structure and, particularly preferably, it includes a so-called barrier layer composed of a charge injection inhibition layer and/or electrically insulating material containing a substance for controlling the conductivity as one of the constituent layers.

The halogen atoms and the substance for controlling the conductivity contained in the photosensitive layer 104 is the same as those contained in the light receiving layer 102 shown in FIG. 1(A). The photosensitive layer is the same as the light receiving layer 102 shown in FIG. 1(A) also with respect to the constitution in that a barrier layer composed of a charge injection inhibition layer containing group III atoms or group V atoms at a high concentration and/or electrically insulating material is disposed to the photosensitive layer 104 on the side in adjacent with the support 101.

Surface layer 105

The surface layer 105 is disposed on the photosensitive layer 104 as described above and the surface layer is generally grouped into the following four types.

One of them is constituted with a-Si (H, X) containing oxygen atoms in a uniformly distributed state (that is a-SiO (H, X)).

The surface layer 104 is disposed to the light receiving layer according to this invention with an aim of improving the moisture-proofness, performance for continuous repeating use, electrical voltage withstanding property, circumstantial resistant property and durability, and these purposes can be attained by incorporating oxygen atoms in the amorphous material constituting the surface layer.

Further, in the light receiving member according to this invention, since each of the amorphous layers constituting the photosensitive layer 104 and the surface layer 105 contains common constituent atoms of silicon, a chemical stability can be ensured at the interface between the photosensitive layer 104 and the surface layer 105.

The oxygen atoms are contained in a uniformly distributed state in the surface layer 105, by which the foregoing various properties can be improved in accordance with the increase in the content of the oxygen atoms. However, if the content is excessive, the layer quality is reduced and electrical and mechanism properties are also degraded. In view of the above, the amount of the oxygen atoms is usually from 0.001 to 90 atm%, preferably, from 1 to 90 atm% and, most suitably, from 10 to 80 atm%.

It is desired that either one of the hydrogen atoms or halogen atoms is contained also in the surface layer and the amount of the hydrogen atoms (H), the amount of the halogen atoms (X) or the sum of the amounts for the hydrogen and the halogen atoms (H+X) contained in the surface layer 105 is usually from 1 to 40 atm%, preferably, from 5 to 30 atm% and, most suitably, from 5 to 25 atm%.

The surface layer 105 has to be formed with an utmost care so as to obtain the properties as desired. That is, the state of the substance comprising silicon atoms, oxygen atoms and, further, hydrogen atoms and/or halogen atoms as the consitutuent atoms is from crystalline to amorphous state, the electrical property of the layer may vary from the conductive, to semiconductivity and insulating property and, further, the photoelectronical property of the layer may also vary from photoconductive to non-photoconductive property depending on the content of each of the consitituents atoms and other conditions of preparation. Accordingly, it is essential to select the content for each of the constituents atoms and the preparation conditions such that the surface layer 105 having desired properties depending on the purpose can be formed.

For instance, in the case of disposing the surface layer 105 mainly for improving the electrical voltage withstanding property, the amorphous material constituting the surface layer 105 is formed such that it exhibits. remarkable electrically insulating behaviors under the working conditions. Further, in the case of disposing the surface layer 105 mainly for improving the properties in the continuous repeating use or the circumstantial-resistant property, the amorphous layer constituting the surface layer 105 is formed such that the layer has a photosensitivity to some extent to the irradiated light, although the degree of the electrically insulating property is somewhat moderated.

In this invention, the thickness of the surface layer is also one of the important factors for effectively attaining the purpose of this invention and it is properly determined depending on the desired purposes. It is, however, also necessary that the layer thickness is determined in view of relative and organic relationships in accordance with the amounts of the oxygen atoms, halogen atoms and hydrogen atoms contained in the layer or the properties required for the surface layer. Further, it should be determined also in economical point of view such as productivity or mass productivity. In view of the above, the thickness of the surface layer is usually from $3\times10^{-3}$ to $30\mu$, preferably, from $4\times10^{-3}$ to $20\mu$ and, most preferably, from $5\times10^{-3}$ to $10\mu$.

The second embodiment for the surface layer 105 comprises a-Si containing at least one of the elements selected from oxygen atoms (O), carbon atoms (C) and nitrogen (N) and, preferably, at least one of the elements of hydrogen atoms (H) and halogen atoms (X) (hereinafter referred to as "a-Si(O, C.N)(H, X)"), and it provides a function of reducing the reflection of the incident light at the free surface 104 of the light receiving member and increasing the transmission rate, as well as a function of improving various properties such as mosture proofness, property for continuous repeating use, electrical voltage withstanding property, circumstantial-resistant property and durability of the light receiving member.

In this case, it is necessary to constitute such that the optical band gap Eopt possessed by the surface layer and the optical band gap Eopt possessed by the photosensitive layer 104 directly disposed with the surface layer are matched at the interface between the surface layer 105 and the photosensitive layer 104, or such optical band gaps are matched to such an extent as capable of substantially preventing the reflection of the incident light at the interface between the surface layer 105 and the photosensitive layer 104.

Further, in addition to the conditions as described above, it is desirable to constitute such that the optical band gap Eopt possessed by the surface layer is sufficiently larger at the end of the surface layer 105 on the side of the free surface for ensuring a sufficient amount of the incident light reaching the photosensitive layer 104 disposed below the surface layer. Then, in the case of adapting the optical band gaps at the interface between the surface layer 105 and the photosensitive layer 104, as well as making the optical band gap Eopt sufficiently larger at the end of the surface layer on the side of the free surfce, the optical band gap possessed by the surface layer is continuously varied in the direction of the thickness of the surface layer.

The value of the optical band gap Eopt of the surface layer in the direction of the layer thickness is controlled by controlling, the content of at least one of the elements selected from the oxygen atoms (O), carbon atoms (C) and nitrogen atoms (N) as the atoms for adjusting the optical band gaps contained in the surface layer is controlled.

Specifically, the content of at least one of the elements selected from oxygen atoms (O), carbon atoms (C) and nitrogen atoms (N) (hereinafter referred to as "atoms (O, C, N)") is adjusted nearly or equal to zero at the end of the photosensitive layer in adjacent with the surface layer.

Then, the amount of the atoms (O. C. N) is continuously increased from the end of the surface layer on the side of the photosensitive layer to the end on the side of the free surface and a sufficient amount of atoms (O, C, N) to prevent the reflection of the incident light at the free surface is contained near the end on the side of the free surface. Hereinafter, several typical examples for the distributed state of the atoms (O, C, N) in the surface layer are explained referring to FIGS. 16 through 18, but this invention is no way limited only to these embodiments.

Figure 16:
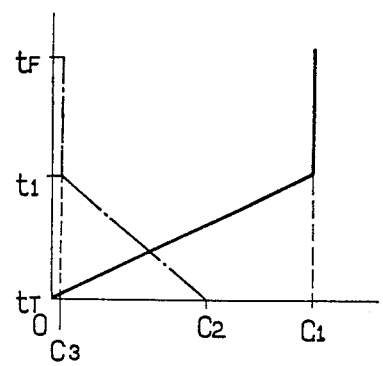
FIGS. 16 through 18 are views illustrating the distribution state, in the direction of the layer thickness, of at least one of the elements selected from oxygen atoms, carbon atoms and nitrogen atoms in the surface layer according to this invention, in which the ordinate represents the thickness of the light receiving layer and the abscissa represents the distribution concentration for each of the atoms.
Figure 17:
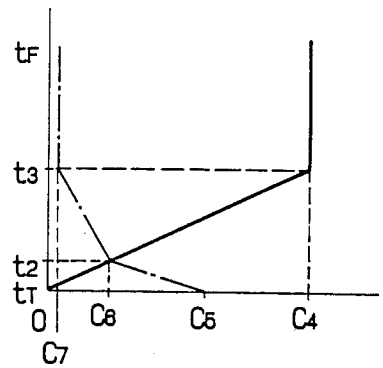
Figure 18:
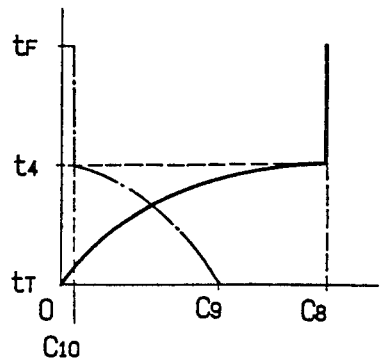

In FIGS. 16 through 18, the abscissa represents the distribution density C of the atoms (O, C, N) and silicon atoms and the ordinate represents the thickness t of the surface layer, in which $t_T$ is the position for the interface between the photosensitive layer and the surface layer, $t_F$ is a position for the free surface, the solid line represents the variation in the distribution density of the atoms (O, C, N) and the broken line shows the variation in the distribution density of the silicon atoms (Si).

FIG. 16 shows a first typical embodiment for the distribution state of the atoms (O, C, N) and the silicon atoms (Si) contained in the surface layer in the direction of the layer thickness. In this embodiment, the distribution density C of the atoms (O, C, N) is increased till the density is increased from zero to a density $C_1$ from the interface position $t_T$ to the position $t_1$ linearly. While on the other hand, the distribution density of the silicon atoms is decreased linearly from a density $C_2$ to a density $C_3$ from the position $t_1$ to the position $t_F$. The distribution density C for the atoms (O, C, N) and the silicon atoms are kept at constant density $C_1$ and density $C_3$ respectively.

In the embodiment shown in FIG. 17, the distribution density C of the atoms (O, C, N) is increased linearly from the density zero to a density $C_4$ from the interface position $t_T$ to the position $t_3$, while it is kept at a constant density $C_4$ from the position $t_3$ to the position $t_F$. While on the other hand, the distribution density C of the silicon atoms is decreased linearly from a density $C_5$ to a density $C_6$ from the position $t_T$ to the position $t_2$, decreased linearly from the density $C_6$ to a density $C_7$ from the position $t_2$ to the position $t_3$, and kept at the constant density $C_7$ from the position $t_3$ to the position $t_F$. In the case where the density of the silicon atoms is high at the initial stage of forming the surface layer, the film forming rate is increased. In this case, the film forming rate can be compensated by decreasing the distribution density of the silicon atoms in the two steps as in this embodiment.

In the embodiment shown in FIG. 18, the distribution density of the atoms (O, C, N) is continuously increased from zero to a density $C_8$ from the position $t_T$ to the position $t_4$, while the distribution density C of the silicon atoms (Si) is continuously decreased from a density $C_9$ to a density $C_{10}$. The distribution density of the atoms (O, C, N) and the distribution density of the silicon atoms (Si) are kept at a constant density $C_8$ and a constant density $C_{10}$ respectively from the position $t_4$ to the position $t_F$. In the case of continuously increasing the distribution density of the atoms (O, C, N) gradually as in this embodiment, the variation coefficient of the reflective rate in the direction of the layer thickness of the surface layer can be made substantially constant.

As shown in FIGS. 16 through 18, in the surface layer of the light receiving member according to this invention, it is desired to dispose a layer region in which the distribution density of the atoms (O, C, N) is made substantially zero at the end of the surface layer on the side of the photosensitive layer, increased continuously toward the free surface and made relatively high at the end of the surface layer on the side of the free surface. Then, the thickness of the layer region in this case is usually made greater than 0.1 $\mu$m for providing a function as the reflection preventive layer and a function as the protecting layer.

It is desired that at least one of the hydrogen atoms and the halogen atoms are contained also in the surface layer, in which the amount of the hydrogen atom (H), the amount of the halogen atoms (X) or the sum of the hydrogen atoms and the halogen atoms (H+X) are usually from 1 to 40 atm%, preferably, from 5 to 30 atm%, and, most suitably, from 5 to 25 atm%.

Further, in this invention, the thickness of the surface layer is also one of the most important factors for effectively attaining the purpose of the invention, which is properly determined depending on the desired purposes. It is required that the layer thickness is determined in view of the relative and organic relationship in accordance with the amount of the oxygen atoms, carbon atoms, nitrogen atoms, halogen atoms and hydrogen atom contained in the surface layer or the properties required for the surface layer. Further, it should be determined also from the economical point of view such as productivity and mass productivity. In view of the above, the thickness of the surface layer is usually from $3\times10^{-3}$ to $30\mu$, preferably, from $4\times10^{-3}$ to $20\mu$ and, particularly preferably, from $5\times10^{-3}$ to $10\mu$.

The third embodiment of the surface layer 105 provides a function of reducing the reflection and increasing the transmission rate at the free surface 104 of the light receiving layer, that is, the reflection preventive function, as well as the function of improving various properties such as the moisture proofness, the property for continuous repeating use, electrical voltage withstanding property, circumstantial resistance and durability of the light receiving member.

Further, the material for forming the surface layer is required to satisfy various conditions in that it can provide the excellent reflection preventive function for the layer constituted therewith, and a function of improving the various properties as described above, as well as those conditions in that it does not give undesired effects on the photoconductivity of the light receiving member, provides an adequate electronic photographic property, for example, an electric resistance over a certain level, provide an excellent solvent resistance in the case of using the liquid developing process and it does not reduce the various properties of the first layer already formed. Those materials that can satisfy such various conditions and can be used effectively include, for example, at least one of materials selected from inorganic fluorides, inorganic oxides and inorganic sulfides such as $MgF_2$, $Al_2O_3$, $ZrO_2$, $TiO_2$, $ZnS$, $CeO_2$, $CeF_3$, $Ta_2O_5$, $AlF_3$ and $NaF$.

Further, for effectively preventing the reflection prevention, it is desired to selectively use those materials capable of satisfying the conditions represented by the equation:

$$n = \sqrt{n_a}$$

where n represents the refractive index of the material for forming the surface layer and $n_a$ represents the refractive index of the layer constituting the photosensitive layer laminated directly to the surface layer.

Several examples of the refractive indexes of inorganic fluorides, inorganic oxides and inorganic sulfide or the mixtures thereof as described above will now be referred to. The refractive index is varied somewhat depending on the kinds of the layer to be prepared, conditions and the like. Numerical values in the parentheses represent the refractive index. $ZrO_2$ (2.00), $TiO_2$ (2.26), $ZrO_2TiO_2=6/1$ (2.08), $TiO_2/ZrO_2=3/1$ (2.20), $GeO_2$ (2.23), $ZnS$ (2.24), $Al_2O_3$ (1.63), $CeF_3$ (1.60), $Al_2O_3/ZrO_2=1/1$ (1.66), $MgF_2$ (1.38)

Further, it is desirable that the thickness d of the surface layer can satisfy the conditions expressed by the following equation:

$$d = (\lambda/4n)m \text{ (n is a positive odd number)}$$

where d represents the thickness of the surface layer, n represents the refractive index of the material constituting the surface layer and $\lambda$ represents the wavelength of the irradiated light. Specifically, in the case where the wavelength of the exposing light is within the wavelength range from the near infrared to the visible rays the thickness d of the surface layer is preferably defined as from 0.05 to 2 $\mu$m.

In the last embodiment of the surface layer 105, the surface layer is constituted as a multi-layered structure at least comprising an abrasion-resistant layer at the outermost side and the reflection preventive layer at the inside in order to overcome the problems of the interference fringe or uneven sensitivity resulted from the uneven thickness of the surface layer. That is, in the light receiving member comprising the surface layer of the multilayered structure, since a plurality of interfaces are resulted in the surface layer and the reflections at the respective interfaces are offset with each other and, accordingly, the reflection at the interface between the surface layer and the light sensitive layer can be decreased, the problem in the prior art that the reflection rate is changed due to the uneven thickness of the surface layer can be overcome.

It is of course possible to constitute the abrasion resistant layer (outermost layer) and the reflection preventive layer (inner layer) for constituting the surface layer as a single layer structure or two or more multilayered structure provided that the properties required for them can be satisfied.

For constituting the surface layer as such a multilayered structure, the optical band gaps (Eopt) of the layer constituting the abrasion-resistant layer (outermost layer) and the reflection preventive layer (inner layer) are made different. Specifically, it is adapted such that the refractive index of the abrasion-resistant layer (outermost layer), the refractive index of the reflection preventive layer (inner layer) and the refractive index of the light sensitive layer to which the surface layer is disposed directly are made different from each other.

Then, the reflection at the interface between the light sensitive layer and the surface layer can be reduced to zero by satisfying the relationship represented by the following equation:

$$n_3 = \sqrt{n_1, n_2} \text{ (where } n_1 < n_3 < n_2\text{)}$$

$$2n_3d = (\tfrac{1}{2} + m)\lambda \text{ (}m\text{ represents an integer)}$$

where $n_1$ is the refractive index of the photosensitive layer, $n_2$ is a refractive index of the abrasion-resistant layer constituting the surface layer, $n_3$ is a refractive index of the reflection preventive layer, d is a thickness of the reflection preventive layer and $\lambda$ is the wavelength of the incident light.

Although the relationship is defined as: $n_1 < n_3 < n_2$ in the embodiment described above, the relation is not always limited only thereto but it may, for example, be defined as $n_1 < n_2 < n_3$.

Further, the material for forming the surface layer is required to satisfy conditions in that it can provide the function of reducing the reflection of the incident light to the light receiving member and increasing the transmission rate, and improving various properties of the light receiving member such as moisture proofness, property for the continuous repeating use, electrical voltage withstanding property, circumstantial resistance and durability, as well as those conditions in that it does not give undesired effects on the photoconductivity of the light receiving member, provides electrophotographic property, for example, an electrical resistance over a certain level, provides an excellent solvent resistance in the case of using the liquid developing process and it does not reduce the various properties of the light sensitive layer already formed. Those materials that can safisfy such various conditions and can be used effectively include amorphous materials containing silicon atoms (Si) and at least one of the elements selected from oxygen atoms (O), carbon atoms (C) and nitrogen atoms (N) and, preferably, further at least one of hydrogen atoms (H) and halogen atoms (X) (hereinafter referred to as "a-Si(O, C, N)(H, X)"), or at least one of the elements selected from inorganic fluorides, inorganic oxides and inorganic sulfides such as $MgF_2$, $Al_2O_3$, $ZnS$, $TiO_2$, $ZrO_2CeO_2$, $CeF_3$, $AlF_3$ and $NaF$.

In the case of constituting the surface layer with an amorphous material containing silicon atoms, and at least one of the elements selected from oxygen atoms, carbon atoms or nitrogen atoms, the refractive indexes are made different by making the amount of oxygen atoms, carbon atoms or hydrogen atoms contained in the surface layer different between the abrasion-resistant layer and the reflection preventive layer. Specifically, in the case of constituting the light sensitive layer with a-SiH and the surface layer with a-SiCH, the amount of the carbon atoms contained in the abrasion-resistant layer is made greater than the amount of the carbon atoms contained in the reflection preventive layer and the refractive index $n_1$ of the light sensitive layer, the refractive index $n_3$ of the reflection preventive layer, the refractive index $n_2$ of the abrasion-resistant layer and the thickness d of the abrasion-resistant layer are made as: $n_1 \approx 2.0$, $n_2 \approx 3.5$, $n_3 \approx 2.65$ and $d \approx 755$ Å respectively. Further, by making the amount of the oxygen atoms, carbon atoms or nitrogen atoms contained in the surface layer different between the abrasion-resistant layer and the reflection preventive layer, the refractive indexes in each of the layers can be made different. Specifically, the abrasion-resistant layer can be formed with a-SiC (H, X) and the reflection preventive layer can be formed with a-SiN (N, X) or a-SiO (H, X).

At least one of the elements selected from the oxygen atoms, carbon atoms and nitrogen atoms is contained in a unformly distributed state in the abrasion-resistant layer and the reflection preventive layer constituting the surface layer. The foregoing various properties can be improved along with the increase in the amount of these atoms contained. However, if the amount is excessive, the layer quality is lowered and the electrical and mechanical properties are also degraded. In view of the above, the amount of these atoms contained in the surface layer is defined as usually from 0.001 to 90 atm%, preferably, from 1 to 90 atm% and, most suitably, from 10 to 80 atm%. Further, it is desirable that at least one of the hydrogen atoms and halogen atoms is contained in the surface layer, in which the amount of the hydrogen atoms (H), the amount of the halogen atoms (X) or the sum of the amounts of the hydrogen atoms and the halogen atoms (H+X) contained in the surface layer is usually from 1 to 40 atm%, preferably, from 5 to 30 atm% and, most suitably, from 5 to 25 atm%.

Furthermore, in the case of constituting the surface layer with at least one of the compounds selected from the inorganic fluorides, inorganic oxides and inorganic sulfides, they are selectively used such that the refractive indexes in each of the light sensitive layer, the abrasion-resistant layer and the reflection preventive layer are different and the foregoing conditions can be satisfied while considering the refractive indexes for each of the inorganic compounds exemplified above and the mixture thereof. Numerical values in the parentheses represent the refractive indexes of the inorganic compounds and the mixtures thereof. $ZrO_2$ (2.00), $TiO_2$ (2.26), $ZrO_2/TiO_2 = 6/1$ (2.09), $TiO_2/ZrO_2 = 3/1$ (2.20), $GeO_2$ (2.23), $ZnS$ (2.24), $Al_2O_3$ (1.63), $GeF_3$ (1.60), $Al_2O_3/ZrO_2 = 1/1$ (1.68), $MgF_2$ (1.38). These refractive indexes may of course vary somewhat depending on the kind of the layer prepared and the preparing conditions.

Furthermore, the thickness of the surface layer is one of the important factors for effectively attaining the purpose of this invention and the thickness is properly determined depending on the desired purposes. It is required that the thickness be determined while considering the relative and organic relationships depending on the amount of the oxygen atoms, carbon atoms, nitrogen atoms, halogen atoms and hydrogen atoms contained in the layer or the properties required for the surface layer. Further, the thickness has to be determined also from economical point of view such as the productivity and the mass productivity. In view of the above, the thickness of the surface layer is usually from $3 \times 10^{-3}$ to $30\mu$, more preferably, from $4 \times 10^{-3}$ to $20\mu$ and, most preferably, $5 \times 10^{-3}$ to $10\mu$.

FIG. 1(C) is a schematic view for illustrating the typical layer structure of the light receiving member that embodies the third aspect of this invention, in which are shown a light receiving member 100, a support 101, a free surface 103, a light sensitive layer 104' and a surface layer 105'.

As shown in FIG. 1(C), the light receiving member that embodies the third aspect of this invention is identical with the light receiving member illustrated in FIG. 1(B) as described above in that it comprises on the support 101 a light receiving layer having a light sensitive layer and a surface layer. Of course, the support 101 is identical with that shown in FIGS. 1(A) and (B), but the constituent materials for the light sensitive layer 104' and the surface layer 105' are different from those for the light sensitive layer 104 and the surface layer 105' described above. Explanation will then be made to the light sensitive layer 104' and the surface layer 105'.

Light sensitive layer 104'

The photosensitive layer 104' is a layer disposed on the support 101 and it comprises an amorphous material containing silicon atoms and at least one of the elements selected from oxygen atoms, carbon atoms and nitrogen atoms and, further preferably, containing either one of hydrogen atoms or halogen atoms (hereinafter referred to as "a-Si(O, C, N) (H, X)") and it further contains, as required, a substance for controlling the conductivity. The light sensitive layer 104' may have a multi-layered structure and, particularly preferably, it comprises a charge injection inhibition layer containing a substance for controlling the conductivity as one of the constituent layers and/or a barrier layer as one of the constituent layers.

The halogen atoms and the content thereof that can be incorporated into the light sensitive layer 104' are the same as those in the case of the light receiving layer 102 and the light sensitive layer 104 as described above. Further, the amount for at least one of the elements selected from oxygen atoms, carbon atoms and nitrogen atoms that can be contained in the light sensitive layer 104' (hereinafter referred to as "atoms (O, C, N)") and the distribution state of the atoms (O, C, N) are identical with the case in the light receiving layer 102 as described above. That is, the atoms (O, C, N) may be contained uniformly in the entire or partial region layer of the light sensitive layer 104' or, alternatively, they may be contained not uniformly to the entire or a partial layer region of the light sensitive layer 104', specifically, as shown in FIGS. 7 through 16 for instance.

Further, the amount of the substance for controlling the conductivity that can be incorporated into the light sensitive layer 104', that is, the amount of the group III atoms or group V atoms, as well as the distribution state thereof are identical as those in the case of the light receiving layer 102 and the light sensitive layer 104.

Furthermore, a charge injection inhibition layer containing the group III atoms or group V atoms at a high density and/or a barrier layer comprising an electrically insulating material can also be disposed to the light sensitive layer 104' on the side of the support in the same way as in the light receiving layer 102 shown in FIG. 1(A) and the light sensitive layer 104 shown in FIG. 1(B).

Surface layer 105'

The surface layer 105' is a layer disposed on the light sensitive layer 104' as described above and the surface layer 105' can generally be divided into the following four types.

The first embodiment comprises an amorphous silicon containing at least one of the elements selected from oxygen atoms, carbon atoms or nitrogen atoms not contained in the first layer in a uniformly distributed state (hereinafter referred to as "a-Si (O, C, N)(H, X)"). The surface layer 105' is disposed for improving the moisture-proofness property for continuous repeating use, electrical voltage withstanding property, circumstantial resistance and durability. These purposes can be attained by incorporating at least one of the oxygen atoms, carbon atoms or nitrogen atoms into the amorphous material constituting the surface layer.

Since each of the amorphous materials constituting the surface layer 105' and the light sensitive layer 104' comprises common constituent atoms of silicon, a chemical stability can be ensured at the interface between the surface layer 105' and the light sensitive layer 104'.

The oxygen atoms, carbon atoms and nitrogen atoms are contained in a uniformly distributed state in the surface layer 105', in which the various properties as described above are improved along with the increase in the amount of these atoms contained. However, if the amount is excessive, the layer quality is lowered and electrical and mechanical properties are also degraded. In view of the above, the content of the atoms is defined usually from 0.001 to 90 atm%, preferably, from 1 to 90 atm% and, most suitably, from 10 to 80 atm%.

It is desired that at least one of the hydrogen atoms and halogen atoms is contained also in the surface layer 105', in which the amount of the hydrogen atoms (H), the amount of the halogen atoms (X) or the sum of the amounts of the hydrogen atoms and the halogen atoms (H+X) contained in the surface layer 105' is usually from 1 to 40 atm%, preferably, from 5 to 30 atm% and, most suitably, from 5 to 25 atm%.

The surface layer has to be formed with an utmost care so that properties an be obtained as desired. That is, since the material comprising silicon atoms and at least one of the elements selected from oxygen atoms, carbon atoms and nitrogen atom and, further, hydrogen atoms and/or halogen atoms as the constituent atoms varies from the crystalline to amorphous state in the form, from the conductive to semiconductive or insulating property in the electrical property and from the photoconductive to non-photoconductive property in the photoconductive property respectively. Accordingly, it is important to select the content for each of the constituent atoms and the preparing conditions so that a surface layer having desired properties depending on the purposes can be formed.

For instance, in the case of disposing the surface layer mainly for improving the electrical voltage withstanding property, the amorphour material constituting the surface layer 105' is formed as showing remarkable electrical insulating behaviors under the working conditions. Further, in the case of disposing the surface layer mainly for improving the property of the continuous repeating use or the circumstantial resistance the amorphous material constituting the surface layer 105' is formed so as to provide a certain level of photosensitivity to the irradiated light, while the degree of the electrical insulating property described above is moderated to some extent.

Furthermore, the thickness of the surface layer 105' is also one of the important factors for effectively attaining the purpose of this invention and it is properly determined depending on the desired purposes. It should also be determined under the relative and organic relationship in accordance with the amount of the oxygen atoms, carbon atoms, nitrogen atoms, halogen atoms and hydrogen atoms or the properties required for the surface layer. In view of the above, the thickness for the surface layer is usually from $3 \times 10^{-5}$ to $30\mu$, more preferably, from $4 \times 10^{-5}$ to $20\mu$ and, particularly preferably, from $5 \times 10^{-5}$ to $10\mu$.

The second embodiment of the surface layer 105' comprises an a-Si containing at least one of the elements selected from oxygen atoms (O), carbon atoms (C) and nitrogen atoms (N) and, further preferably, at least one of the elements selected from hydrogen atoms (H) and halogen atoms (X) (hereinafter referred to as "a-Si (O, C, N) (H, X)"), which provides a function of decreasing the incident light and increasing the transmission rate at the free surface 103 of the various properties such as receiving member, as well as a function of improving the moisture proofness, property for continuous repeating use, electrical voltage withstanding property, circumstantial resistance and durability of the light receiving member.

In this case, it has to be constituted such that the optical band gap Eopt possessed by the surface layer 105 and the optical band gap Eopt possessed by the light sensitive layer 104' to which the surface layer is directly disposed are matched with each other at the interface between the surface layer 105' and the light sensitive layer 104', or the optical band gaps are matched to such an extent as the reflection of the incident light at the interface between the surface layer 105' and the light sensitive layer 104' can be prevented substantially.

Furthermore, in addition to the conditions described above, it is desired to constitute such that the optical band gap Eopt possessed by the surface layer is made sufficiently greater at the end of the surface layer 105' on the side of the free surface for sufficiently insuring the amount of the incident light reaching the light sensitive layer 104' disposed below the surface layer at the end of the surface layer 105' on the side of the free surface. Then, it is constituted such that the optical band gap Eopt is matched at the interface between the surface layer 105' and the light sensitive layer 104', as well as the optical band gap varies continuously in the direction of the thickness of the surface layer in the case of adapting the optical band gap Eopt to be sufficiently greater at the end of the surface layer on the side of the free surface.

The value of the optical band gap Eopt of the surface layer in the direction of the layer thickness is controlled as described above by controlling the amount of at least one element selected from oxygen atoms (O), carbon atoms (C) and nitrogen atoms (N) to be contained in the surface layer as the adjusting atoms for the optical band gap.

Specifically, in the case where at least one of the elements selected from the oxygen atoms (O), the carbon atoms (C) and the nitrogen atoms (N) (hereinafter referred to as "atoms (O, C, N)") are not contained at the end of the light sensitive layer 104' on the side in adjacent with the surface layer 105', the content of the atoms (O, C, N) at the end of the surface layer in adjacent with the light sensitive layer is made equal or near to zero. While on the other hand, in the case that the atoms (O, C, N) are contained at the end of the light sensitive layer 104' in adjacent with the surface layer 105', the content of the atoms (O, C, N) at the end of the surface layer in adjacent with the light sensitive layer and the content of the atoms (O, C, N) at the end of the light sensitive layer on the side in adjacent with with the surface layer are made equal or substantially equal with each other. Then, the amount of the atoms (O, C, N) is continuously increased from the end of the surface layer on the side of the light sensitive layer to the end on the side of the surface layer, and a sufficient amount of atoms (O, C, N) to prevent the reflection of the incident light at the free surface is contained near the end on the side of the free surface. Several examples of the distribution state of the atoms (O, C, N) in the surface layer will now be explained referring to FIGS. 16 through 18, but this invention is no way limited only to these examples.

In FIGS. 16 through 18, the abscissa represents the distribution density C of the atoms (O, C, N) and the silicon atoms, while the ordinate represents the thickness t of the surface layer, in which, $t_T$ is an interface position between the light sensitive layer and the surface layer, $t_F$ is a free surface position, the solid line represents the variation in the distribution density of the atoms (O, C, N) and the broken line shows the variation on the distribution density of the silicon atoms (Si).

FIG. 16 shows a first typical embodiment of the distribution state of the atoms (O, C, N) and the silicon atoms (Si) contained in the surface layer in the direction of the layer thickness. In this embodiment, the distribution density C of the atoms (O, C, N) is increased linearly from zero to a density $C_1$ from the interface position $t_T$ to the position $t_1$, while the distribution density of the silicon atoms is decreased linearly from a density $C_1$ to a density $C_3$. From the position $t_1$ to the position $t_F$, the distribution density C for the atoms (O, C, N) and the silicon atoms are kept at constant density $C_1$ and density $C_3$ respectively.

In the embodiment shown in FIG. 17, the distribution density C for the atoms (O, C, N) is increased linearly from the density zero to a density $C_4$ from the interface position $t_T$ to the position $t_3$ and it is kept at a constant density $C_4$ from the position $t_3$ to the position $t_F$. While on the other hand, the distribution density C of the silicon atoms is increased linearly from a density $C_5$ to a density $C_6$ from the position $t_T$ to the position $t_2$, decreased linearly from the density $C_6$ to a density $C_7$ from the position $t_2$ to the position $t_3$ and kept at a constant density $C_7$ from the position $t_3$ to the position $t_F$. In the case where the density of the silicon atoms is higher at the initial stage of forming the surface layer, the film-forming speed is increased. In this case, the film-forming speed can be compensated by decreasing the distribution density for the silicon atoms in two steps as in this embodiment.

In the embodiment shown in FIG. 18, the distribution density of the atoms (O, C, N) is continuously increased from the density zero to a density $C_8$, while the distribution density C of the silicon atoms (Si) is continuously decreased from a density of $C_9$ to the density $C_{10}$ from the position $t_T$ to the position $t_4$. The distribution density of the atoms (O, C, N) and the distribution density of the silicon atoms (Si) kept at constant density $c_8$ and the density $C_{10}$ respectively from the position $t_4$ to the position $t_F$. As in this embodiment, in the case of continuously increasing the distribution density of the atoms (O, C, N) gradually, the variation coefficient for the refractive index in the thickness in the direction of the thickness of the surface layer can be made substantially constant.

In the surface layer 105', it is desirable as shown in FIGS. 16 through 18 that the distribution density of the atoms (O, C, N) is substantially reduced to zero at the end of the surface layer on the side of light sensitive layer, which is continuously increased toward the free surface, and a region layer at a relatively high density is disposed at the end of the surface layer on the side of the free surface. Then, the thickness of the layer region in this case is usually defined so as to be greater than 0.1 μm so as to provide a function as a reflection preventive layer and the function as the protecting layer.

It is desired that at least one of hydrogen atoms and halogen atoms is contained also in the surface layer, in which the amount of the hydrogen atoms (H), the amount of the halogen atoms (X) or the sum of the amounts for the hydrogen atoms and the halogen atoms (H+X) is usually from the 1 to 40 atm%, preferably, 5 to 30 atm% and, most suitably, 5 to 25 atm%.

The thickness of the surface layer 105' is also one of the important factors for effectively attaining the purpose of this invention and it is properly determined depending on the desired purposes. It is also necessary that the thickness is defined under relative and organic relationships depending on the amount of the oxygen atoms, carbon atoms, nitrogen atoms, halogen atoms and hydrogen atoms contained in the layer or depending on the properties required for the surface layer. Further, it should be determined also from the economical point of view such as the productivity and the mass productivity.

In view of the above, the thickness for the surface layer is usually from $3 \times 10^{-3}$ to 30μ, more preferably, from $4 \times 10^{-3}$ to 20μ and, particularly preferably, from $5 \times 10^{-3}$ to 10μ.

As the third and the fourth embodiment as the surface layer 105', the third and the fourth embodiment of the surface layer 105 in the photoreceiving member shown in FIG. 1(B) can be used as they are. That is, the third embodiment has a surface layer having a function of preventing reflection and the fourth embodiment provides a surface layer of a multi-layered structure at least comprising an abrasion-resistant layer at the outermost side and a reflection preventive layer to the inside.

By adapting the layer structure of the light receiving member according to this invention as described above, all of the various problems in the light receiving members comprising a light receiving layer constituted with amorphous silicon as described above can be overcome. Particularly, in a case of using the coherent laser beams as an optical source, it is possible to remarkably prevent the occurrence of the interference fringe pattern upon forming images due to the interference phenomenon thereby enabling to obtain reproduced image at high quality.

Further, since the light receiving member according to this invention has a high photosensitivity in the entire visible ray region and, further, since it is excellent in the photosensitive property on the side of the longer wavelength, it is suitable for the matching property, particularly, with a semiconductor laser, exhibits a rapid optical response and shows more excellent electrical, optical and electroconductive natures, electrical voltage withstand property and resistance to working circumstances.

Particularly, in the case of applying the light receiving member to the electrophotography, it gives no undesired effects at all of the residual potential to the image formation, stable electrical properties high sensitivity and high S/N ratio, excellent light fastness and property for repeating use, high image density and clear half tone and can provide high quality image with high resolution power respeatingly.

The method of forming the light receiving layer according to this invention will now be explained.

The amorphous material constituting the light receiving layer in this invention is prepared by vacuum depositing method utilizing the discharging phenomena such as glow discharging, sputtering and ion plating processes. These production processes are properly used selectively depending on the factors such as the manufacturing conditions, the installation cost required, production scale and properties required for the light receiving members to be prepared. A glow discharging process or sputtering process is suitable since the control for the condition upon preparing the light receiving members having desired properties are relatively easy and carbon atoms and hydrogen atoms can be introduced easily together with silicon atoms. The glow discharging process and the sputtering process may be used together in one identical system.

Basically, when a layer constituted with a-Si (H, X) is formed for example, by the glow discharging process, gaseous starting material for supplying Si capable of supplying silicon atoms (Si) are introduced together with gaseous starting material for introducing hydrogen atoms (H) and/or halogen atoms (X) into a deposition chamber the inside pressure of which can be reduced, glow discharge is generated in the deposition chamber and a layer composed of a-Si (H,X) is formed on the surface of a predetermined support disposed previously at a predetermined position.

The gaseous starting material for supplying Si can include gaseous or gasifiable silicon hydrides (silanes) such as $SiH_4$, $Si_2H_6$, $Si_3H_8$, $Si_4H_{10}$, etc., $SiH_4$ and $Si_2H_6$ being particularly preferred in view of the easy layer forming work and the good efficiency for the supply of Si.

Further, various halogen compounds can be mentioned as the gaseous starting material for introducing the halogen atoms and gaseous or gasifiable halogen compounds, for example, gaseous halogen, halides, inter-halogen compounds and halogen-substituted silane derivatives are preferred. Specifically, they can include halogen gas such as of fluorine, chlorine, bromine and iodine, interhanogen compounds such as BrF, ClF, $ClF_3$, $BrF_2$, $BrF_3$, $IF_7$, ICl, IBr, etc., and silicon halides such as $SiF_4$, $Si_2H_6$, $SiCl_4$, $SiBr_4$. The use of the gaseous or gasifiable silicon halide as described above is particularly advantageous since the layer constituted with halogen atom-containing a-Si can be formed with no additional use of the gaseous starting material for supplying Si.

The gaseous starting material usable for supplying hydrogen atoms can include those gaseous or gasifiable materials, for example, hydrogen as, halides such as HF, HCl, HBr and HI, silicon hydrides such as $SiH_4$, $Si_2H_6$, $Si_3H_8$ and $Si_4H_{10}$ or halogen-substituted silicon hydrides such as $SiH_2F_2$, $SiH_2I_2$, $SiH_2Cl_2$, $SiHCl_3$. $SiH_2Br_2$, $SiHBr_3$. The use of these gaseous starting material is advantageous since the content of the hydrogen atoms (H), which are extremely effective in view of the control for the electrical or photoelectronic properties, can be controlled with ease. Then, the use of the hydogen halide or the halogen-substituted silicon hydride as described above is particularly advantageous since the hydrogen atoms (H) are also introduced together with the introduction of the halogen atoms.

Further, the amount of the hydrogen atoms (H) and-/or halogen atoms (X) contained in the a-Si layer is controlled, for example, by controlling the temperature of the support, the amount of introducing the starting material into the deposition chamber used for introducing the hydrogen atoms (H) and/or halogen atoms (X) and the electrical power for discharging.

In the case of forming layer comprising a-Si(H, X) by means of the reactive sputtering process or ion plating process, for example, by the sputtering process, the halogen atoms are introduced by introducing gaseous halogen compounds or halogen atom-containing silicon compounds into a deposition chamber thereby forming a plasma atmosphere with the gas.

Further, in the case of introducing the hydrogen atoms, the gaseous starting material for introducing the hydrogen atoms, for example, $H_2$ or gaseous silanes as described above are introduced into the sputtering deposition chamber thereby forming a plasma atmosphere with the gas.

For instance, in the case of the reactive sputtering process, a layer comprising a-Si (H, X) is formed on a support by using a Si target and by introducing a halogen atom introducing gas and $H_2$ gas together with an inert gas such as He or Ar as required into a deposition chamber thereby forming a plasma atmosphere and then sputtering the Si target. In the case of forming a layer constituted with an amorphous material composed of a-Si (H, X) further incorporated with group III atoms or group V atoms, nitrogen atoms, oxygen atoms or carbon atoms by using a glow discharging, sputtering or ion plating process, starting material for introducing group III or group V atoms, starting material for introducing nitrogen gas, starting material for introducing oxygen gas or starting material for introducing carbon atoms is used together with the starting material for forming a-Si (H,X) upon forming the a-Si (H, X) layer while controlling the amount of them in the layer to be formed.

For instance, in the case of forming a layer or layer region constituted with a-Si (H, X) containing the group III or group V atoms by using the glow discharging, sputtering or ion plating process, the starting material for introducing the group III or group V atoms are used together with the starting material for forming a-Si (H, X) upon forming the layer constituted with a-Si (H, X) as described above and they are incorporated while controlling the amount of them into the layer to be formed.

Referring specifically to the boron atom introducing materials as the starting material for introducing the group III atoms, they can include boron hydrides such as $B_2H_6$, $B_4H_{10}$, $B_5H_9$, $B_5H_{11}$, $B_6H_{10}$, $B_6H_{12}$ and $B_6H_{14}$ and boron halides such as $BF_3$, $BCl_3$ and $BBr_3$. In addition, $AlCl_3$, $CaCl_3$, $Ga(CH_3)_2$, $InCl_3$, $TlCl_3$ and the like can also be mentioned.

Referring to the starting material for introducing the group V atoms and, specifically to, the phosphor atom introducing materials, they can include, for example, phosphor hydrides such as $PH_3$ and $P_2H_6$ and phosphor halide such as $PH_4I$, $PF_3$, $PF_5$, $PCl_3$, $PCl_5$, $PBr_3$, $PBr_5$ and $PI_3$. In addition, $AsH_3$, $AsF_5$, $AsCl_3$, $AsBr_3$, $AsF_3$, $SbH_3$, $SbF_3$, $SbF_5SbCl_3$, $SbCl_5$, $BiH_3$, $SiCl_3$ and $BiBr_3$ can also be mentioned to as the effective starting material for introducing the group V atoms.

In the case of using the glow discharging process for forming the layer or layer region containing oxygen atoms, starting material for introducing the oxygen atoms is added to those selected from the group of the starting material as desired above for forming the light receiving layer. As the starting material for introducing the oxygen atoms, most of those gaseous or gasifiable materials can be used that comprise at least oxygen atoms as the constituent atoms.

For instance, it is possible to use a mixture of gaseous starting material comprising silicon atoms (Si) as the constituent atoms, gaseous starting material comprising oxygen atoms (O) as the constituent atom and, as required, gaseous starting material comprising hydrogen atoms (H) and/or halogen atoms (X) as the constituent atoms in a desired mixing ratio, a mixture of gaseous starting material comprising silicon atoms (Si) as the constituent atoms and gaseous starting material comprising oxygen atoms (O) and hydrogen atoms (H) as the constituent atoms in a desired mixing ratio, or a mixture of gaseous starting material comprising silicon atoms (Si) as the constituent atoms and gaseous starting material comprising silicon atoms (Si), oxygen atoms (O) and hydrogen atoms (H) as the constituent atoms.

Further, it is also possible to use a mixture of gaseous starting material comprising silicon atoms (Si) and hydrogen atoms (H) as the constituent atoms and gaseous starting material comprising oxygen atoms (O) as the constituent atoms.

Specifically, there can be mentioned, for example, oxygen ($O_2$), ozone ($O_3$), nitrogen monoxide (NO), nitrogen dioxide ($NO_2$), dinitrogen oxide ($N_2O$), dinitrogen trioxide ($N_2O_3$), dinitrogen tetraoxide ($N_2O_4$), dinitrogen pentoxide ($N_2O_5$), nitrogen trioxide ($NO_3$), lower siloxanes comprising silicon atoms (Si), oxygen atoms (O) and hydrogen atoms (H) as the constituent atoms, for example, disiloxane ($H_3SiOSiH_3$) and trisiloxane ($H_3SiOSiH_2OSiH_3$), etc.

In the case of forming the layer or layer region containing oxygen atoms by way of the sputtering process, it may be carried out by sputtering a single crystal or polycrystalline Si wafer or $SiO_2$ wafer, or a wafer containing Si and $SiO_2$ in admixture is used as a target and sputtered in various gas atmospheres.

For instance, in the case of using the Si wafer as the target, a gaseous starting material for introducing oxygen atoms and, optionally, hydrogen atoms and/or halogen atoms is diluted as required with a dilution gas, introduced into a sputtering deposition chamber, gas plasmas with these gases are formed and the Si wafer is sputtered.

Alternatively, sputtering may be carried out in the atmosphere of a dilution gas or in a gas atmosphere containing at least hydrogen atoms (H) and/or halogen atoms (X) as constituent atoms as a sputtering gas by using individually Si and $SiO_2$ targets or a single Si and $SiO_2$ mixed target. As the gaseous starting material for introducing the oxygen atoms, the gaseous starting material for introducing the oxygen atoms shown in the examples for the glow discharging process as described above can be used as the effective gas also in the sputtering.

In the case of using the glow discharging process for forming the layer or the layer region containing the nitrogen atoms, starting material for introducing nitrogen atoms is added to the material selected as required from the starting materials for forming the light receiving layer as described above. As the starting material for introducing the nitrogen atoms, most of gaseous or gasifiable materials can be used that comprise at least nitrogen atoms as the constituent atoms.

For instance, it is possible to use a mixture of gaseous starting material comprising silicon atoms (Si) as the constituent atoms, gaseous starting material comprising nitrogen atoms (N) as the constituent atoms and, optionally, gaseous starting material comprising hydrogen atoms (H) and/or halogen atoms (X) as the constituent atoms mixed in a desired mixing ratio, or a mixture of starting gaseous material comprising silicon atoms (Si) as the constituent atoms and gaseous starting material comprising nitrogen atoms (N) and hydrogen atoms (H) as the constituent atoms also in a desired mixing ratio.

Alternatively, it is also possible to use a mixture of gaseous starting material comprising nitrogen atoms (N) as the constituent atoms gaseous starting material comprising silicon atoms (Si) and hydrogen atoms (H) as the constituent atoms.

The starting material that can be used effectively as the gaseous starting material for introducing the nitrogen atoms (N) used upon forming the layer or layer region containing nitrogen atoms can include gaseous or gasifiable nitrogen, nitrides and nitrogen compounds such as azide compounds comprising N as the constituent atoms or N and H as the constituent atoms, for example, nitrogen ($N_2$), ammonia ($NH_3$), hydrazine ($H_2NNH_2$), hydrogen azide ($HN_3$) and ammonium azide ($NH_4N_3$). In addition, nitrogen halide compounds such as nitrogen trifluoride ($F_3N$) and nitrogen tetrafluoride ($F_4N_2$) can also be mentioned in that they can also introduce halogen atoms (X) in addition to the introduction of nitrogen atoms (N).

The layer or layer region containing the nitrogen atoms may be formed through the sputtering process by using a single crystal or polycrystalline Si wafer or $Si_3N_4$ wafer or a wafer containing Si and $Si_3N_4$ in admixture as a target and sputtering them in various gas atmospheres.

In the case of using a Si wafer as a target, for instance, gaseous starting material for introducing nitrogen atoms and, as required, hydrogen atoms and/or halogen atoms is diluted optionally with a dilution gas, introduced into a sputtering deposition chamber to form as plasmas with these gases and the Si wafer is sputtered.

Alternatively, Si and $Si_3N_4$ may be used as individual targets or as a single target comprising Si and $Si_3N_4$ in admixture and then sputtered in the atmosphere of a dilution gas or in a gaseous atmosphere containing at least hydrogen atoms (H) and/or halogen atoms (X) as the constituent atoms as for the sputtering gas. As the gaseous starting material for introducing nitrogen atoms, those gaseous starting materials for introducing the nitrogen atoms described previously shown in the example of the glow discharging can be used as the effective gas also in the case of the sputtering.

The light receiving layer containing carbon atoms, for example, may be formed through the glow discharging process, by using a mixture of gaseous starting material comprising silicon atoms (Si) as the constituent atoms, gaseous starting material comprising carbon atoms (C) as the constituent atoms and, optionally, gaseous starting material comprising hydrogen atoms (H) and/or halogen atoms (X) as the constituent atoms in a desired mixing ratio, a mixture of gaseous starting material comprising silicon atoms (Si) as the constituent atoms and gaseous starting material comprising carbon atoms (C) and hydrogen atoms (H) as the constituent atoms also in a desired mixing ratio, a mixture of gaseous starting material comprising silicon atoms (Si) as the constituent atoms and gaseous starting material comprising silicon atoms (Si), carbon atoms (C) and hydrogen atoms (H) as the constituent atoms, or a mixture of gaseous starting material comprising silicon atoms (Si) and hydrogen atoms (H) as the constituent atoms and gaseous starting material comprising carbon atoms (C) as constituent atoms.

The layer or layer region constituted with a-SiC (H, X) may be formed through the sputtering process by using a single crystal or polycrystalline Si wafer, a C (graphite) wafer or a wafer containing a mixture of Si and C as a target and sputtering them in a desired gas atmosphere.

In the case of using, for example a Si wafer as a target, gaseous starting material for introducing carbon atoms, and hydrogen atoms and/or halogen atoms is introduced while being optionally diluted with a dilution gas such as Ar and He into a sputtering deposition chamber thereby forming gas plasmas with these gases and sputtering the Si wafer.

Alternatively, in the case of using Si and C as individual targets or as a single target comprising Si and C in admixture, gaseous starting material for introducing hydrogen atoms and/or halogen atoms as the sputtering gas is optionally diluted with a dilution gas, introduced into a sputtering deposition chamber thereby forming gas plasmas and sputtering is carried out. As the gaseous starting material for introducing each of the atoms used in the sputtering process, those gaseous starting materials used in the glow discharging process as described above may be used as they are.

Those gaseous starting materials that are effectively usable herein can include gaseous silicon hydrides comprising C and H as the constituent atoms, such as silanes, for example, $SiH_4$, $Si_2H_6$, $Si_3H_8$ and $Si_4H_{10}$, as well as those comprising C and H as the constituent atoms, for example, saturated hydrocarbons of 1 to 4 carbon atoms, ethylenic hydrocarbons of 2 to 4 carbon atoms and acetylenic hydrocarbons of 2 to 3 carbon atoms.

Specifically, the saturated hydrocarbons can include methane ($CH_4$), ethane ($C_2H_6$), propane ($C_3H_8$), n-butane (n-$C_4H_{10}$) and pentane ($C_5H_{12}$), the ethylenic hydrocarbons can include ethylene ($C_2H_4$), propylene ($C_3H_6$), butene-1 ($C_4H_8$), butene-2 ($C_4H_8$), isobutylene ($C_4H_8$) and pentene ($C_5H_{10}$) and the acetylenic hydrocarbons can include acetylene ($C_2H_2$), methylacetylene ($C_3H_4$) and butine ($C_4H_6$).

The gaseous starting material comprising Si, C and H as the constituent atoms can include silicided alkyls, for example, $Si(CH_3)_4$ and $Si(C_2H_5)_4$. In addition to these gaseous starting materials, $H_2$ can of course be used as the gaseous starting material for introducing H.

In the case of forming the light receiving layer according to this invention by means of the glow discharging, sputtering or ion plating process, the content of the oxygen atoms, carbon atoms, nitrogen atoms and the group III or V atoms introduced into a-Si (H, X) is controlled by controlling the gas flow rate and the ratio of the gas flow rate of the starting materials entered in the deposition chamber.

The conditions upon forming the light receiving layer, for example, the temperature of the support, the gas pressure in the deposition chamber and the electric discharging power are important factors for obtaining a light receiving member having desired properties and they are properly selected while considering the functions of the layer to be formed. Further, since these layer forming conditions may be varied depending on the kind and the amount of each of the atoms contained in the light receiving layer, the conditions have to be determined also taking the kind or the amount of the atoms to be contained into consideration.

Specifically, the temperature of the support is usually from 50° to 350° C. and, more preferably, from 50° to 250° C. The gas pressure in the deposition chamber is usually from 0.01 to 1 Torr and, particularly preferably, from 0.1 to 0.5 Torr. Further, the electrical discharging power is usually from 0.005 to 50 W/cm$^2$, more preferably, from 0.01 to 30 W/cm$^2$ and, particularly preferably, from 0.01 to 20 W/cm$^2$.

However, the actual conditions for forming the layer such as temperature of the support, discharging power and the gas pressure in the deposition chamber can not usually the determined with ease independent of each other. Accordingly, the conditions optimal to the layer formation are desirably determined based on relative and organic relationships for forming the amorphous material layer having desired properties.

By the way, it is necessary that the foregoing various conditions are kept constant upon forming the light receiving layer for unifying the distribution state of the oxygen atoms, carbon atoms, nitrogen atoms, group III or V atoms, or hydrogen atoms and/or halogen atoms to be contained in the light receiving layer according to this invention.

Further, in the case of forming a photosensitive layer comprising oxygen atoms, carbon atoms, nitrogen atoms, or group III or group V atoms contained in the light receiving layer at a desired distributed state in the direction of the layer thickness by varying their distribution densities in the direction of the layer thickness upon forming the light receiving layer in this invention, the layer is formed, for example, in the case of the glow discharging process, by properly varying the gas flow rate of gaseous starting material for introducing the oxygen atoms, carbon atoms, nitrogen atoms, or group III or group V atoms upon introducing into the deposition chamber in accordance with a desired variation coefficient while maintaining other conditions constant. Then, the gas flow rate may be varied, specifically, by gradually changing the opening degree of a predetermined needle valve disposed to the midway of the gas flow system, for example, manually or any of other means usually employed such as an externally driving motor. In this case, the variation of the flow rate may not necessarily be linear but a desired content curve may be obtained, for example, by controlling the flow rate along with a previously designed variation coefficient curve by using a microcomputer or the like.

Further, in the case of forming the light receiving layer by means of the sputtering process, a desired distributed state of the oxygen atoms, carbon atoms, nitrogen atoms or group III or group V atoms in the direction of the layer thickness may be formed with the distribution density being varied in the direction of the layer thickness by using gaseous starting material for introducing the oxygen atoms, carbon atoms, nitrogen atoms, or group III or group V atoms and varying the gas flow rate upon introducing these gases into the deposition chamber in accordance with a desired variation coefficient in the same manner as the case of using the glow discharging process.

Further, in the case of constituting the surface layer in this invention with at least one of the elements selected from the inorganic fluorides, inorganic oxides and inorganic sulfides, since it is also necessary to control the layer thickness at an optical level for forming such a surface layer, vapor deposition, sputtering, gas phase plasma, optical CVD, heat CVD process or the like may be used. These forming processes are, of course, properly selected while considering those factors such as the kind of the forming materials for the surface layer, production conditions, installation cost required and production scale.

By the way, in view of the easy operations, easy setting for the conditions and the likes, sputtering process may preferably be employed in the case of using the inorganic compounds for forming the surface layer. That is, the inorganic compound for forming the surface layer is used as a target and Ar gas is used as a sputtering gas, and the surface layer is deposited by causing glow discharging and sputtering the inorganic compounds.

PREFERRED EMBODIMENTS OF THE INVENTION

This invention will now be described more specifically while referring to examples 1 through 66 but this invention is no way limited only to these examples.

Figure 19:
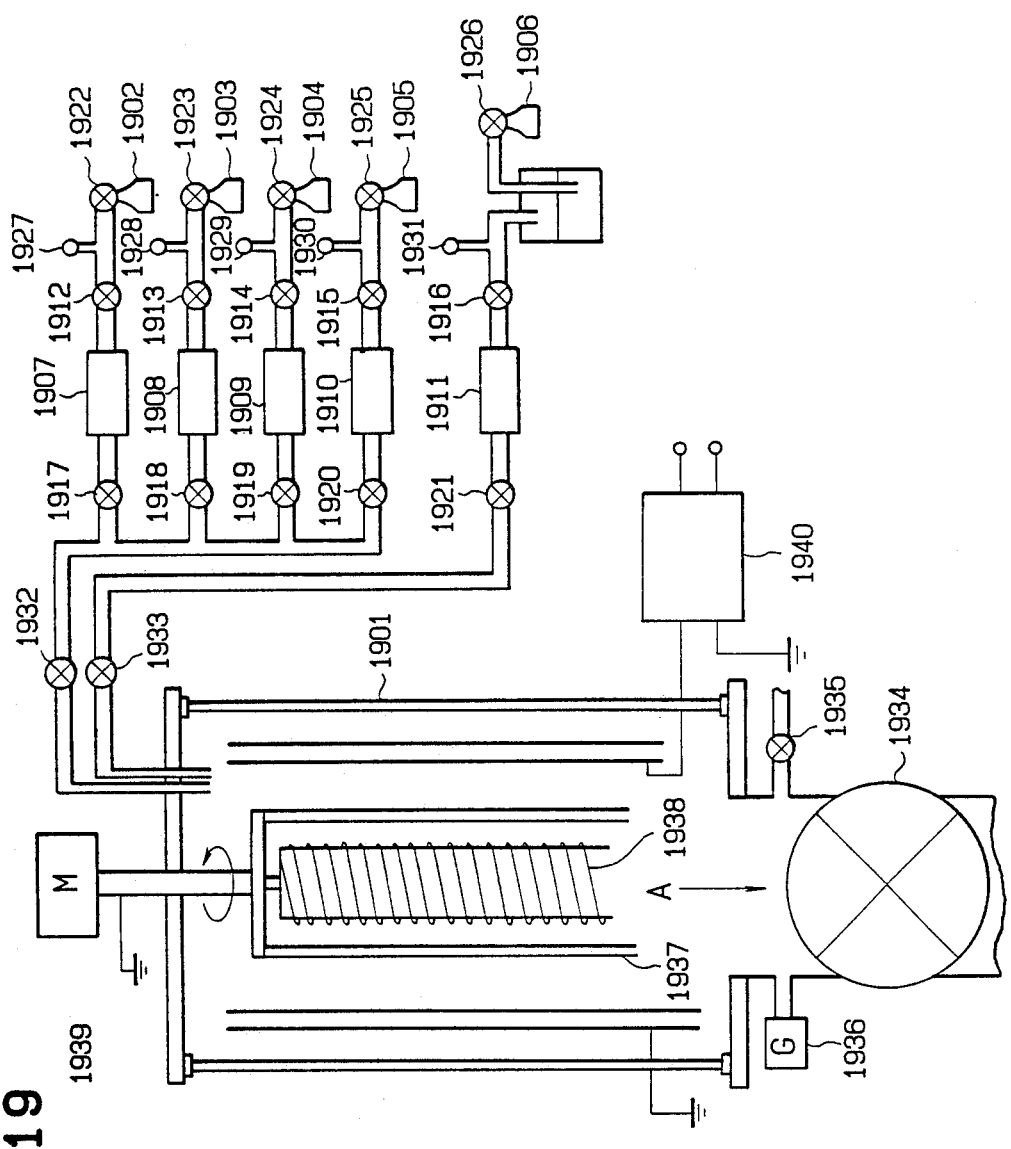
FIG. 19 is a schematic explanatory view of a fabrication device by glow discharging process as an example of the device for preparing the light receiving layer in the light receiving member according to this invention.

In each of the examples, the photosensitive layer is formed by using the glow discharging process, while the surface layer is formed by using the glow discharging or sputtering process. FIG. 19 shows a device for preparing a light receiving member according to this invention by means of the glow discharging process.

Gas reservoirs 1902, 1903, 1904, 1905 and 1906 illustrated in the figure are charged with gaseous starting materials for forming the respective layers in this invention, that is, for instance, $SiH_4$ gas (99.999% purity) in the reservoir 1902, $B_2H_6$ gas diluted with $H_2$ (99.999% purity, hereinafter simply referred to as $B_2H_6/H_2$) in the reservoir 1903, $CH_4$ gas (99.999% purity) in the reservoir 1904, $NH_3$ gas (99.999% purity) in the reservoir 1905 and $H_2$ gas (99.999% purity) in the reservoir 1906.

Prior to the entrance of these gases into a reaction chamber 1901, it is confirmed that valves 1922-1926 for the gas reservoirs 1902-1906 and a leak valve 1935 are closed and that inlet valves 1912-1916, exit valves 1917-1921, and sub-valves 1932 and 1933 are opened. Then, a main valve 1934 is at first opened to evacuate the inside of the reaction chamber 1901 and gas pipeways. Then, when the reading on a vacuum gauge 1936 reaches about $5 \times 10^{-6}$ Torr, the sub-valves 1932 and 1933, as well as the exit valves 1917-1921 are closed.

Reference is then made to an example in the case of forming a light receiving layer on a substrate cylinder 1937. $SiH_4$ gas from the gas reservoir 1902 and $B_2H_6/H_2$ gas from the gas reservoir 1903 are caused to flow into mass flow controllers 1907 and 1908 respectively by opening the valves 1922 and 1923, controlling the pressure of exit pressure gages 1927 and 1928 to 1 kg/cm² and gradually opening the inlet valves 1912 and 1913. Subsequently, the exit valves 1917 and 1918 and the sub-valve 1932 are gradually opened to enter the gases into the reaction chamber 1901. In this case, the exit valves 1017 and 1918 are adjusted so as to attain a desired value for the ratio between the $SiH_4$ gas flow rate and the $B_2H_6/H_2$ gas flow rate, and the opening of the main valve 1934 is adjusted while observing the reading on the vacuum gauge 1936 so as to obtain a desired value for the pressure inside the reaction chamber 1901. Then, after confirming that the temperature of the substrate cylinder 1937 has been set by a heater 1938 within a range from 50° to 400° C., a power source 1940 is set to a predetermined electrical power to cause glow discharging in the reaction chamber 1901 while controlling the $B_2H_6/H_2$ gas flow rate and the $SiH_4$ gas flow rate in accordance with a previously designed variation coefficient curve by using a microcomputer (not illustrated), thereby forming, at first, a photosensitive layer constituted with a-Si(H, X) containing boron atoms on the substrate cylinder 1937.

Then, a surface layer is formed on the photosensitive layer. Subsequent to the procedures as described above, $SiH_4$ gas and $CH_4$ gas, for instance, are optionally diluted with a dilution gas such as He, Ar and $H_2$ respectively, entered at a desired gas flow rates into the reaction chamber 1901 while controlling the gas flow rate for the $SiH_4$ gas and the $CH_4$ gas in accordance with a previously designed variation coefficient curve by using a microcomputer (not illustrated), by which a surface layer constituted with a Si-(H, X) containing carbon atoms is formed.

When the photosensitive layer and the surface layer are formed, the flow rates for the gaseous starting materials are controlled by using the microcomputer or the like, in which the gas pressure in the reaction chamber 1901 can be stabilized to ensure a stable film-forming conditions by using a dilution gas together with the gaseous starting materials for introducing each of the atoms.

All of the exit valves other than those required for upon forming the respective layers are of course closed. Further, upon forming the respective layers, the inside of the system is once evacuated to a high vacuum degree as required by closing the exit valves 1917-1921 while opening the sub-valves 1932 and 1933 and fully opening the main valve 1934 for avoiding that the gases having been used for forming the previous layers are left in the reaction chamber 1901 and in the gas pipeways from the exit valves 1917-1921 to the inside of the reaction chamber 1901.

Test Example

Figure 6:
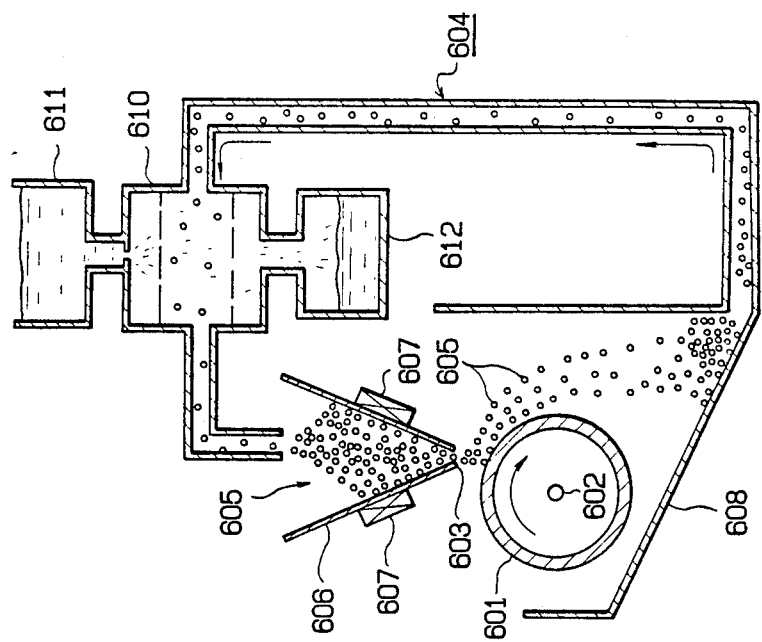
Figure 6:
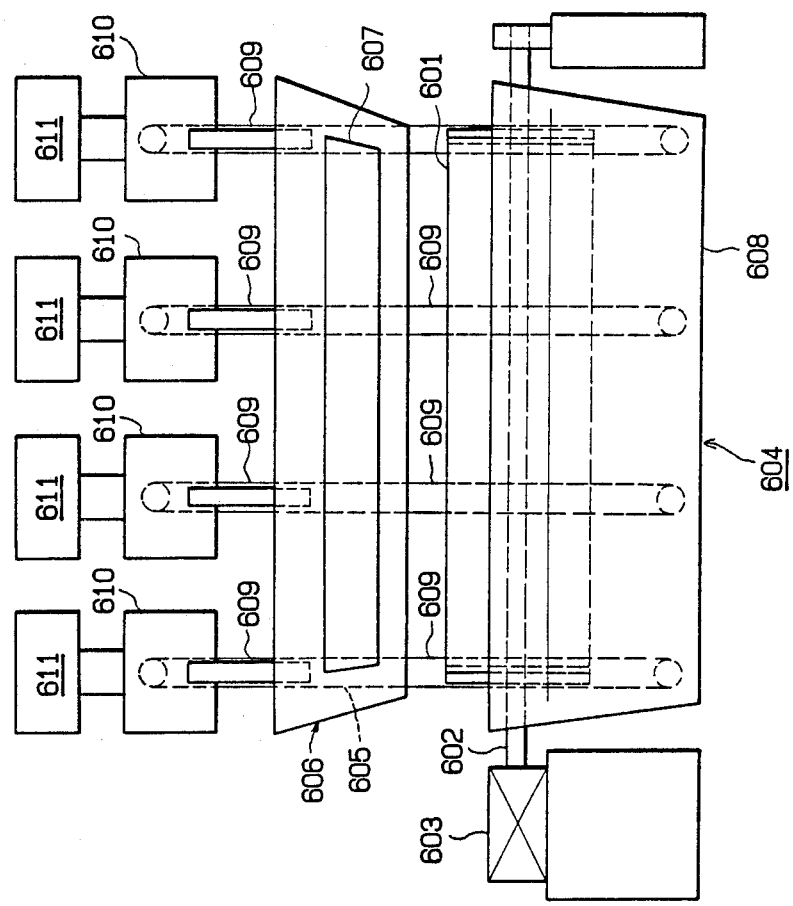

The surface of an aluminum alloy cylinder (60 mm diameter, 298 mm length) was fabricated to form an unevenness by using rigid true spheres of 2 mm diameter made of SUS stainless steels in a device shown in FIG. 6 as described above.

When examining the relationship for the diameter R' of the true sphere, the falling height h, the radius of curvature R and the width D for the dimple, it was confirmed that the radius of curvature R and the width D of the dimple was determined depending on the conditions such as the diameter R' for the true sphere, the falling height h and the like. It was also confirmed that the pitch between each of the dimple (density of the dimples or the pitch for the unevenness) could be adjusted to a desired pitch by controlling the rotating speed or the rotation number of the cylinder, or the falling amount of the rigid true sphere.

EXAMPLE 1

The surface of an aluminum alloy cylinder was fabricated in the same manner as in the Test Example to obtain a cylindrical Al support having diameter D and ratio D/R (cylinder Nos. 101-106) shown in the upper column of Table 1A.

Then, a light receiving layer was formed on the Al support (cylinder Nos. 101-106) under the conditions shown in Table 1B below using the fabrication device shown in FIG. 19.

Boron atoms contained in the layer were so introduced to provide a ratio: $B_2H_6/SiF_4=100$ ppm and that they were doped to about 200 ppm over the entire layer.

These light receiving members were subjected to image-wise exposure by irradiating laser beams at 780 nm wavelength and with 80 μm of spot diameter using an image exposing device shown in FIG. 20 and images were obtained by subsequent development and transfer. The state of the occurrence of interference fringe on the thus obtained images were as shown in the lower column of Table 1A.

FIG. 20(A) is a schematic plan view illustrating the entire exposing device, and FIG. 20(B) is a schematic side elevational view for the entire device. In the figures, are shown a light receiving member 2001, a semiconductor laser 2002, fθ lens 2003 and a polygonal mirror 2004.

Then, as a comparison, a light receiving member was manufactured in the same manner as described above by using an aluminum alloy cylinder, the surface of which was fabricated with a conventional cutting tool (60 mm diameter, 298 mm length, 100 μm unevenness pitch and 3 μm unevenness depth) (cylinder No. 107). When observing the thus obtained light receiving member under an electron microscope, the layer interface between the support surface and the light receiving layer and the surface of the light receiving layer were in parallel with each other. Images were formed in the same manner as above by using this light receiving member and the thus obtained images were evaluated in the same manner as described above. The results are as shown in the lower column of Table 1A.

TABLE 1A

| | Cylinder No. | | | | | | |
|---|---|---|---|---|---|---|---|
| | 101 | 102 | 103 | 104 | 105 | 106 | 107 |
| D(μm) | 450 ± 50 | 450 ± 50 | 450 ± 50 | 450 ± 50 | 450 ± 50 | 450 ± 50 | — |
| $\frac{\overline{D}}{R}$ | 0.02 | 0.03 | 0.04 | 0.05 | 0.06 | 0.07 | — |
| Occurrence of interference fringe | X | Δ | ○ | ○ | ◉ | ◉ | X |

Actual usability:
X: not usable
Δ: usable
○: preferably usable
◉: particularly preferably usable

TABLE 1B

| Layer preparing step | Gas used | Flow rate (SCCM) | Discharging power (W/cm²) | Layer thickness (μ) |
|---|---|---|---|---|
| First step | SiF₄<br>B₂H₆/H₂<br>H₂<br>CH₄ | SiF₄ = 300<br>B₂H₆/H₂ = 180<br>H₂ = 120<br>CH₄ = 5 | 300 | 2 |
| Second step | SiF₄<br>H₂<br>CH₄ | SiF₄ = 300<br>H₂ = 300<br>CH₄ = 5 | 300 | 23 |

Al substrate temperature: 250° C.
Discharging frequency: 13.56 MHz

EXAMPLE 2

A light receiving layer was formed on Al supports (cylinder Nos. 101-107) in the same manner as in Example 1 except for forming these light receiving layers in accordance with the layer forming conditions shown in Table 2B.

When forming the images on the thus obtained light receiving members in the same manner as in Example 1, the state of occurrence of the interference fringe in the obtained images were as shown in the lower column of Table 2A.

TABLE 2A

| | Cylinder No. | | | | | | |
|---|---|---|---|---|---|---|---|
| | 101 | 102 | 103 | 104 | 105 | 106 | 107 |
| D(μm) | 450 ± 50 | 450 ± 50 | 450 ± 50 | 450 ± 50 | 450 ± 50 | 450 ± 50 | — |
| $\frac{\overline{D}}{R}$ | 0.02 | 0.03 | 0.04 | 0.05 | 0.06 | 0.07 | — |
| Occurrence of interference fringe | X | Δ | ○ | ○ | ◉ | ◉ | X |

X: not usable
Δ: usable
○: preferably usable
◉: particularly preferably usable

TABLE 2B

| Layer preparing step | Gas used | Flow rate (SCCM) | Discharging power (W/cm²) | Layer thickness (μm) |
|---|---|---|---|---|
| First step | SiF₄<br>NO<br>H₂ | SiF₄ = 350<br>NO = 10<br>H₂ = 300 | 300 | 3 |
| Second step | SiF₄ | SiF₄ = 350 | 300 | 22 |

TABLE 2B-continued

| Layer preparing step | Gas used | Flow rate (SCCM) | Discharging power (W/cm$^2$) | Layer thickness ($\mu$m) |
|---|---|---|---|---|
| | H$_2$ | H$_2$ = 300 | | |

Al substrate temperature: 250° C.
Discharging frequency: 13.56 MHz

EXAMPLES 3–7

Light receiving members were prepared on A1 supports (cylinder Nos. 103–106) of Example 1 in the same manner as in Example 1 except for forming these light receiving layers in accordance with the layer forming conditions shown in Tables 3 through 7. In the examples 3 through 7, the flow rates for the gases used upon forming the light receiving layers were automatically adjusted under the microcomputer control in accordance with the flow rate variation curves shown in FIGS. 21–25 respectively. The boron atoms to be contained in the light receiving layers in each of the examples were introduced under the same conditions as those in Example 1.

Images were formed on the thus obtained light receiving members in the same manner as in Example 1.

Occurrence of interference fringe was not observed in any of the thus obtained images and the image quality was extremely high.

TABLE 3

(Variation chart: FIG. 21)

| Layer preparing step | Gas used | Flow rate (SCCM) | Discharging power (W/cm$^2$) | Layer thickness ($\mu$m) |
|---|---|---|---|---|
| First step | SiF$_4$ | SiF$_4$ = 350 | 300 | 2 |
| | H$_2$ | H$_2$ = 120 | | |
| | NH$_3$ | NH$_3$ = 10 | | |
| | B$_2$H$_6$/H$_2$ | B$_2$H$_6$/H$_2$ = 180 | | |
| Second step | | SiF$_4$ = 350 | | 2 |
| | | H$_2$ = 120 | | |
| | | NH$_3$ = 10→0.5 | | |
| | | B$_2$H$_6$/H$_2$ = 180 | | |
| Third step | SiF$_4$ | SiF$_4$ = 350 | | 17 |
| | H$_2$ | H$_2$ = 300 | | |
| | NH$_3$ | NH$_3$ = 0.5 | | |
| Fourth step | | SiF$_4$ = 350 | | 2 |
| | | N$_2$ = 300 | | |
| | | NH$_3$ = 0.5→10 | | |
| Fifth step | | SiF$_4$ = 350 | | 2 |
| | | H$_2$ = 300 | | |
| | | NH$_3$ = 10 | | |

Al substrate temperature: 250° C.
Discharging frequency: 13.56 MHz

TABLE 4

Figure 22:
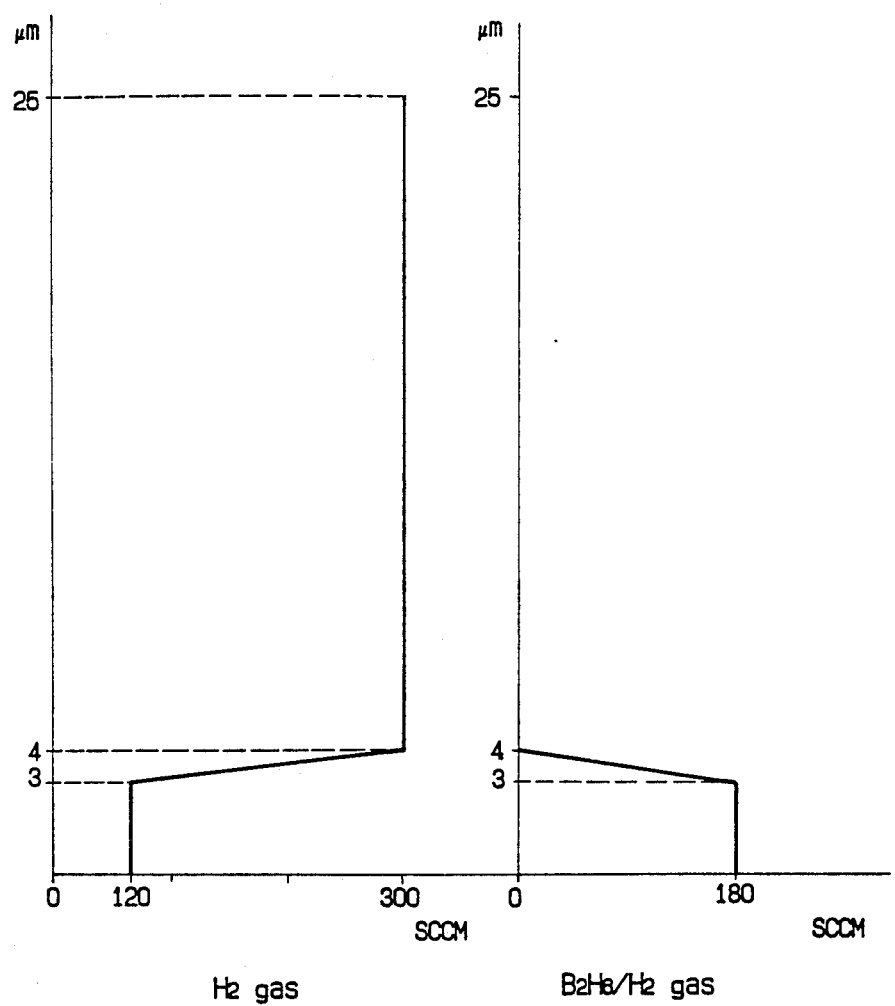

(Variation chart: FIG. 22)

| Layer preparing step | Gas used | Flow rate (SCCM) | Discharging power (W/cm$^2$) | Layer thickness ($\mu$m) |
|---|---|---|---|---|
| First step | SiF$_4$ | SiF$_4$ = 350 | 300 | 3 |
| | H$_2$ | H$_2$ = 120 | | |
| | NO | NO = 5 | | |
| | B$_2$H$_6$/H$_2$ | B$_2$H$_6$/H$_2$ = 180 | | |
| Second step | | SiF$_4$ = 350 | | 1 |
| | | H$_2$ = 120→300 | | |
| | | NO = 5 | | |
| | | B$_2$H$_6$/H$_2$ = 180→0 | | |
| Third step | SiF$_4$ | SiF$_4$ = 350 | | 21 |
| | H$_2$ | H$_2$ = 300 | | |

TABLE 4-continued (Variation chart: FIG. 22)

| Layer preparing step | Gas used | Flow rate (SCCM) | Discharging power (W/cm$^2$) | Layer thickness ($\mu$m) |
|---|---|---|---|---|
| | NO | NO = 5 | | |

Al substrate temperature: 250° C.
Discharging frequency: 13.56 MHz

TABLE 5

Figure 23:
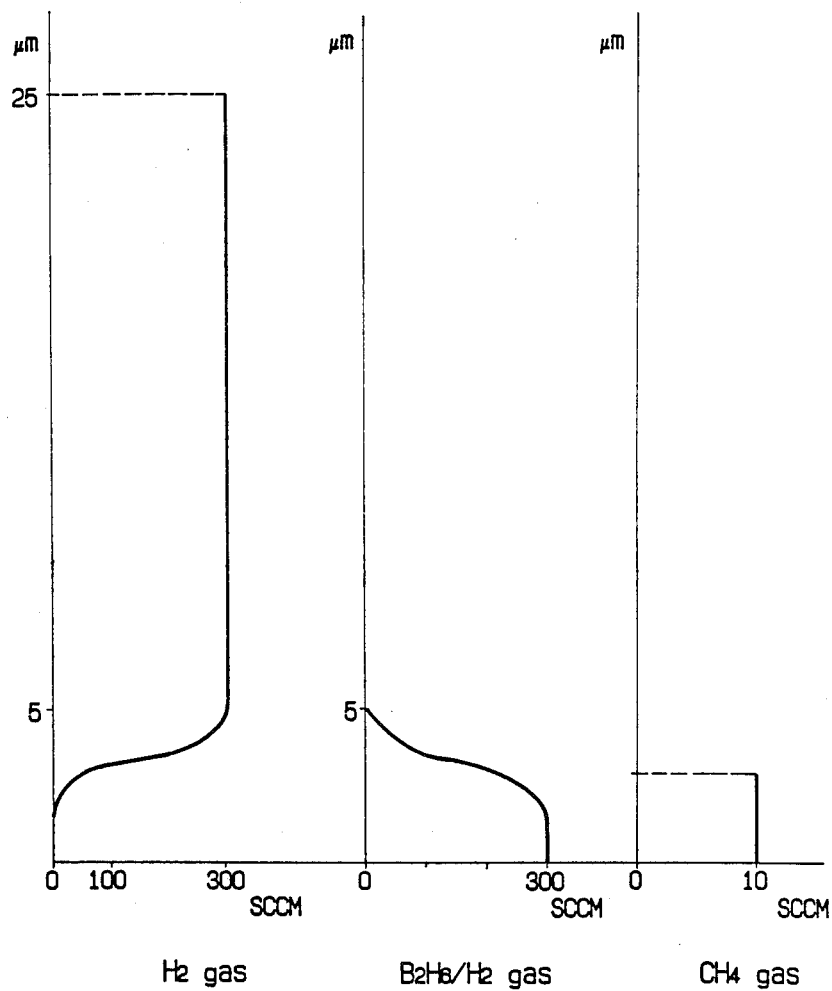

(Variation chart: FIG. 23)

| Layer preparing step | Gas used | Flow rate (SCCM) | Discharging power (W/cm$^2$) | Layer thickness ($\mu$m) |
|---|---|---|---|---|
| First step | SiH$_4$ | SiH$_4$ = 350 | 300 | 5 |
| | H$_2$ | H$_2$ = 0→300 | | |
| | B$_2$H$_6$/H$_2$ | B$_2$H$_6$/H$_2$ = 300→0 | | |
| | CH$_4$ | CH$_4$ = 10→0 | | |
| Second step | SiH$_4$ | SiH$_4$ = 350 | | 20 |
| | H$_2$ | H$_2$ = 300 | | |

Al substrate temperature: 250° C.
Discharging frequency: 13.56 MHz

TABLE 6

Figure 24:
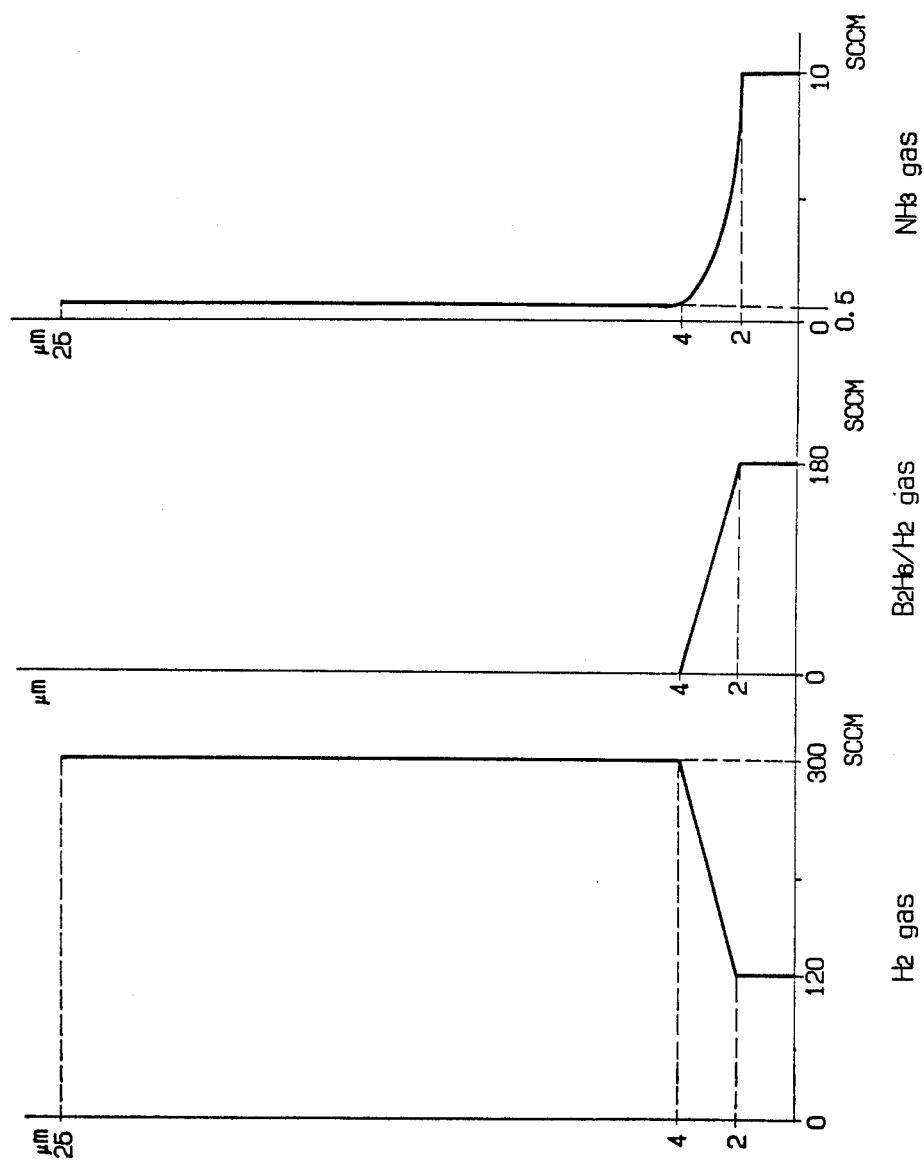

(Variation chart: FIG. 24)

| Layer preparing step | Gas used | Flow rate (SCCM) | Discharging power (W/cm$^2$) | Layer thickness ($\mu$m) |
|---|---|---|---|---|
| First step | SiF$_4$ | SiF$_4$ = 300 | 300 | 2 |
| | H$_2$ | H$_2$ = 120 | | |
| | B$_2$H$_6$/H$_2$ | B$_2$H$_6$/H$_2$ = 180 | | |
| | NHJ$_3$ | NH$_3$ = 10 | | |
| Second step | | SiF$_4$ = 300 | | 2 |
| | | H$_2$ = 120→300 | | |
| | | B$_2$H$_6$/H$_2$ = 180→0 | | |
| | | NH$_3$ = 10→0.5 | | |
| Third step | SiF$_4$ | SiF$_4$ = 300 | | 21 |
| | H$_2$ | H$_2$ = 300 | | |
| | NH$_3$ | NH$_3$ = 0.5 | | |

Al substrate temperature: 250° C.
Discharging frequency: 13.56 MHz

TABLE 7

(Variation chart: FIG. 25)

| Layer preparing step | Gas used | Flow rate (SCCM) | Discharging power (W/cm$^2$) | Layer thickness ($\mu$m) |
|---|---|---|---|---|
| First step | SiH$_4$ | SiH$_4$ = 300 | 300 | 1 |
| | H$_2$ | H$_2$ = 300 | | |
| | B$_2$H$_6$/H$_2$ | B$_2$H$_6$/H$_2$ = 200 | | |
| | NO | NO = 10 | | |
| Second step | | SiH$_4$ = 300 | | 2 |
| | | H$_2$ = 300 | | |
| | | B$_2$H$_6$/H$_2$ = 200→0 | | |
| | | NO = 10 | | |
| Third step | SiH$_4$ | SiH$_4$ = 400 | | 22 |
| | H$_2$ | H$_2$ = 300 | | |

Al substrate temperature: 250° C.
Discharging frequency: 13.56 MHz

EXAMPLE 8–13

Light receiving members were prepared on A1 supports (cylinder Nos. 103–106) of Example 1 in the same manner as in Example 1 except for forming these light receiving layers in accordance with the layer forming conditions shown in Tables 8 through 13. In the examples 11 through 13, the flow rates of H$_2$H$_6$/H$_2$ gas and $H_2$ gas upon forming the light receiving layers were automatically adjusted under the microcomputer control in accordance with the flow rate variation curves shown in FIGS. 22–23 and 25 respectively.

Images were formed on the thus obtained light receiving members in the same manner as in Example 1.

Occurrence of interference fringe was not observed in any of the thus obtained images and the image quality was extremely high.

TABLE 8

| Layer constitution | Layer preparing step | Gas used | Flow rate (SCCM) | Discharging power (W) | Layer thickness (μm) |
|---|---|---|---|---|---|
| Photosensitive layer | First step | $SiF_4$ $B_2H_6/H_2$ (= 3000 ppm) $H_2$ | $SiF_4 = 350$ $B_2H_6/H_2 = 180$ $H_2 = 120$ | 300 | 2 |
|  | Second step | $SiF_4$ $H_2$ | $SiF_4 = 350$ $H_2 = 300$ |  | 23 |
| Surface layer | Third step | $SiF_4$ NO | $SiF_4 = 100$ NO = 500 | 200 | 0.5 |

Al substrate temperature: 250° C.
Discharging frequency: 13.56 MHz

TABLE 9

| Layer constitution | Layer preparing step | Gas used | Flow rate (SCCM) | Discharging power (W) | Layer thickness (μm) |
|---|---|---|---|---|---|
| Photosensitive layer | First step | $SiF_4$ $PH_3/H_2$ (=3000 ppm) $H_2$ | $SiF_4 = 300$ $PH_3/H_2 = 180$ $H_2 = 120$ | 300 | 2 |
|  | Second step | $SiF_4$ $H_2$ | $SiF_4 = eoo$ $H_2 = 300$ |  | 23 |
| Surface layer | Third step | $SiF_4$ NO | $SiF_4 = 100$ NO = 500 | 200 | 0.5 |

Al substrate temperature: 250° C.
Discharging frequency: 13.56 MHz

TABLE 10

| Layer Constitution | Layer preparing step | Gas used | Flow rate (SCCM) | Discharging power (W) | Layer thickness (μm) |
|---|---|---|---|---|---|
| Photosensitive layer | First step | $SiF_4$ $H_2$ | $SiF_4 = 350$ $H_2 = 300$ | 300 | 25 |
| Surface layer | Second step | $SiF_4$ NO | $SiF_4 = 100$ NO = 500 | 200 | 0.5 |

Al substrate temperature: 250° C.
Discharging frequency: 13.56 MHz

TABLE 11
(Variation chart: FIG. 22)

| Layer constitution | Layer preparing step | Gas used | Flow rate (SCCM) | Discharging power (W) | Layer thickness (μm) |
|---|---|---|---|---|---|
| Photosensitive layer | First step | $SiF_4$ $B_2H_6/H_2$ (=3000 ppm) | $SiF_4 = 300$ $B_2H_6/H_2 = 180$ $H_2 = 120$ | 300 | 3 |
|  | Second step | $H_2$ | $SiF_4 = 300$ $B_2H_6/H_2 = 180 \rightarrow 0$ $H_2 = 120 \rightarrow 300$ | 1 |  |
|  | Third step | $SiF_4$ $H_2$ | $SiF_4 = 300$ $H_2 = 300$ |  | 21 |
| Surface layer | Fourth step | $SiF_4$ NO | $SiF_4 = 100$ NO = 500 | 200 | 0.5 |

Al substrate temperature: 250° C.
Discharging frequency: 13.56 MHz

TABLE 12
(Variation chart: FIG. 23)

| Layer constitution | Layer preparing step | Gas used | Flow rate (SCCM) | Discharging power (W) | Layer thickness (μm) |
|---|---|---|---|---|---|
| Photosensitive layer | First step | $SiF_4$ $B_2H_6/H_2$ (=3000 ppm) | $SiF_4 = 300$ $B_2H_6/H_2 = 300 \rightarrow 0$ |  | 5 |

TABLE 12-continued (Variation chart: FIG. 23)

| Layer constitution | Layer preparing step | Gas used | Flow rate (SCCM) | Discharging power (W) | Layer thickness (μm) |
|---|---|---|---|---|---|
| | Second step | H$_2$<br>SiF$_4$ | H$_2$ = 0 →300<br>SiF$_4$ = 300 | | 20 |
| Surface layer | Third step | H$_2$<br>SiF$_4$<br>NO | H$_2$ = 300<br>SiF$_4$ = 100<br>NO = 500 | 200 | 0.5 |

Al substrate temperature: 250° C.
Discharging frequency: 13.56 MHz

TABLE 13

(Variation chart: FIG. 25)

| Layer constitution | Layer preparing step | Gas used | Flow rate (SCCM) | Discharging power (W) | Layer thickness (μm) |
|---|---|---|---|---|---|
| Photosensitive layer | First step | SiH$_4$<br>B$_2$H$_6$/H$_2$<br>(=3000 ppm) | SiH$_4$ = 300<br>B$_2$H$_6$/H$_2$ = 200 → 0 | 300 | 3 |
| | Second step | H$_2$<br>SiH$_4$ | H$_2$ = 300<br>SiH$_4$ = 300 | | 22 |
| Surface layer | Third step | H$_2$<br>SiH$_4$<br>NO | H$_2$ = 300<br>SiH$_4$ = 100<br>NO = 500 | 200 | 0.5 |

Al substrate temperature: 250° C.
Discharging frequency: 13.56 MHz

EXAMPLES 14–25

Light receiving members were prepared on Al supports (cylinder Nos. 103–106) of Example 1 in the same manner as in Example 1 except for forming these light receiving layers in accordance with the layer forming conditions shown in Tables 14 through 25.

In the examples 16–19 and 21–24, the flow rates for the gas used upon forming the light receiving layers were automatically adjusted under the microcomputer control in accordance with the flow rate variation curves shown in FIGS. 26, 22, 27, 24, 25, 28, 29 and 30 respectively.

The boron atoms to be contained in the light receiving layers were introduced under the same conditions as those in Example 1.

Images were formed on the thus obtained light receiving members in the same manner as in Example 1.

Occurrence of interference fringe was not observed in any of the thus obtained images and the image quality was extremely high.

TABLE 14

| Layer Constitution | Layer preparing step | Gas used | Flow rate (SCCM) | Discharging power (W) | Layer thickness (μm) |
|---|---|---|---|---|---|
| Photosensitive layer | First step | SiF$_4$<br>CH$_4$<br>H$_2$<br>B$_2$H$_6$/H$_2$ | SiF$_4$ = 350<br>CH$_4$ = 5<br>H$_2$ = 120<br>B$_2$H$_6$/H$_2$ = 180 | 300 | 3 |
| | Second step | SiF$_4$<br>CH$_4$<br>H$_2$ | SiF$_4$ = 350<br>CH$_4$ = 5<br>H$_2$ = 300 | | 22 |
| Surface layer | Third step | SiF$_4$<br>NH$_3$ | SiF$_4$ = 20<br>NH$_3$ = 600 | 200 | 0.5 |

Al substrate temperature: 250° C.
Discharging frequency: 13.56 MHz

TABLE 15

| Layer constitution | Layer preparing step | Gas used | Flow rate (SCCM) | Discharging power (W) | Layer thickness (μm) |
|---|---|---|---|---|---|
| Photosensitive layer | First step | SiF$_4$<br>H$_2$<br>CH$_4$ | SiF$_4$ = 350<br>H$_2$ = 300<br>CH$_4$ = 10 | 300 | 3 |
| | Second step | SiF$_4$<br>H$_2$ | SiF$_4$ = 350<br>H$_2$ = 300 | | 22 |
| Surface layer | Third step | SiF$_4$<br>NH$_3$ | SiF$_4$ = 20<br>NH$_3$ = 600 | 200 | 0.5 |

Al substrate temperature: 250° C.
Discharging frequency: 13.56 MHz

TABLE 16

(Variation Chart: FIG. 26)

| Layer constitution | Layer preparing step | Gas used | Flow rate (SCCM) | Discharging power (W) | Layer thickness ($\mu m$) |
|---|---|---|---|---|---|
| Photosensitive layer | First step | $SiF_4$<br>$H_2$<br>$CH_4$<br>$B_2H_6/H_2$ | $SiF_4 = 350$<br>$H_2 = 120$<br>$CH_4 = 10$<br>$B_2H_6/H_2 = 180$ | 300 | 2 |
| | Second step | $SiF_4$ | $SiF_4 = 350$<br>$H_2 = 120$<br>$CH_4 = 10 \to 0.5$<br>$B_2H_6/H_2 = 180$ | | 2 |
| | third step | $SiF_4$<br>$H_2$<br>$CH_4$ | $SiF_4 = 350$<br>$H_2 = 300$<br>$CH_4 = 0.5$ | | 17 |
| | Fourth step | $SiF_4$<br>$H_2$<br>$CH_4$ | $SiF_4 = 350$<br>$H_2 = 300$<br>$CH_4 = 0.5 \to 10$ | 300 | 2 |
| | Fifth step | | $SiF_4 = 350$<br>$H_2 = 300$<br>$CH_4 = 10$ | | 2 |
| Surface layer | Sixth step | $SiF_4$<br>NO | $SiF_4 = 100$<br>NO = 500 | 200 | 0.5 |

Al substrate temperature: 250° C.
Discharging frequency: 13.56 MHz

TABLE 17

(Variation chart: FIG. 22)

| Layer constitution | Layer preparing step | Gas used | Flow rate (SCCM) | Discharging power (W) | Layer thickness ($\mu$) |
|---|---|---|---|---|---|
| Photosensitive layer | First step | $SiF_4$<br>$H_2$<br>$NH_3$<br>$B_2H_6/H_2$ | $SiF_4 = 350$<br>$H_2 = 120$<br>$NH_3 = 5$<br>$B_2H_6/H_2 = 180$ | 300 | 3 |
| | Second step | | $SiF_4 = 350$<br>$H_2 = 120 \to 300$<br>$NH_3 = 5$<br>$B_2H_6/H_2 = 180 \to 0$ | | 1 |
| | Third sep | $SiF_4$<br>$H_2$<br>$NH_3$ | $SiF_4 = 350$<br>$H_2 = 300$<br>$NH_3 = 5$ | | 21 |
| Surface layer | Fourth step | $SiF_4$<br>$CH_4$ | $SiF_4 = 10$<br>$CH_4 = 600$ | 200 | 0.5 |

Al substrate temperature: 250° C.
Discharging frequency: 13.56 mHz

TABLE 18

Figure 27:
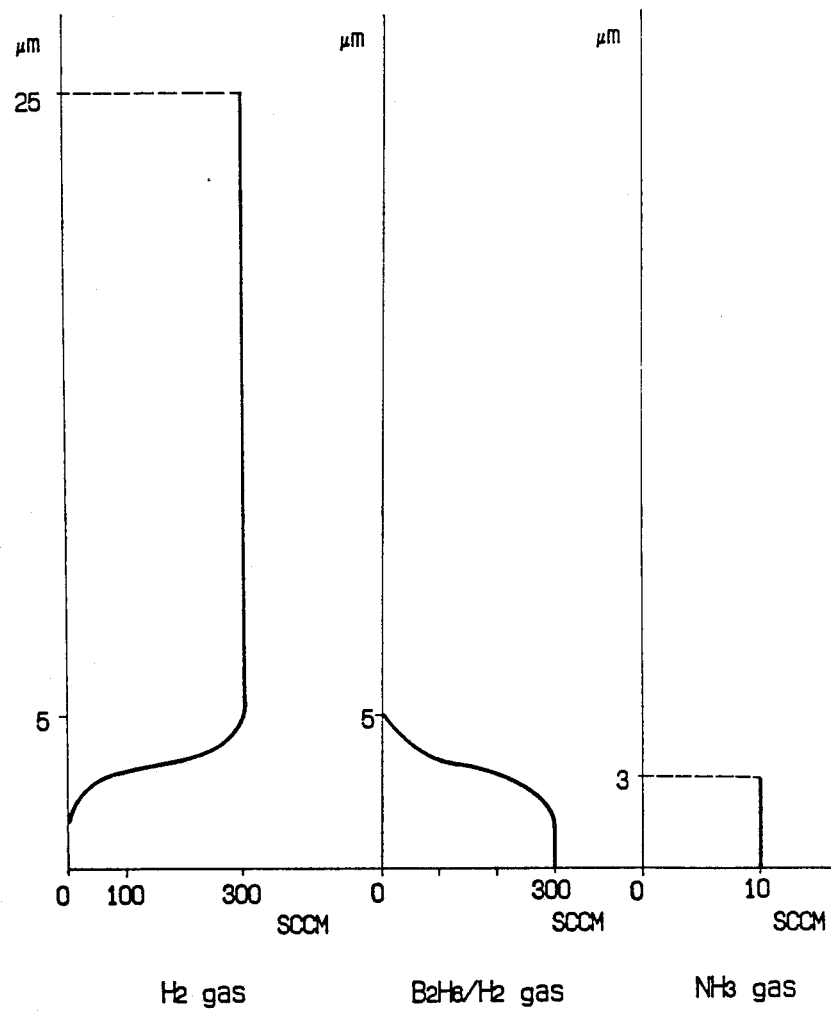

(Variation chart: FIG. 27)

| Layer constitution | Layer preparing step | Gas used | Flow rate (SCCM) | Discharging power (W) | Layer thickness ($\mu$) |
|---|---|---|---|---|---|
| Photosensitive layer | First step | $SiF_4$<br>$H_2$<br>$B_2H_6/H_2$<br>$NH_3$ | $SiF_4 = 350$<br>$H_2 = 0 \to 300$<br>$B_2H_6/H_2 = 300 \to 0$<br>$NH_3 = 10 \to 0$ | 300 | 5 |
| | Second step | $SiF_4$<br>$H_2$ | $SiF_4 = 350$<br>$H_2 = 300$ | | 20 |
| Surface layer | Third step | $SiF_4$<br>$CH_4$ | $SiF_4 = 10$<br>$CH_4 = 600$ | 200 | 0.5 |

Al substrate temperature: 250° C.
Discharging frequency: 13.56 MHz

TABLE 19

(Variation charg: FIG. 24)

| Layer constitution | Layer preparing step | Gas used | Flow rate (SCCM) | Discharging power (W) | Layer thickness ($\mu$) |
|---|---|---|---|---|---|
| Photensensitive layer | First step | $SiF_4$<br>$H_2$<br>$B_2H_6/H_2$<br>$NH_3$ | $SiF_4 = 350$<br>$H_2 = 120$<br>$B_2H_6/H_2 = 180$<br>$NH_3 = 10$ | 300 | 2 |
| | Second step | | $SiF_4 = 350$<br>$H_2 = 120 \to 300$ | | 2 |

TABLE 19-continued (Variation charg: FIG. 24)

| Layer constitution | Layer preparing step | Gas used | Flow rate (SCCM) | Discharging power (W) | Layer thickness (μ) |
|---|---|---|---|---|---|
| | Third step | SiF$_4$ H$_2$ NH$_3$ | B$_2$H$_6$/H$_2$ = 180 → 0 NH$_3$ = 10 → 0.5 SiF$_4$ = 350 H$_2$ = 300 NH$_3$ = 0.5 | | 21 |
| Surface Layer | Fourth step | SiF$_4$ CH$_4$ | SiF$_4$ = 10 CH$_4$ = 600 | 200 | 0.5 |

Al substrate temperature: 250° C.
Discharging frequency: 13.56 MHz

TABLE 20

| Layer constitution | Layer preparing step | Gas used | Flow rate (SCCM) | Discharging power (W) | Layer thickness (μ) |
|---|---|---|---|---|---|
| Photosensitive Layer | First step | SiF$_4$ H$_2$ B$_2$H$_6$/H$_2$ NO | SiF$_4$ = 350 H$_2$ = 120 B$_2$H$_6$/H$_2$ = 180 NO = 5 | 300 | 3 |
| | Second step | SiF$_4$ H$_2$ | SiF$_4$ = 350 H$_2$ = 300 | | 22 |
| Surface layer | Third step | SiF$_4$ CH$_4$ | NO = 5 SiF$_4$ = 10 CH$_4$ = 600 | 200 | 0.5 |

Al substrate temperature: 250° C.
Discharging frequency: 13.56 MHz

TABLE 21

(Variation chart: FIG. 25)

| Layer constitution | Layer preparing step | Gas used | Flow rate (SCCM) | Discharging power (W) | Layer thickness (μ) |
|---|---|---|---|---|---|
| Photosensitive layer | First step | SiH$_4$ H$_2$ B$_2$H$_6$/H$_2$ NO | SiH$_4$ = 350 H$_2$ = 300 B$_2$H$_6$/H$_2$ = 200 NO = 10 | 300 | 1 |
| | Second step | | SiH$_4$ = 350 H$_2$ = 300 B$_2$H$_6$/H$_2$ = 200 → 0 NO = 10 → 0 | | 4 |
| | Third step | SiH$_4$ H$_2$ | SiH$_4$ = 350 H$_2$ = 300 | | 20 |
| Surface layer | Fourth step | SiF$_4$ CH$_4$ | SiF$_4$ = 10 CH$_4$ = 600 | 200 | 0.5 |

Al substrate temperature: 250° C.
Discharging frequency: 13.56 MHz

TABLE 22

Figure 28:
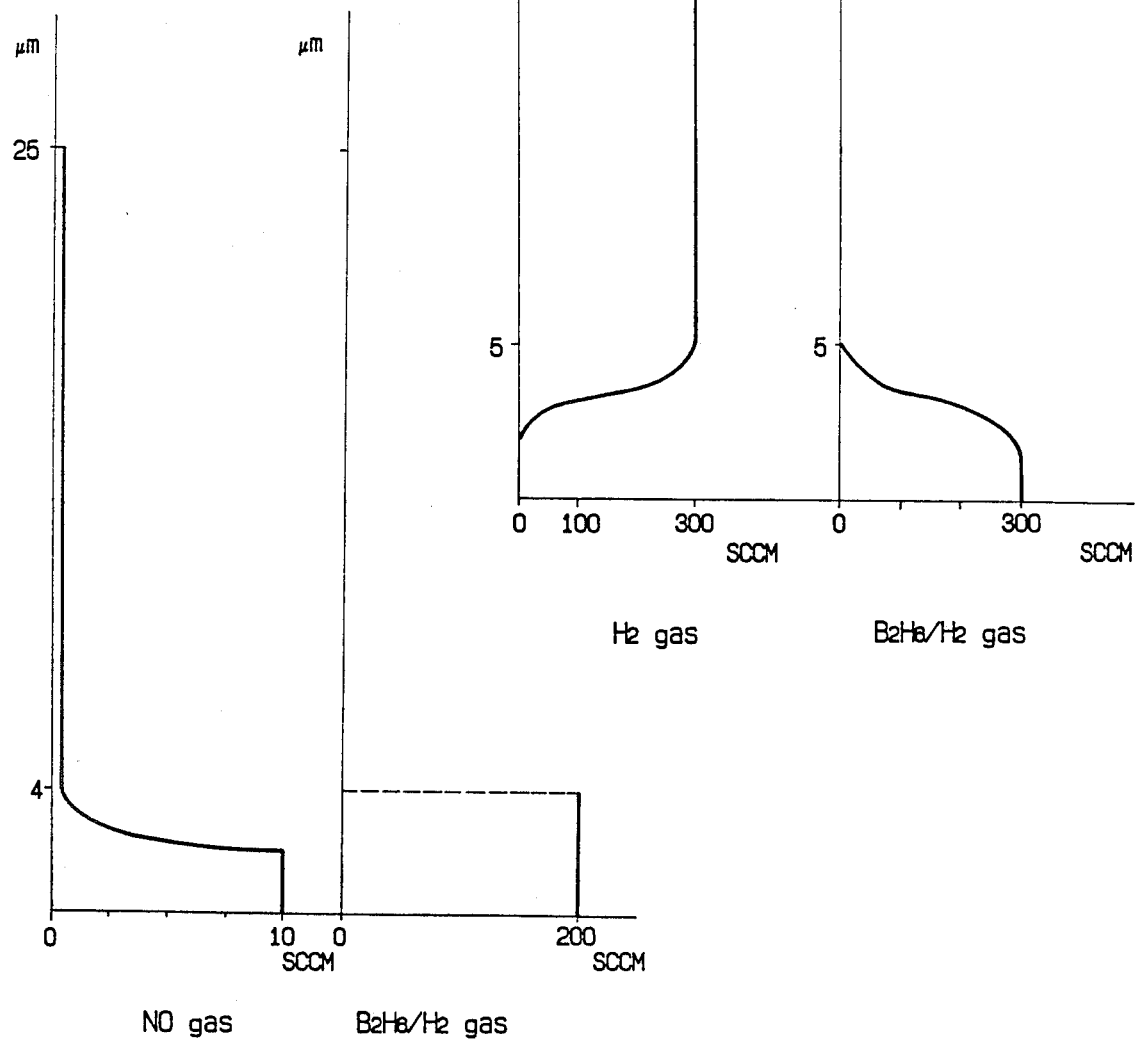

(Variation chart: FIG. 28)

| Layer constitution | Layer preparing step | Gas used | Flow rate (SCCM) | Discharging power (W) | Layer thickness (μ) |
|---|---|---|---|---|---|
| Photosensitive layer | First step | SiH$_4$ B$_2$H$_6$/H$_2$ NO | SiH$_4$ = 350 B$_2$H$_6$/H$_2$ = 200 NO = 10 → 0.5 | 300 | 4 |
| | Second step | SiH$_4$ NO | SiH$_4$ = 350 NO = 0.5 | | 21 |
| Surface layer | Third step | SiF$_4$ CH$_4$ | SiF$_4$ = 10 CH$_4$ = 600 | 200 | 0.5 |

Al substrate temperature: 250° C.
Discharging frequency: 13.56 MHz

TABLE 23

Figure 29:
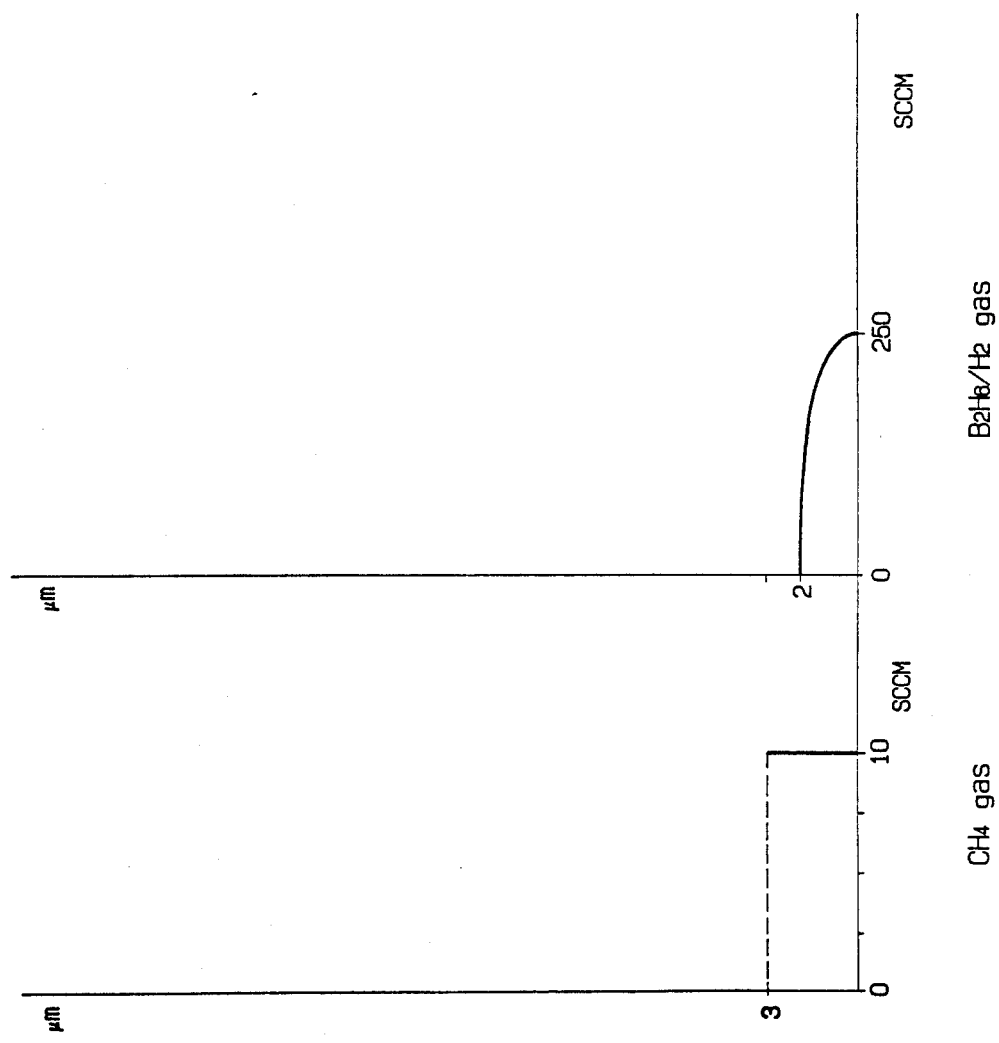

(Variation chart: FIG 29)

| Layer Constitution | Layer preparing step | Gas used | Flow rate (SCCM) | Discharging power (W) | Layer thickness (μ) |
|---|---|---|---|---|---|
| Photosensitive layer | First step | SiH$_4$ H$_2$ B$_2$H$_6$/H$_2$ CH$_4$ | SiH$_4$ = 350 H$_2$ = 300 B$_2$H$_6$/H$_2$ = 250 → 0 CH$_4$ = 10 | 300 | 3 |
| | Second step | SiH$_4$ H$_2$ | SiH$_4$ = 350 H$_2$ = 300 | | 22 |

TABLE 23-continued (Variation chart: FIG 29)

| Layer Constitution | Layer preparing step | Gas used | Flow rate (SCCM) | Discharging power (W) | Layer thickness (μ) |
|---|---|---|---|---|---|
| Surface | Third step | SiF$_4$ NO | SiF$_4$ = 100 NO = 500 | 200 | 0.5 |

Al substrate temperature: 250° C.
Discharging frequency: 13.56 MHz

TABLE 24

Figure 30:
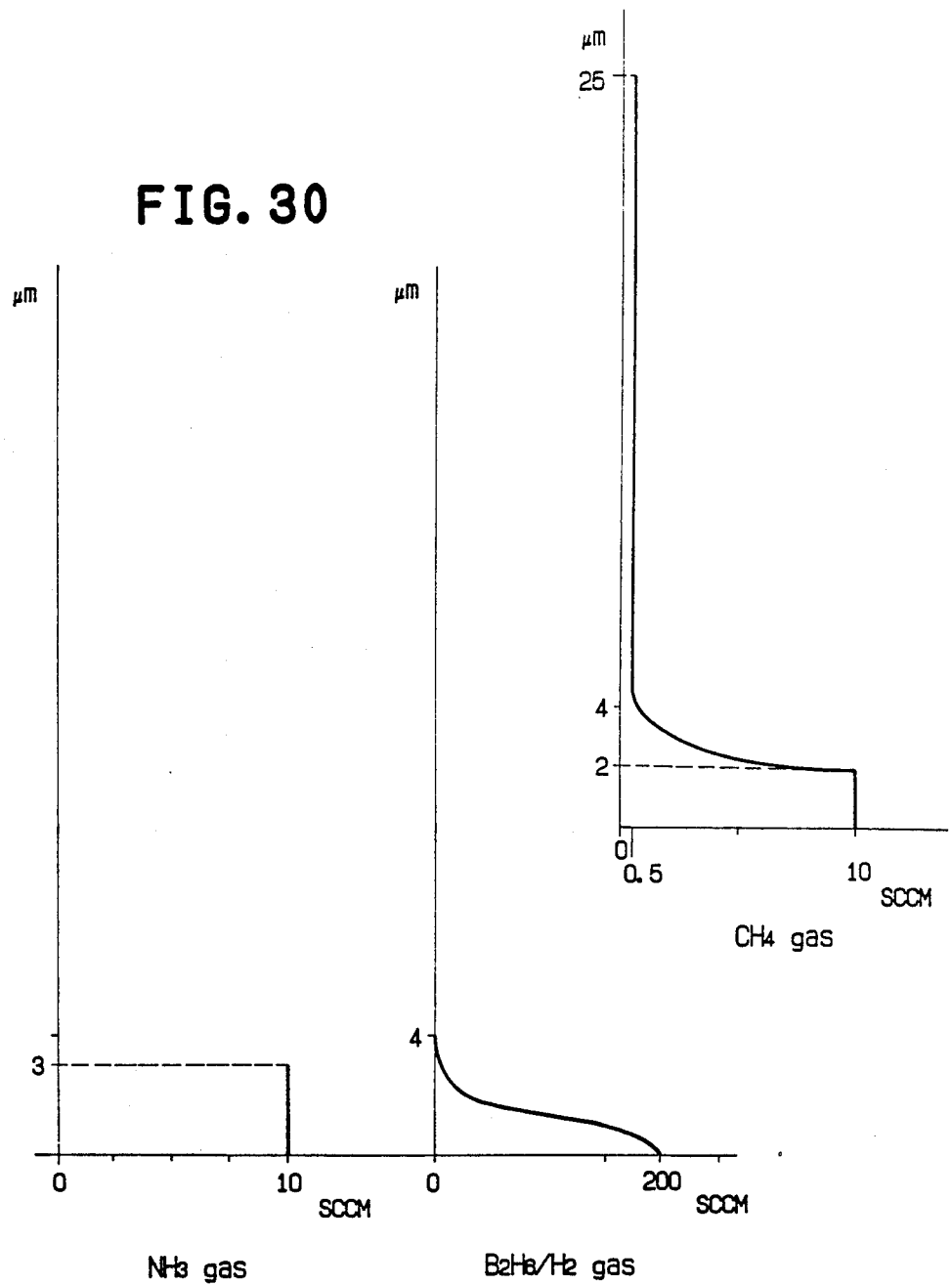

(Variation chart: FIG. 30)

| Layer constitution | Layer preparing step | Gas used | Flow rate (SCCM) | Discharging power (W) | Layer thickness (μ) |
|---|---|---|---|---|---|
| Photosensitive layer | First step | SiH$_4$ B$_2$H$_6$/H$_2$ NH$_3$ | SiH$_4$ = 400 B$_2$H$_6$/H$_2$ = 200 → 0 NH$_3$ = 10 → 0 | 300 | 4 |
|  | Second step | SiH$_4$ | SiH$_4$ = 400 |  | 21 |
| Surface layer | Third step | SiF$_4$ CH$_4$ | SiF$_4$ = 10 CH$_4$ = 600 | 200 | 0.5 |

Al substrate temperature: 250° C.
Discharging frequency: 13.56 mHz

TABLE 25

| Layer constitution | Gas used | Flow rate (SCCM) | Discharging power (W) | Layer thickness (μ) |
|---|---|---|---|---|
| Photosensitive layer | SiF$_4$ H$_2$ CH$_4$ | SiF$_4$ = 350 H$_2$ = 300 CH$_4$ = 5 | 300 | 25 |
| Surface layer | SiF$_4$ NH$_3$ | SiF$_4$ = 20 NH$_3$ = 600 | 200 | 0.5 |

Al substrate temperature: 250° C.
Discharging frequency: 13.56 MHz manner as in Example 1 except for forming these light receiving layers in accordance with the layer forming conditions shown in Tables 26 through 35. In the examples each of the examples, the flow rates for the gases used upon forming the layers and upon forming the surface layers were automatically adjusted under the microcomputer control in accordance with the flow rate variation chart described in Table A.

The boron atoms to be contained in the photosensitive layer were so-introduced that B$_2$H$_6$/SiF$_4$=100 ppm and the atoms were doped to about 200 ppm over the entire layer.

TABLE 26

| Layer constitution | Layer preparing layer | Gas used | Flow rate (SCCM) | Discharging power (W) | Layer thickness (μ) |
|---|---|---|---|---|---|
| Photosensitive layer | First step | SiH$_4$ H$_2$ | SiH$_4$ = 350 H$_2$ = 300 | 300 | 25 |
| Surface layer | Second step | SiF$_4$ H$_2$ CH$_4$ | SiF$_4$ = 350 → 10 H$_2$ = 300 → 0 CH$_4$ = 0 → 600 | 300 → 200 | 1.5 |

Al substrate temperature: 250° C.
Discharging frequency: 13.56 MHz

EXAMPLES 26-35

Light receiving members were prepared on Al supports (cylinder Nos. 103-106) of Example 1 in the same

TABLE 27

| Layer constitution | Layer preparing step | Gas used | Flow rate (SCCM) | Discharging power (W) | Layer thickness (μ) |
|---|---|---|---|---|---|
| Photosensitive layer | First step | SiF$_4$ H$_2$ B$_2$H$_6$/H$_2$ | SiF$_4$ = 350 H$_2$ = 120 B$_2$H$_6$/H$_2$ = 180 | 300 | 3 |
|  | Second step | SiF$_4$ H$_2$ | SiF$_4$ = 350 H$_2$ = 300 |  | 23 |
| Surface layer | Third step | SiF$_4$ H$_2$ NH$_3$ | SiF$_4$ = 350 → 10 H$_2$ = 300 → 0 NH$_3$ = 0 → 600 | 300 → 200 | 1.5 |

Al substrate temperature: 250° C.
Discharging frequency: 13.56 MHz

TABLE 28

| Layer Constitution | Layer preparing step | Gas used | Flow rate (SCCM) | Discharging power (W) | Layer thickness (μ) |
|---|---|---|---|---|---|
| Photosensitive layer | First step | SiF$_4$<br>H$_2$<br>B$_2$H$_6$/H$_2$ | SiF$_4$ = 350<br>H$_2$ = 0 → 300<br>B$_2$H$_6$ = 300 → 0 | 300 | 5 |
|  | Second step | SiF$_4$<br>H$_2$ | SiF$_4$ = 350<br>H$_2$ = 300 |  | 20 |
| Surface layer | Third step | SiF$_4$<br>H$_2$<br>NO | SiF$_4$ = 350 → 100<br>H$_2$ = 300 → 0<br>NO = 0 → 500 | 300 → 200 | 1.5 |

Al substrate temperature: 250° C.
Discharging frequency: 13.56 MHz

TABLE 29

| Layer constitution | Layer preparing step | Gas used | Flow rate (SCCM) | Discharging power (W) | Layer thickness (μ) |
|---|---|---|---|---|---|
| Photosensitive layer | First step | SiF$_4$<br>H$_2$<br>B$_2$H$_6$/H$_2$ | SiF$_4$ = 300<br>H$_2$ = 120<br>B$_2$H$_6$ = 180 | 300 | 3 |
|  | Second step |  | SiF$_4$ = 300<br>H$_2$ = 120 → 300<br>B$_2$H$_6$ = 180 → 0 |  | 1 |
|  | Third step | SiF$_4$<br>H$_2$ | SiF$_4$ = 300<br>H$_2$ = 300 |  | 21 |
| Surface layer | Fourth step | SiF$_4$<br>H$_2$<br>NH$_3$ | SiF$_4$ = 300 → 10<br>H$_2$ = 300 → 0<br>NH$_3$ = 0 → 600 | 300 → 200 | 1.5 |

Al substrate temperature: 250° C.
Discharging frequency: 13.56 MHz

TABLE 30

| Layer constitution | Layer preparing step | Gas used | Flow rate (SCCM) | Discharging power (W) | Layer thickness (μ) |
|---|---|---|---|---|---|
| Photosensitive layer | First step | SiF$_4$<br>H$_2$<br>CH$_4$ | SiF$_4$ = 300<br>H$_2$ = 300<br>CH$_4$ = 5 | 300 | 25 |
| Surface layer | Second step | SiF$_4$<br>H$_2$<br>CH$_4$ | SiF$_4$ = 300 → 10<br>H$_2$ = 300 → 0<br>CH$_4$ = 5 → 600 | 300 → 200 | 1.5 |

Al substrate temperature: 250° C.
Discharging frequency: 13.56 MHz

TABLE 31

| Layer constitution | Layer preparing step | Gas used | Flow rate (SCCM) | Discharging power (W) | Layer thickness (μ) |
|---|---|---|---|---|---|
| Photosensitive layer | First step | SiF$_4$<br>H$_2$<br>CH$_4$ | SiF$_4$ = 350<br>H$_2$ = 300<br>CH$_4$ = 10 | 300 | 3 |
|  | Second step | SiF$_4$<br>H$_2$ | SiF$_4$ = 350<br>H$_2$ = 300 |  | 23 |
| Surface layer | Third layer | SiF$_4$<br>H$_2$<br>CH$_4$<br>NO | SiF$_4$ = 350 → 10<br>H$_2$ = 300 → 0<br>CH$_4$ = 0 → 300<br>NO = 0 → 300 | 300 → 200 | 1.5 |

Al substrate temperature: 250° C.
Discharging frequency: 13.56 MHz

TABLE 32

| Layer constitution | Layer preparing step | Gas used | Flow rate (SCCM) | Discharging power (W) | Layer thickness (μ) |
|---|---|---|---|---|---|
| Photosensitive layer | First step | SiF$_4$<br>H$_2$<br>CH$_4$ | SiF$_4$ = 350<br>H$_2$ = 300<br>CH$_4$ = 10 | 300 | 2 |
|  | Second step |  | SiF$_4$ = 350<br>H$_2$ = 300<br>CH$_4$ = 10 → 0.5 |  | 2 |
|  | Third step |  | SiF$_4$ = 350<br>H$_2$ = 300 |  | 21 |

TABLE 32-continued

| Layer constitution | Layer preparing step | Gas used | Flow rate (SCCM) | Discharging power (W) | Layer thickness (μ) |
|---|---|---|---|---|---|
| Surface layer | Fourth step | SiF$_4$<br>H$_2$<br>CH$_4$ | CH$_4$ = 0.5<br>SiF$_4$ = 350 → 10<br>H$_2$ = 300 → 0<br>CH$_4$ = 0.5 → 600 | 300 → 200 | 1.5 |

Al substrate temperature: 250° C.
Discharging frequency: 13.56 MHz

TABLE 33

| Layer constitution | Layer preparing step | Gas used | Flow rate (SCCM) | Discharging power (W) | Layer thickness (μ) |
|---|---|---|---|---|---|
| Photosensitive layer | First step | SiF$_4$<br>H$_2$<br>NH$_3$<br>B$_2$H$_6$/H$_2$ | SiF$_4$ = 300<br>H$_2$ = 120<br>NH$_3$ = 5<br>B$_2$H$_6$/H$_2$ = 180 | 300 | 3 |
|  | Second step | SiF$_4$<br>H$_2$<br>NH$_3$ | SiF$_4$ = 300<br>H$_2$ = 300<br>NH$_3$ = 5 |  | 22 |
| Surface layer | Third step | SiF$_4$<br>H$_2$<br>NH$_3$ | SiF$_4$ = 300→10<br>H$_2$ = 300→0<br>NH$_3$ = 5→600 | 300→200 | 1.5 |

Al substrate temperature: 250° C.
Discharging frequency: 13.56 MHz

TABLE 34

| Layer constitution | Layer preparing step | Gas used | Flow rate (SCCM) | Discharging power (W) | Layer thickness (μ) |
|---|---|---|---|---|---|
| Photosensitive layer | First step | SiF$_4$<br>H$_2$<br>NH$_3$<br>B$_2$H$_6$/H$_2$ | SiF$_4$ = 350<br>H$_2$ = 120<br>NH$_3$ = 10<br>B$_2$H$_6$/H$_2$ = 180 | 300 | 3 |
|  | Second step | SiF$_4$<br>H$_2$<br>B$_2$H$_6$/H$_2$ | SiF$_4$ = 350<br>H$_2$ = 120→300<br>B$_2$H$_6$/H$_2$ = 180→0 |  | 2 |
|  | Third step | SiF$_4$<br>H$_2$ | SiF$_4$ = 350<br>H$_2$ = 300 |  | 20 |
| Surface layer | Fourth step | SiF$_4$<br>H$_2$<br>NO | SiF$_4$ = 350→100<br>H$_2$ = 300→0<br>NO = 0→500 | 300→200 | 1.5 |

Al substrate temperature: 250° C.
Discharge frequency: 13.56 MHz

TABLE 35

| Layer constitution | Layer preparing step | Gas used | Flow rate (SCCM) | Discharging power (W) | Layer thickness (μ) |
|---|---|---|---|---|---|
| Photosensitive layer | First step | SiF$_4$<br>H$_2$<br>NO<br>B$_2$H$_6$/H$_2$ | SiF$_4$ = 300<br>H$_2$ = 120<br>NO = 10<br>B$_2$H$_6$/H$_2$ = 180 | 300 | 3 |
|  | Second step | SiF$_4$<br>H$_2$<br>NO | SiF$_4$ = 300<br>H$_2$ = 300<br>NO = 10→0 |  | 1 |
|  | Third step | SiF$_4$<br>H$_2$ | SiF$_4$ = 300<br>H$_2$ = 300 |  | 21 |
| Surface layer | Fourth step | SiF$_4$<br>H$_2$<br>NO<br>CH$_4$ | SiF$_4$ = 300→10<br>H$_2$ = 300→0<br>NO = 0→300<br>CH$_4$ = 0→300 | 300→200 | 1.5 |

Al substrate temperature: 250° C.
Discharging frequency: 13.56 MHz

TABLE A

Figure 31:
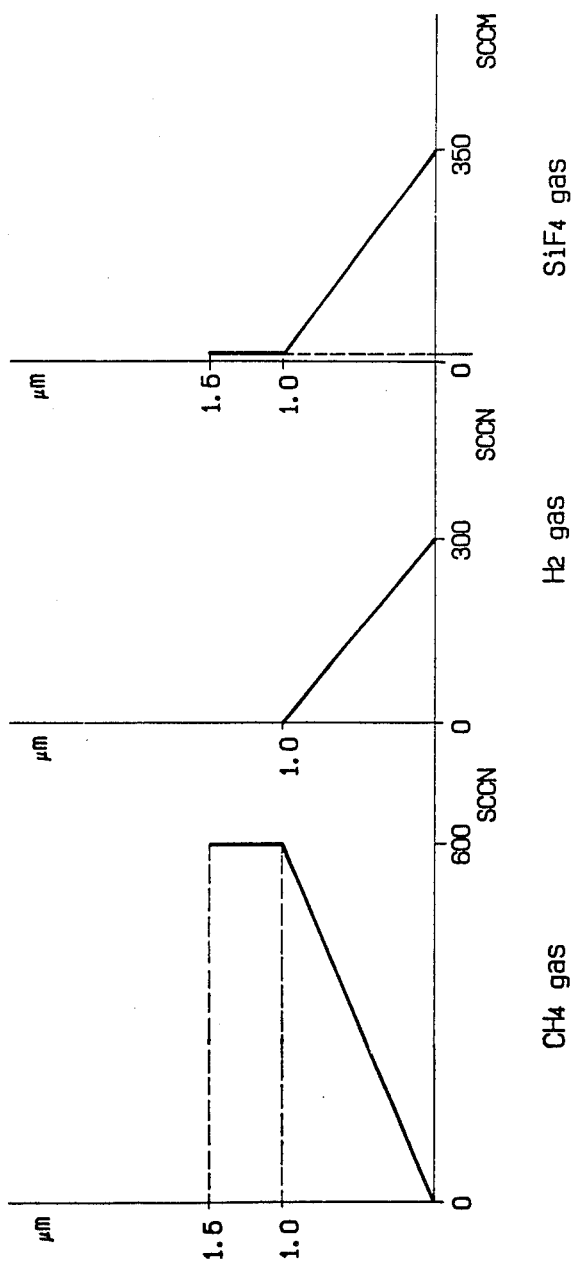
Figure 32:
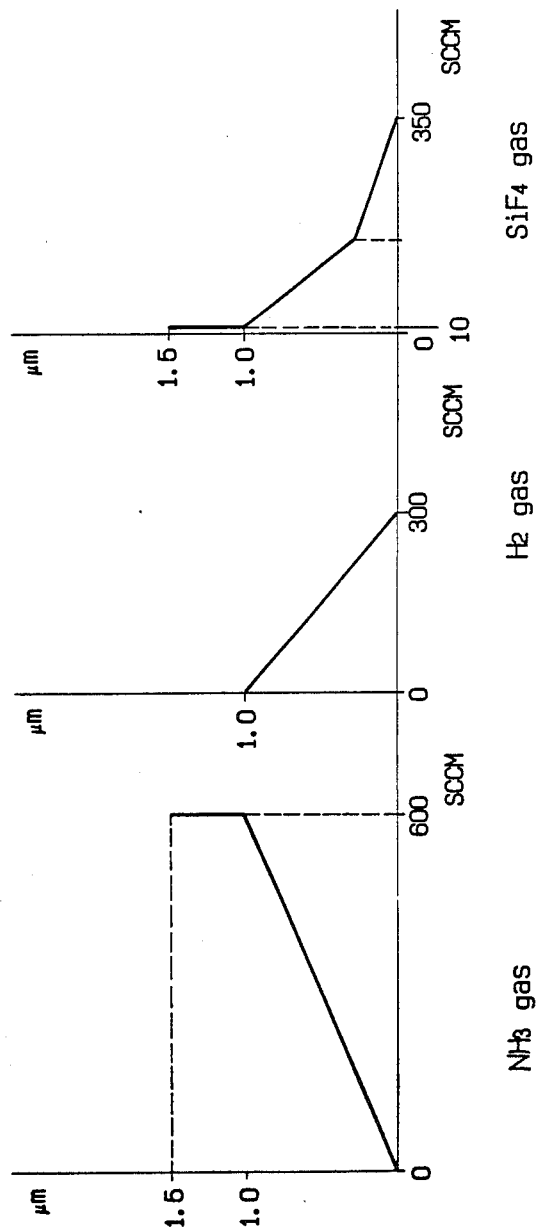
Figure 34:
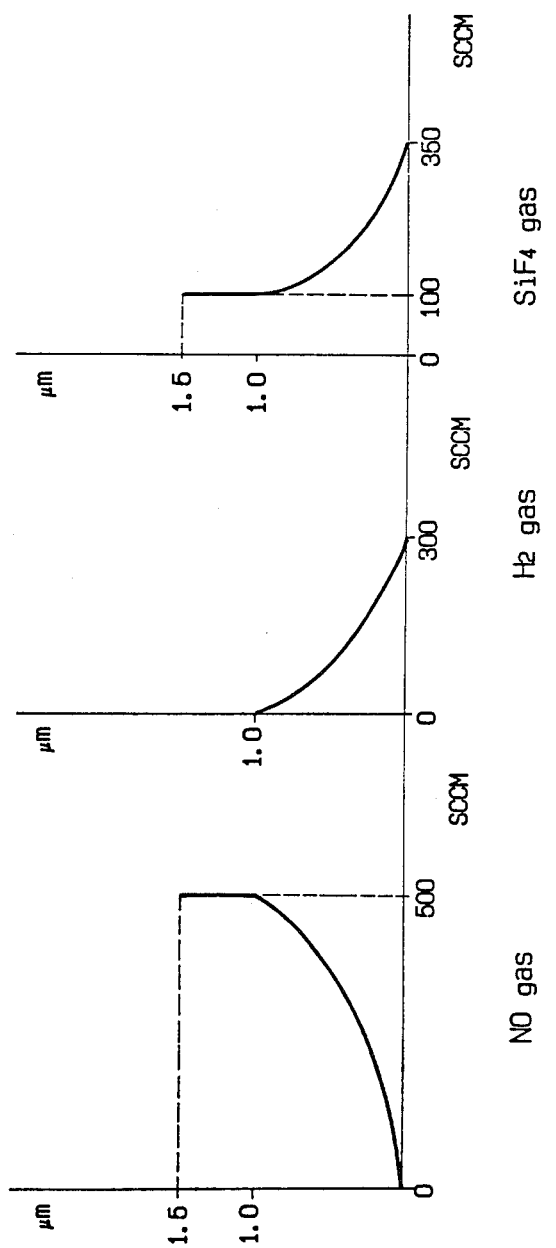
Figure 35:
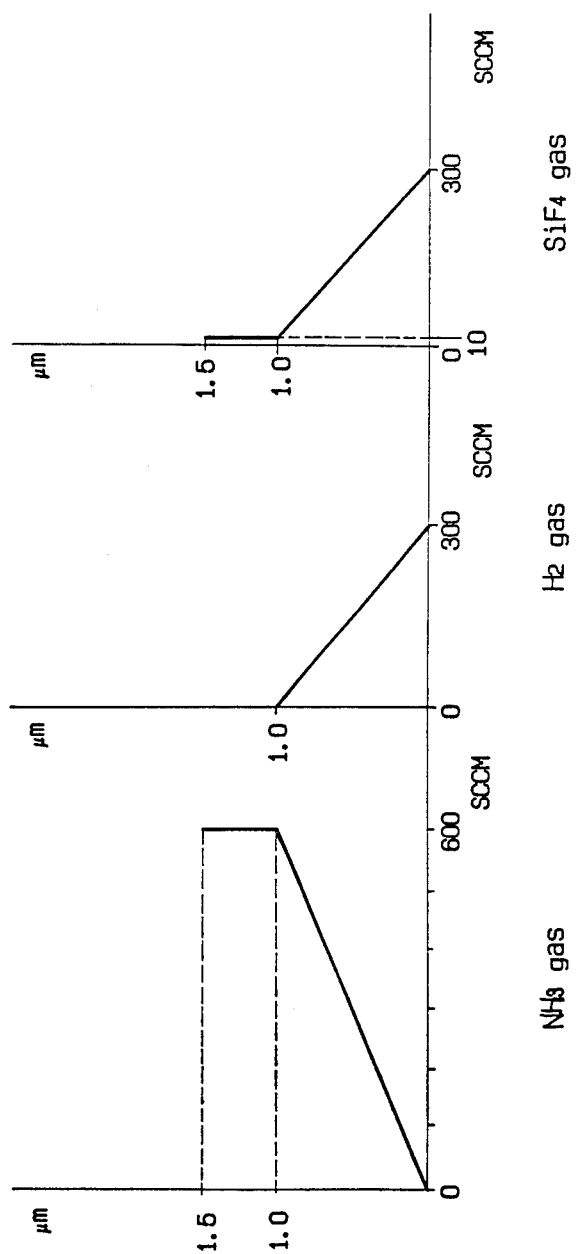

| Example No. | Chart showing the flow rate change of gas used in forming photosensitive layer | Chart showing the flow rate change of gas used in forming surface layer |
|---|---|---|
| 26 | — | FIG. 31 |
| 27 | — | FIG. 32 |
| 28 | FIG. 33 | FIG. 34 |
| 29 | FIG. 22 | FIG. 35 |

TABLE A-continued

Figure 36:
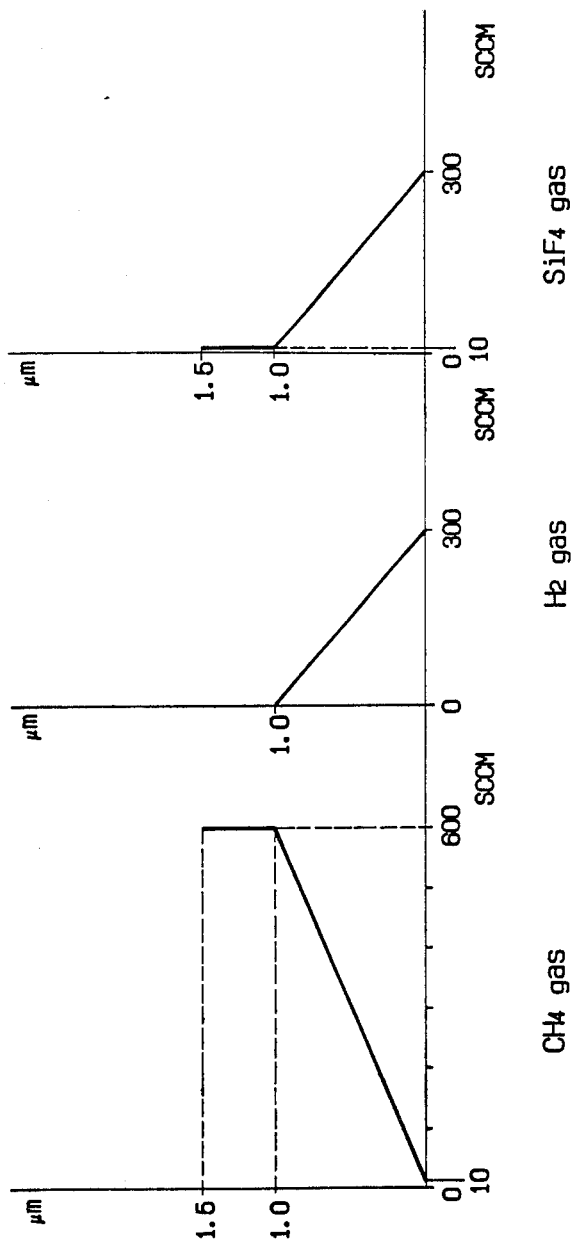
Figure 37:
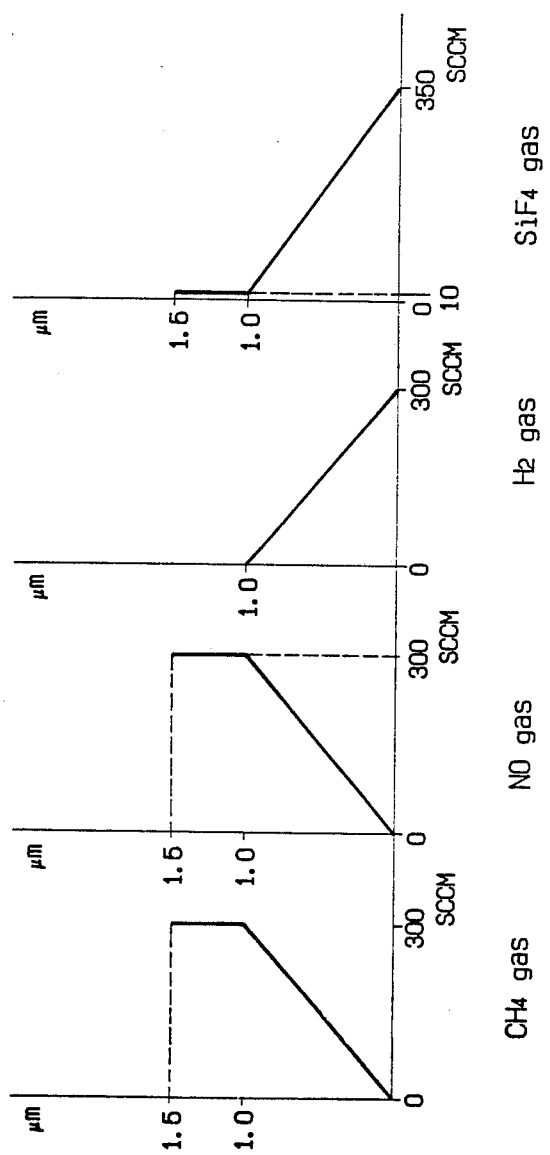
Figure 39:
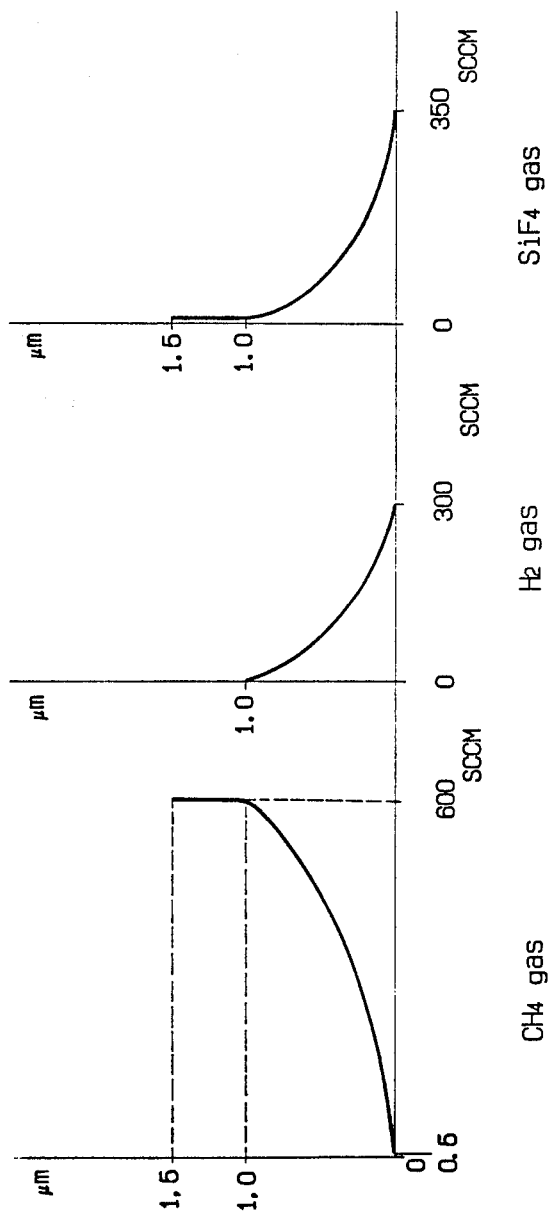
Figure 40:
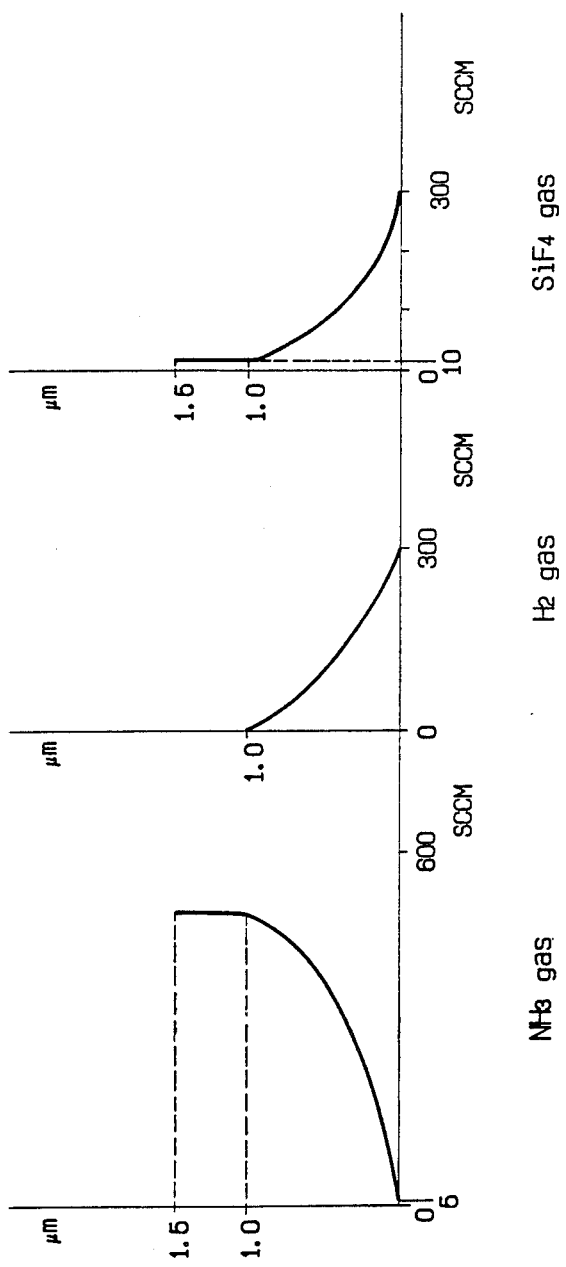
Figure 41:
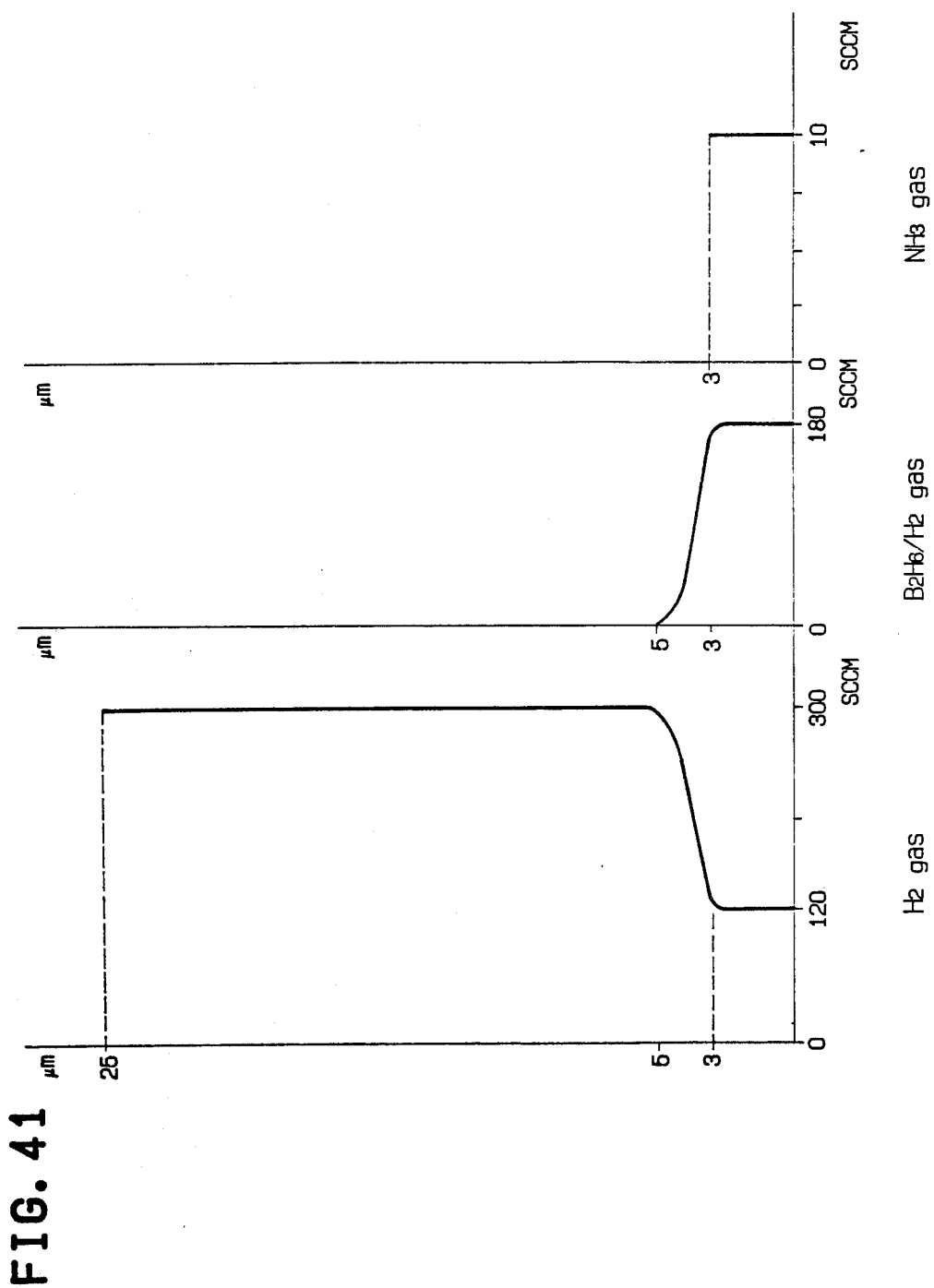
Figure 42:
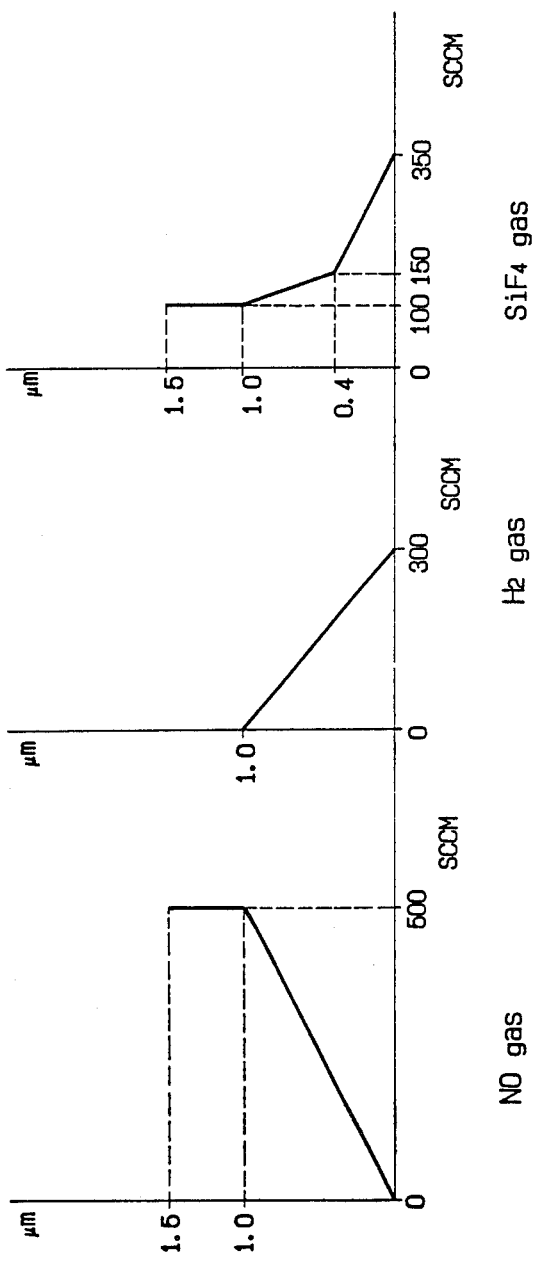
Figure 43:
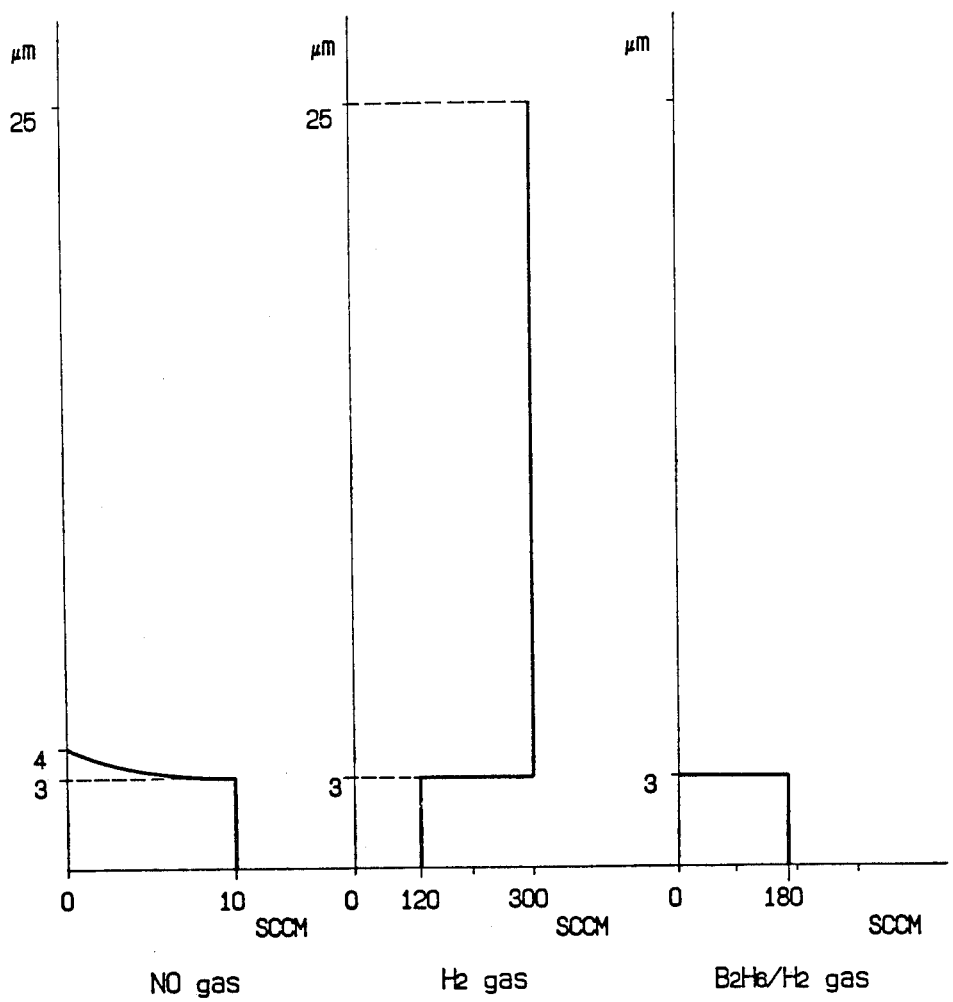

| Example No. | Chart showing the flow rate change of gas used in forming photosensitive layer | Chart showing the flow rate change of gas used in forming surface layer |
|---|---|---|
| 30 | — | FIG. 36 |
| 31 | — | FIG. 37 |
| 32 | FIG. 38 | FIG. 39 |
| 33 | — | FIG. 40 |
| 34 | FIG. 41 | FIG. 42 |
| 35 | FIG. 43 | FIG. 37 |

EXAMPLES 36-46

Photosensitive layers were formed on A1 supports (cylinder Nos. 103-106) used in Example 1 in accordance with layer forming conditions shown in each of Tables 36 through 46.

Subsequently, surface layers were formed by means of sputtering process using surface layer forming materials (1-20) shown in the upper column of Table B to the layer thickness shown in the lower column of Table B in Examples 36 and 37, while the surface layers were formed by means of sputtering process using layer constituent materials shown in the upper column of Table C to the layer thickness shown in the lower column of Table C in Examples 38-46.

In the Examples 36, 37, 42, 43, 45 and 46, the gases used when forming the photosensitive layers were automatically adjusted in accordance with the flow rate variation curves shown in each of FIGS. 33, 22, 38, 44, 45 and 41 under the control of a microcomputer. Further, boron atoms contained in the photosensitive layers were introduced in each of the examples under the same conditions as those in Example 1.

When images were formed on these light receiving members in the same manner as in Example 1, same satisfactory results as in Example 1 were obtained.

TABLE 36

| | | (Variation chart: FIG. 33) | | | |
|---|---|---|---|---|---|
| Layer constitution | Layer preparing step | Gas used | Flow rate (SCCM) | Discharging power (W/cm$^2$) | Layer thickness ($\mu$) |
| Photosensitive layer | First step | SiF$_4$ H$_2$ B$_2$H$_6$/H$_2$ | SiF$_4$ = 350 H$_2$ = 0→300 B$_2$H$_6$ = 300→0 | 300 | 5 |
| | Second step | SiF$_4$ H$_2$ | SiF$_4$ = 350 H$_2$ = 300 | | 20 |

Al substrate temperature: 250° C.
Discharging frequency: 13.56 MHz

TABLE 37

| | | (Variation chart: FIG. 22) | | | |
|---|---|---|---|---|---|
| Layer constitution | Layer preparing step | Gas used | Flow rate (SCCM) | Discharging power (W/cm$^2$) | Layer thickness ($\mu$) |
| Photosensitive layer | First step | SiF$_4$ H$_2$ B$_2$H$_6$H$_2$ | SiF$_4$ = 300 H$_2$ = 120 B$_2$H$_6$ = 180 | 300 | 3 |
| | Second step | | SiF$_4$ = 300 H$_2$ = 120→300 B$_2$H$_6$ = 180→0 | | 1 |
| | Third step | SiF$_4$ H$_2$ | SiF$_4$ = 300 H$_2$ = 300 | | 21 |

Al substrate temperature: 250° C.
Discharging frequency: 13.56 MHz

TABLE 38

| Layer constitution | Layer preparing step | Gas used | Flow rate (SCCM) | Discharging power (W/cm$^2$) | Layer thickness ($\mu$) |
|---|---|---|---|---|---|
| Photosensitive layer | First step | SiH$_4$ H$_2$ | SiH$_4$ = 350 H$_2$ = 300 | 300 | 25 |

Al substrate temperature: 250° C.
Discharging frequency: 13.56 MHz

TABLE 39

| Layer constitution | Layer preparing step | Gas used | Flow rate (SCCM) | Discharging power (W/cm$^2$) | Layer thickness ($\mu$) |
|---|---|---|---|---|---|
| Photosensitive layer | First step | SiF$_4$ H$_2$ B$_2$H$_6$/H$_2$ | SiF$_4$ = 350 H$_2$ = 120 B$_2$H$_6$/H$_2$ = 180 | 300 | 3 |
| | Second step | SiF$_4$ H$_2$ | SiF$_4$ = 350 H$_2$ = 300 | | 23 |

Al substrate temperature: 250° C.
Discharging frequency: 13.56 MHz

TABLE 40

| Layer constitution | Layer preparing step | Gas used | Flow rate (SCCM) | Discharging power (W/cm$^2$) | Layer thickness ($\mu$) |
|---|---|---|---|---|---|
| Photosensitive layer | First step | SiF$_4$<br>H$_2$<br>CH$_4$ | SiF$_4$ = 300<br>H$_2$ = 300<br>CH$_4$ = 5 | 300 | 25 |

Al substrate temperature: 250° C.
Discharging frequency: 13.56 MHz

TABLE 41

| Layer constitution | Layer preparing step | Gas used | Flow rate (SCCM) | Discharging power (W/cm$^2$) | Layer thickness ($\mu$) |
|---|---|---|---|---|---|
| Photosensitive layer | first step | SiF$_4$<br>H$_2$<br>CH$_4$ | SiF$_4$ = 350<br>H$_2$ = 300<br>CH$_4$ = 10 | 300 | 3 |
| | Second step | SiF$_4$<br>H$_2$ | SiF$_4$ = 350<br>H$_2$ = 300 | | 23 |

Al substrate temperature: 250° C.
Discharging frequency: 13.56 MHz

TABLE 42

(Variation chart: FIG. 38)

| Layer constitution | Layer preparing step | Gas used | Flow rate (SCCM) | Discharging power (W/cm$^2$) | Layer thickness ($\mu$) |
|---|---|---|---|---|---|
| Photosensitive layer | First step | SiF$_4$<br>H$_2$<br>CH$_4$ | SiF$_4$ = 350<br>H$_2$ = 300<br>CH$_4$ = 10 | 300 | 2 |
| | Second step | | SiF$_4$ = 350<br>H$_2$ = 300<br>CH$_4$ = 10 → 0.5 | | 2 |
| | Third step | | SiF$_4$ = 350<br>H$_2$ = 300<br>CH$_4$ = 0.5 | | 21 |

Al substrate temperature: 250° C.
Discharging frequency: 13.56 MHz

TABLE 43

Figure 44:
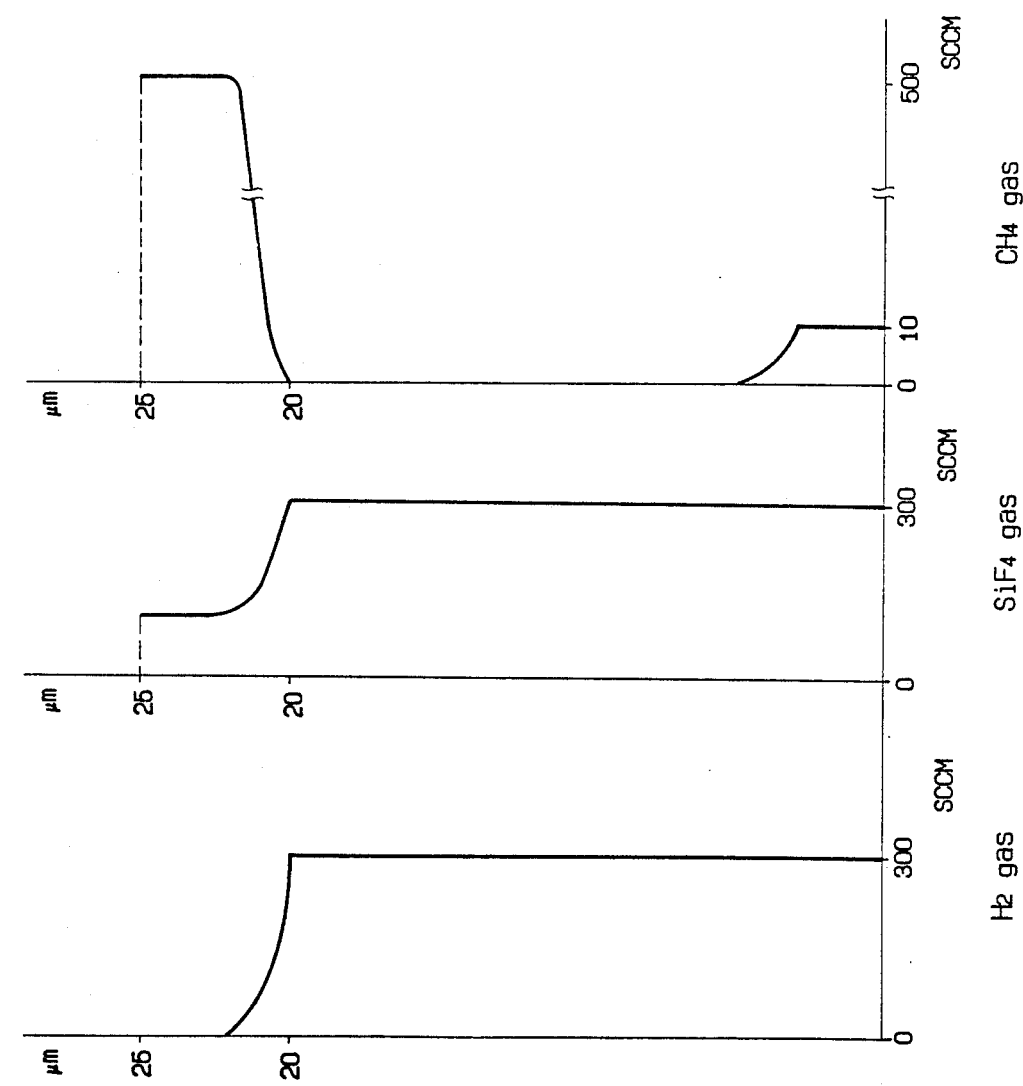
Figure 46:
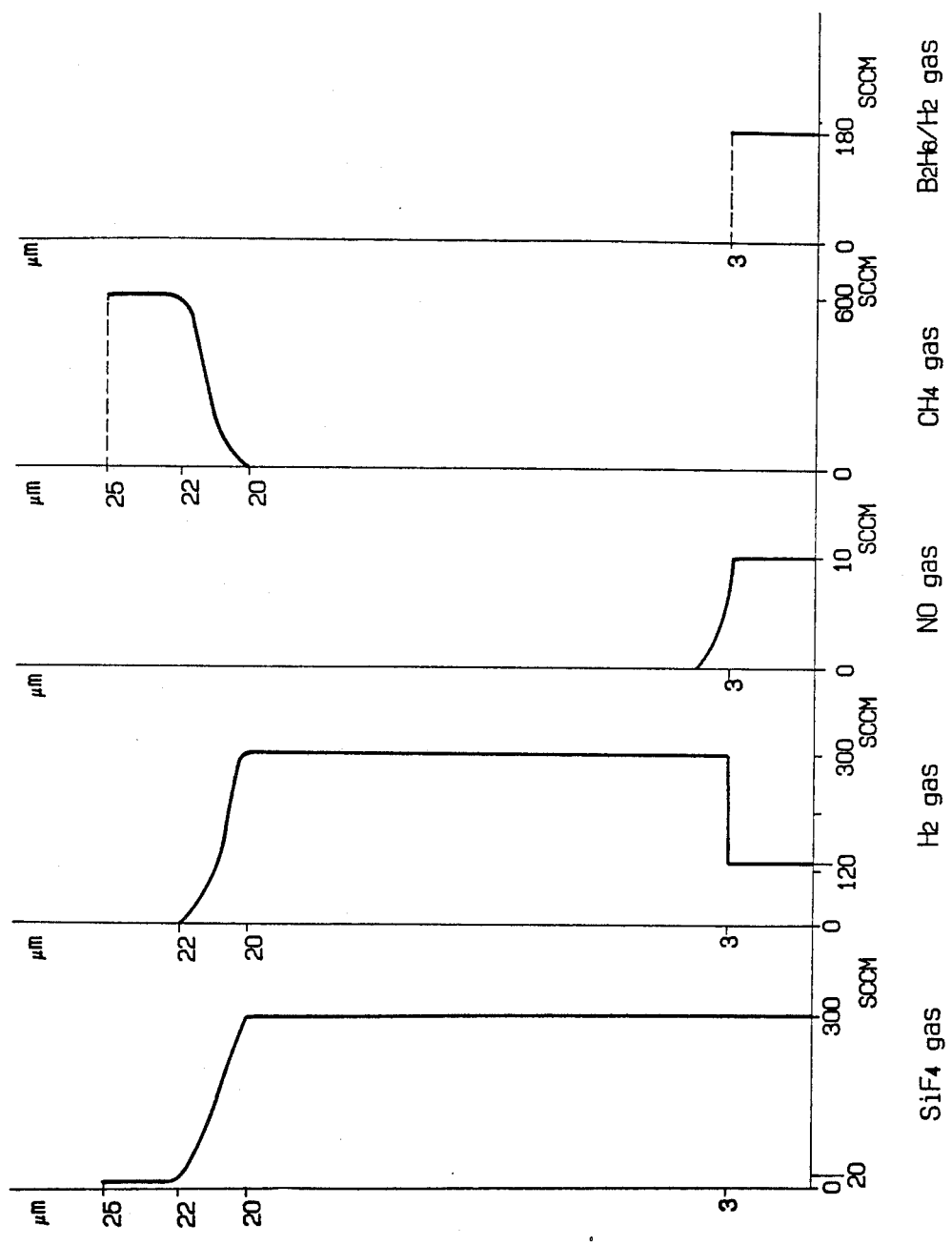

(Variation chart: FIG. 44)

| Layer constitution | Layer preparing step | Gas used | Flow rate (SCCM) | Discharging power (W/cm$^2$) | Layer thickness ($\mu$) |
|---|---|---|---|---|---|
| Photosensitive layer | First step | SiF$_4$<br>H$_2$<br>CH$_4$ | SiF$_4$ = 300<br>H$_2$ = 300<br>CH$_4$ = 10 | 300 | 3 |
| | Second step | | SiF$_4$ = 300<br>H$_2$ = 300<br>CH$_4$ = 10 → 0 | | 2 |
| | Third step | SiF$_4$<br>H$_2$ | SiF$_4$ = 300<br>H$_2$ = 300 | | 15 |
| | Fourth step | SiF$_4$<br>H$_2$<br>CH$_4$ | SiF$_4$ = 300 → 100<br>H$_2$ = 300 → 0<br>CH$_4$ = 0 → 500 | 300 → 200 | 2 |
| | Fifth step | SiF$_4$<br>CH$_4$ | SiF$_4$ = 100<br>CH$_4$ = 500 | | 3 |

Al substrate temperature: 250° C.
Discharging frequency: 13.56 MHz

TABLE 44

| Layer constitution | Layer preparing step | Gas used | Flow rate (SCCM) | Discharging power (W/cm$^2$) | Layer thickness ($\mu$) |
|---|---|---|---|---|---|
| Photosensitive layer | First step | SiF$_4$ = 300<br>H$_2$ = 120<br>NH$_3$ = 5<br>B$_2$H$_6$/H$_2$ | SiF$_4$ = 300<br>H$_2$ = 120<br>NH$_3$ = 5<br>B$_2$H$_6$/H$_2$ = 180 | 300 | 3 |
| | Second step | SiF$_4$<br>H$_2$ | SiF$_4$ = 300<br>H$_2$ = 300 | | 22 |

TABLE 44-continued

| Layer constitution | Layer preparing step | Gas used | Flow rate (SCCM) | Discharging power (W/cm²) | Layer thickness (μ) |
|---|---|---|---|---|---|
| | | NH₃ | NH₃ = 5 | | |

Al substrate temperature: 250° C.
Discharging frequency: 13.56 MHz

TABLE 45

(Variation chart: FIG. 45)

| Layer constitution | Layer preparing step | Gas used | Flow rate (SCCM) | Discharging power (W/cm²) | Layer thickness (μ) |
|---|---|---|---|---|---|
| Photosensitive layer | First step | SiF₄<br>H₂<br>NO<br>B₂H₆/H₂ | SiF₄ = 300<br>H₂ = 120<br>NO = 10<br>B₂H₄ = 180 | 300 | 3 |
| | Second step | SiF₄<br>H₂<br>NO | SiF₄ = 300<br>H₂ = 300<br>NO = 10 → 0 | | 1 |
| | Third step | SiF₄<br>H₂ | SiF₄ = 300<br>H₂ = 300 | | 15 |
| | Fourth step | SiF₄<br>H₂<br>CH₄ | SiF₄ = 300 → 20<br>H₂ = 300 → 0<br>CH₄ = 0 → 600 | 300 → 200 | 2 |
| | Fifth step | SiF₄<br>CH₄ | SiF₄ = 20<br>CH₄ = 600 | | 3 |

Al substrate temperature: 250° C.
Discharging frequency: 13.56 MHz

TABLE 46

(Variation chart: FIG. 41)

| Layer constitution | Layer preparing step | Gas used | Flow rate (SCCM) | Layer thickness (μ) |
|---|---|---|---|---|
| Photosensitive layer | First step | SiF₄<br>H₂<br>NH₃<br>B₂H₆/H₂ | SiF₄ = 350<br>H₂ = 120<br>NH₃ = 10<br>B₂H₆/H₂ = 180 | 3 |
| | Second step | SiF₄<br>H₂ | SiF₄ = 350<br>H₂ = 120→300 | 2 |
| | Third step | B₂H₆/H₂<br>SiF₄<br>H₂ | B₂H₆/H₂ = 180→0<br>SiF₄ = 350<br>H₂ = 300 | 20 |

Al substrate temperature: 250° C.
Discharging frequency: 13.56 MHz

TABLE B

| Condition No. | 1 | 2 | 3 | 4 | 5 | 6 | 7 | 8 | 9 | 0 |
|---|---|---|---|---|---|---|---|---|---|---|
| Constituent condition for surface layer (mixing ratio) | ZrO₂ | | TiO₂ | | ZrO₂/TiO₂ = 6/1 | | TiO₂/ZrO₂ = 3/1 | | CeO₂ | |
| Refractive index | 2.00 | | 2.26 | | 2.09 | | 2.20 | | 2.23 | |
| Layer thickness (μm) | 0.0975 | 0.293 | 0.0863 | 0.259 | 0.0933 | 0.280 | 0.0886 | 0.266 | 0.0874 | 0.262 |

| Condition No. | 11 | 12 | 13 | 14 | 15 | 16 | 17 | 18 | 19 | 20 |
|---|---|---|---|---|---|---|---|---|---|---|
| Constituent condition for surface layer (mixing ratio) | ZnS | | Al₂O₃ | | CeF₃ | | Al₂O₃/ZrO₂ = 1/1 | | MgF₂ | |
| Refractive index | 2.24 | | 1.63 | | 1.60 | | 1.68 | | 1.38 | |
| Layer thickness (μm) | 0.0871 | 0.261 | 0.120 | 0.359 | 0.123 | 0.366 | 0.116 | 0.348 | 0.141 | 0.424 |

TABLE C

| Example No. | 38, 39 | 40 | 41 | 42 | 43 | 44 | 45 | 46 |
|---|---|---|---|---|---|---|---|---|
| Constituent condition for surface layer (mixing ratio) | ZrO₂ | TiO₂ | ZrO₂/TiO₂ = 6/1 | CeO₂ | ZnS | Al₂O₃ | CeF₃ | MgF |
| Refractive index | 2.00 | 2.26 | 2.09 | 2.23 | 2.24 | 1.63 | 1.60 | 1.38 |
| Layer | 0.293 | 0.256 | 0.280 | 0.262 | 0.261 | 0.359 | 0.366 | 0.424 |

TABLE C-continued

| Example No. | 38, 39 | 40 | 41 | 42 | 43 | 44 | 45 | 46 |
|---|---|---|---|---|---|---|---|---|
| thickness (μm) | | | | | | | | |

EXAMPLES 47–66

Light receiving layers were formed on Al supports (sample Nos. 103–106) used in Example 1 under the layer preparing conditions shown in Tables D and E.

When forming images on the light receiving members thus obtained in the same manner as in Example 1, occurrence of interference fringe was not observed in any of the thus obtained images and the image quality was extremely good.

TABLE D

| Example No. | Charge injection inhibition layer | Photo-sensitive layer | Surface layer Reflection preventive layer (inside layer) from the side of the support | | | Abrasion-resistant layer (outermost layer) |
|---|---|---|---|---|---|---|
| | | | First layer | Second layer | Third layer | |
| 47 | — | 19 | 2 | — | — | 3 |
| 48 | — | 19 | 8 | — | — | 5 |
| 49 | — | 20 | 12 | — | — | 5 |
| 50 | — | 20 | 12 | — | — | 16 |
| 51 | — | 20 | 12 | 13 | — | 3 |

TABLE D-continued

| Example No. | Charge injection inhibition layer | Photo-sensitive layer | Surface layer Reflection preventive layer (inside layer) from the side of the support | | | Abrasion-resistant layer (outermost layer) |
|---|---|---|---|---|---|---|
| | | | First layer | Second layer | Third layer | |
| 52 | — | 20 | 12 | 13 | 4 | 1 |
| 53 | — | 17 | 4 | — | — | 1 |
| 54 | — | 18 | 4 | — | — | 1 |
| 55 | 23 | 20 | 6 | — | — | 7 |
| 56 | 24 | 20 | 4 | — | — | 9 |
| 57 | 25 | 20 | 4 | — | — | 10 |
| 58 | — | 20 | 4 | — | — | 11 |
| 59 | 23 | 20 | 13 | — | — | 2 |
| 60 | 23 | 20 | 14 | — | — | 2 |
| 61 | 23 | 20 | 15 | — | — | 2 |
| 62 | 23 | 20 | 14 | 15 | — | 2 |
| 63 | 23 | 20 | 14 | 15 | 4 | 2 |
| 64 | — | 21 | 4 | — | — | 1 |
| 65 | 26 | 21 | 4 | — | — | 1 |
| 66 | 27 | 22 | 4 | — | — | 1 |

Numerals in the table represent the layer No. shown in Table B.

TABLE E

| Name of layer | Layer No. | Preparing Method GD: Glow discharge SP: Sputtering | Layer constituent material | Preparing Condition Gas used and flow rate, or target and sputter gas used (SCCM) | | Layer thickness (μm) |
|---|---|---|---|---|---|---|
| Surface layer | 1 | GD | a-SiCH | $SiH_4$ gas | 10 | 2 |
| | 2 | | | $CH_4$ gas | 600 | 0.14 |
| | 3 | GD | a-SiCH | $SiH_4$ gas | 100 | 3 |
| | 4 | | | $CH_4$ gas | 300 | 0.076 |
| | 5 | GD | a-SiCHF | $SiH_4$ gas | 10 | 1 |
| | 6 | | | $SiF_4$ gas | 10 | 0.12 |
| | | | | $CH_4$ gas | 700 | |
| | 7 | GD | a-SiCHF | $SiH_4$ gas | 70 | 1.5 |
| | 8 | | | $SiF_4$ gas | 70 | 0.11 |
| | | | | $CH_4$ gas | 300 | |
| | 9 | GD | a-SiNOH | $SiH_4$ gas | 150 | 2.5 |
| | | | | $N_2O$ gas | 300 | |
| | 10 | GD | a-SiNH | $SiH_4$ gas | 100 | 2 |
| | | | | $NH_3$ gas | 300 | |
| | 11 | GD | a-SiNHF | $SiF_4$ gas | 70 | 2 |
| | | | | $SiH_4$ gas | 70 | |
| | | | | $NH_3$ gas | 250 | |
| | 12 | SP | $Al_2O_3$ | $Al_2O_3$ | | 0.36 |
| | | | | Ar gas | | |
| | 13 | SP | $SiO_2$ | $SiO_2$ | | 0.39 |
| | | | | Ar gas | | |
| | 14 | SP | $Al_2O_3/ZrO_2$ = 1/1 | $Al_2O_3/ZrO_2$ = 1/1 | | 0.35 |
| | | | | Ar gas | | |
| | 15 | SP | $TiO_2$ | $TiO_2$ | | 0.26 |
| | | | | Ar gas | | |
| | 16 | SP | $SiO_2$ | $SiO_2$ gas | | 1 |
| | | | | Ar gas | | |
| Photosensitive layer | 17 | GD | a-SiH | $SiH_4$ gas | 350 | 25 |
| | | | | $H_2$ gas | 360 | |
| | 18 | GD | a-SiHF | $SiH_4$ gas | 200 | 20 |
| | | | | $SiF_4$ gas | 150 | |
| | | | | $H_2$ gas | 350 | |
| | 19 | GD | a-SiHB | $SiH_4$ gas | 350 | 18 |
| | | | | $H_2$ gas | 360 | |
| | | | | $B_2H_6$ | $3.5 \times 10^{-4}$ | |
| | 20 | GD | a-SiHFB | $SiF_4$ gas | 300 | 15 |
| | | | | $H_2$ gas | 250 | |
| | | | | $BF_3$ gas | $3.5 \times 10^{-4}$ | |
| | 21 | GD | a-SiNHB | $SiH_4$ gas | 300 | 15 |
| | | | | $H_2$ gas | 250 | |
| | | | | $NH_4$ gas | $2.5 \times 10^{-1}$ | |

TABLE E-continued

| Name of layer | Layer No. | Preparing Method GD: Glow discharge SP: Sputtering | Layer constituent material | Preparing Condition Gas used and flow rate, or target and sputter gas used (SCCM) | | Layer thickness ($\mu$m) |
|---|---|---|---|---|---|---|
| | 22 | GD | a-SiNOHB | $B_2H_6$ gas<br>$SiH_4$ gas<br>$H_2$ gas<br>NO gas | $3.5 \times 10^{-4}$<br>300<br>250<br>$2.5 \times 10^{-1}$ | 15 |
| Charge injection inhibition layer | 23 | GD | a-SiHB | $B_2H_6$ gas<br>$SiH_4$ gas<br>$H_2$ gas | $3.5 \times 10^{-4}$<br>350<br>360 | 5 |
| | 24 | GD | a-SiHFB | $B_2H_6$ gas<br>$SiH_4$ gas<br>$SiF_4$ gas<br>$H_2$ gas | $4.0 \times 10^{-2}$<br>300<br>100<br>150 | 3 |
| | 25 | GD | a-SiHFB | $B_2H_6$<br>$SiH_4$ gas<br>$SiF_4$ gas<br>$BF_3$ gas | $6.0 \times 10^{-2}$<br>250<br>150<br>$6.0 \times 10^{-2}$ | 3.5 |
| | 26 | GD | a-SiNHB | $SiH_4$ gas<br>$H_2$ gas<br>$NH_4$ gas<br>$B_2H_6$ | 350<br>360<br>10<br>$4.0 \times 10^{-2}$ | 5 |
| | 27 | GD | a-SiNOHB | $SiH_4$ gas<br>$H_2$ gas<br>NO gas<br>$B_2H_6$ gas | 350<br>360<br>10<br>$4.0 \times 10^{-2}$ | 5 |

What is claimed is:

1. A light receiving member comprising:
(a) a support having an uneven-shaped surface of a plurality of spherical dimples; each of said spherical dimples having an identical radius of curvature R and an identical width D, wherein the ratio D/R of said width D to said radius of curvature R being from 0.03 to 0.07; and
(b) a light receiving layer having a free surface on the support; said light receiving layer being a multi-layered structure composed of an amorphous material containing silicon atoms as the main constituent, at least one kind selected from the group consisting of oxygen atoms, carbon atoms and nitrogen atoms, and at least one kind selected from the group consisting of hydrogen atoms and halogen atoms; and containing at least a layer region functioning as a photosensitive layer.

2. The light receiving member of claim 1, wherein said spherical dimples are formed by the impact of a plurality of rigid true spheres, each sphere substantially of an identical diameter, falling from substantially the same height.

3. The light receiving member of claim 1, wherein the width D of the spherical dimple is 500 $\mu$m or less.

4. The light receiving member of claim 1, wherein the support is a metal member.

5. The light receiving member of claim 1, wherein the amount of the oxygen atoms contained in the light receiving layer is in the range of 0.001 to 50 atomic %.

6. The light receiving member of claim 1, wherein the amount of the carbon atoms contained in the light receiving layer is in the range of 0.001 to 50 atomic %.

7. The light receiving member of claim 1, wherein the amount of the nitrogen atoms contained in the light receiving layer is in the range of 0.001 to 50 atomic %.

8. The light receiving member of claim 1, wherein the amount of the hydrogen atoms contained in the light receiving layer is in the range of 1 to 40 atomic %.

9. The light receiving member of claim 1, wherein the amount of the halogen atoms contained in the light receiving layer is in the range of 1 to 40 atomic %.

10. The light receiving member of claim 1, wherein the light receiving layer contains the hydrogen atoms and the halogen atoms in a total amount of 1 to 40 atomic %.

11. The light receiving member of claim 1, wherein the light receiving layer contains a substance for controlling conductivity.

12. The light receiving member of claim 1, wherein the light receiving layer further contains at the support side a layer region functioning as a charge injection inhibition layer containing $3.0 \times 10^1$ to $5 \times 10^4$ atomic ppm of an element selected from the group consisting of Group III and Group V elements of the Periodic Table.

13. The light receiving member of claim 12, wherein the ratio of the thickness t to the sum (t+$t_0$) is 4.0 or less, wherein t is the thickness of the layer region functioning as a charge injection inhibition layer and $t_0$ is the thickness of the layer region functioning as a photosensitive layer.

14. The light receiving member of claim 13, wherein the thickness t is from 0.003 to 10 $\mu$m.

15. The light receiving member of claim 1, wherein the light receiving layer further contains a barrier layer at the support side composed of an electrically insulating material selected from the group consisting of $Al_2O_3$, $SiO_2$, $Si_3N_4$ and polycarbonate.

16. The light receiving member of claim 12, wherein the light receiving layer further contains a barrier layer composed of an electrically insulating material selected from the group consisting of $Al_2O_3$, $SiO_2$, $Si_3N_4$ and polycarbonate which is spaced between the support and the charge injection inhibition layer.

17. A light receiving member comprising (a) a support having an uneven-shaped surface of a plurality of spherical dimples, each of said spherical dimples having an identical radius of curvature R and an identical width D, wherein the ratio D/R of said width D to said radius of curvature R being from 0.03 to 0.07 and (b) a light receiving layer having a photosensitive layer and a surface layer having a free surface on said support; said photosensitive layer being composed of an amorphous material containing silicon atoms as the main constituent and, at least one kind selected from the group consisting of hydrogen atoms and halogen atoms; and said surface layer comprising a layer selected from the group consisting of (i) a layer composed of an amorphous material containing silicon atoms and at least one kind selected from the group consisting of oxygen atoms, carbon atoms and nitrogen atoms; (ii) a layer composed of an inorganic material containing one or more members selected from the group consisting of $MgF_2$, $Al_2O_3$, $ZrO_2$, $TiO_2$, ZnS, $CeO_2$ $CeF_3$, $Ta_2O_5$, $AlF_3$ and NaF; and (iii) a multi-layered structure comprising an abrasion-resistant layer at the outermost side and a reflection preventive layer inside thereof.

18. The light receiving member of claim 17, wherein said spherical dimples are formed by the impact of a plurality of rigid true spheres, each sphere substantially of an identical diameter and falling from a substantially the same height.

19. The light receiving member of claim 17, wherein the width D of the spherical dimple is 500 μm or less.

20. The light receiving member of claim 17, wherein the support is a metal member.

21. The light receiving member of claim 17, wherein the photosensitive layer contains a substance for controlling conductivity.

22. The light receiving member of claim 17, wherein said surface layer (i) is composed of an amorphous material containing silicon atoms and 0.001 to 90 atomic % of oxygen atoms.

23. The light receiving member of claim 17, wherein said surface layer (i) has a band gap equivalent to the band gap of the photosensitive layer at the interface between the surface layer and the photosensitive layer.

24. The light receiving member of claim 17, wherein the thickness d of the surface layer (ii) satisfies the equation: $d = \lambda/4n \times m$; wherein m is a positive odd number, n is a refractive index of the material constituting the surface layer, and λ is a wavelength of irradiated light.

25. The light receiving member of claim 24, wherein the refractive index n of the material constituting the surface layer and the refractive index $n_a$ of the amorphous material constituting the photosensitive layer interfacing with the surface layer satisfy the equation: $n = \sqrt{n_a}$.

26. The light receiving member of claim 17, wherein the abrasion-resistant layer of the surface layer (iii) is a layer composed of a material selected from the group consisting of (a) an amorphous material containing silicon atoms, at least one kind selected from the group consisting of oxygen atoms, carbon atoms and nitrogen atoms and at least one kind selected from the group consisting of hydrogen atoms and halogen atoms and (b) an inorganic material containing one or more members selected from the group consisting of $MgF_2$, $Al_2O_3$, $ZrO_2$, $TiO_2$, ZnS, $CeO_2$ $CeF_3$, $Ta_2O_5$, $AlF_3$ and NaF.

27. The light receiving member of claim 17, wherein the reflection preventive layer of the surface layer (iii) is a layer composed of a material selected from the group consisting of (a) an amorphous material containing silicon atoms, at least one kind selected from the group consisting of oxygen atoms, carbon atoms and nitrogen atoms and at least one kind selected from the group consisting of hydrogen atoms and halogen atoms and (b) an inorganic material containing one or more members selected from the group consisting of $MgF_2$, $Al_2O_3$, $ZrO_2$, $TiO_2$, ZnS, $CeO_2$ $CeF_3$, $Ta_2O_5$, $AlF_3$ and NaF.

28. The light receiving member of claim 17, wherein the light receiving layer further comprises a charge injection inhibition layer containing a substance for controlling conductivity.

29. The light receiving member of claim 17, wherein the light receiving layer further comprises a barrier layer.

30. A light receiving member comprising:
(a) a support having an uneven-shaped surface of a plurality of spherical dimples having an identical radius of curvature R and an identical width D and wherein the ratio D/R of said width D to said radius of curvature R being from 0.03 to 0.07; and
(b) a light receiving layer having a photosensitive layer and a surface layer having a free surface on the support, said photosensitive layer being composed of an amorphous material containing silicon atoms as the main constituent, at least one kind selected from oxygen atoms, carbon atoms, and nitrogen atoms and at least one kind selected from hydrogen atoms and halogen atoms and said surface layer comprising a layer selected from the group consisting of (i) a layer composed of an amorphous material containing silicon atoms and at least one kind selected from the group consisting of oxygen atoms, carbon atoms and nitrogen atoms; (ii) a layer composed of an inorganic material containing one or more members selected from the group consising of $MgF_2$, $Al_2O_3$, $ZrO_2$, $TiO_2$, ZnS, $CeO_2$ $CeF_3$, $Ta_2O_5$, $AlF_3$ and NaF; and (iii) a multi-layered structure comprising an abrasion-resistant layer at the outermost side and a reflection preventive layer inside thereof.

31. The light receiving member of claim 30, wherein said spherical dimples are formed by the impact of a plurality of rigid true spheres, each sphere substantially of an identical diameter falling from substantially the same height.

32. The light receiving member of claim 30, wherein the width D of the spherical dimple is 500 μm or less.

33. The light receiving member of claim 30, wherein the support is a metal member.

34. The light receiving member of claim 30, wherein the photosensitive layer contains a substance for controlling conductivity.

35. The light receiving member as defined in claim 30, wherein said surface layer (i) is composed of an amorphous material containing silicon atoms and 0.001 to 90 atomic % of oxygen atoms.

36. The light receiving member of claim 30, wherein said surface layer (i) has a band gap equivalent to the band gap of the photosensitive layer at the interface between the surface layer and the photosensitive layer.

37. The light receiving member of claim 30, wherein the thickness d of the surface layer (ii) satisfies the equation: $d = \lambda/4n \times m$, wherein m is a positive odd number, n is a refractive index of the material constituting the surface layer, and λ is a wavelength of irradiated light.

38. The light receiving member of claim 37, wherein the refractive index n of the material constituting the surface layer and the refractive index $n_a$ of the amorphous material constituting the photosensitive layer interfacing with the constituting the photosensitive layer interfacing with the surface layer satisfy the equation: $n = \sqrt{n_a}$.

39. The light receiving member of claim 30, wherein the abrasion-resistant layer of the surface layer (iii) is a layer composed of a material selected from the group consisting of (a) an amorphous material containing silicon atoms at least one kind selected from the group consisting of oxygen atoms, carbon atoms and nitrogen atoms and at least one kind selected from the group consisting of hydrogen atoms and halogen atoms and (b) an inorganic material containing one or more members selected from the group consisting of $MgF_2$, $Al_2O_3$, $ZrO_2$, $TiO_2$, $ZnS$, $CeO_2$ $CeF_3$, $Ta_2O_5$, $AlF_3$ and $NaF$.

40. The light receiving member of claim 30, wherein the reflection preventive layer of the surface layer (iii) is a layer composed of a material selected from the group consisting of (a) an amorphous material containing silicon atoms, at least one kind selected from the group consisting of oxygen atoms, carbon atoms and nitrogen atoms and at least one kind selected from the group consisting of hydrogen atoms and halogen atoms, and (b) an inorganic material containing one or more members selected from the group consisting of $MgF_2$, $Al_2O_3$, $ZrO_2$, $TiO_2$, $ZnS$, $CeO_2$ $CeF_3$, $Ta_2O_5$, $AlF_3$ and $NaF$.

41. The light receiving member of claim 30, wherein the light receiving layer further comprises a charge injection inhibition layer containing a substance for controlling conductivity.

42. The light receiving member of claim 30, wherein the light receiving layer further comprises a barrier layer.

43. An electrophotographic process comprising:
 (1) applying an electric field to the light receiving member of claim 1; and
 (2) applying an electromagnetic wave to said light receiving member thereby forming an electrostatic image.

44. An electrophotographic process comprising:
 (1) applying an electric field to the light receiving member of claim 18; and
 (2) applying an electromagnetic wave to said light receiving member thereby forming an electrostatic image.

45. An electrophotographic process comprising:
 (1) applying an electric field to the light receiving member of claim 30; and
 (2) applying an electromagnetic wave to said light receiving member thereby forming an electrostatic image.

* * * * *

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

Title page:

IN [75] INVENTORS

"Mitsuru Honda; Atsushi Koike, both of Chiba; Kyosuke Ogawa, Miye; Keiichi Murai, Chiba, all of Japan" should read --Mitsuru Honda, Kashiwa; Atsushi Koike, Chiba; Kyosuke Ogawa, Nabari; Keiichi Murai, Kashiwa, all of Japan--.

IN [57] ABSTRACT

Line 7, "radio D/R" should read --ratio D/R--.
Line 10, "formed" should read --is formed--.

SHEET 4

FIG. 6(B), "603" should read --613--.

SHEET 17

FIG. 31, "SCCN" (all occurrences) should read --SCCM--.

COLUMN 1

Line 38, "kind" should read --kinds--.

COLUMN 2

Line 11, "both of" should read --both--.
Line 12, "correctively" should read --collectively--.
Line 22, "beamsused." should read --beams used--.
Line 47, "satine-like" should read --satin-like--.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 3

Line 49, "break down" should read --breakdown--.

COLUMN 4

Line 12, "layer" (second occurrence) should read --layer adjacent thereto--.
    Line 31, "formed" should read --formed,--.
    Line 57, "Other" should read --Another--.
    Line 68, "quality. A" should read --quality. ¶ A--.

COLUMN 5

Line 8, "half tone" should read --halftone--.

COLUMN 6

Line 43, "aspect" should read --aspects--.

COLUMN 7

Line 9, "dimples" should read --dimple--.
    Line 16, "multilayered" should read --multi-layered--.

COLUMN 8

Line 17, "$L_2$" should read --$l_2$--.
    Line 18, "correspondig" should read --corresponding--.
    Line 54, "foregoings," should read --foregoing,--.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 9

Line 52, "impact" should read --impacted--.
    Line 56, "kind" should read --kinds--.
    Line 57, "kind" should read --kinds--.
    Line 59, "503" should read --502--.
    Line 60, "of falling" should read --by impacting-- and "kind" should read --kinds--.
    Line 68, "kinds of width" should read --of widths--.

COLUMN 10

Line 7, "falling" should read --impacting--.
    Line 29, "reduce" should read --reduces--.

COLUMN 11

Line 5, "um" should read --µm--.
    Line 31, "repeatingly," should read --repeatedly,--.
    Line 44, "falling" should read --dropping-- (both occurrences.
    Line 46, "falling" should read --dropping--.
    Line 48, "falling" should read --dropping--.
    Line 60, "falling" should read --dropping--.

COLUMN 14

Line 9, "(C, O, N)" should read --(O, C, N)--.
    Line 46, "densityy" should read --density--.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 15

Line 4, "periodical" should read --periodic--.
    Line 7, "periodical" should read --periodic--.
    Line 10, "(aluminum)" should read --(aluminum),--.

COLUMN 16

Line 28, "proeperly" should read --properly--.

COLUMN 17

Line 1, "to" should read --of--.
    Line 28, "in" should be deleted.
    Line 58, "mechanism" should read --mechanical--.

COLUMN 18

Line 3, "an" should be deleted.
    Line 7, "consitutuent" should read --constituent--.
    Line 13, "consitituents" should read --constituent--.
    Line 16, "constituents" should read --constituent--.
    Line 52, ""a-Si(O, C.N)(H, X)")," should read
          --a-Si(O, C, N)(H, X)"),--.
    LIne 56, "mos-" should read --mois- --.
    Line 57, "ture proofness," should read
          --ture-proofness--.
    Line 67, "as" should read --as to be--.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 19

Line 14, "surfce" should read --surface--.
Line 19, "controlling," should read --controlling--.
Line 30, "(O.C.N)" should read --(O, C, N)--.

COLUMN 21

Line 38, "$ZrO_2TiO_2=$" should read --$ZrO_2/TiO_2=$--.
Line 63, "multilayered" should read --multi-layered--.

COLUMN 22

Line 6, "multilayered" should read --multi-layered--.
Lines 9-10, "multilayered" should read --multi-layered--.
Line 25, "$\eta_3$" should read --$n_3$--.

COLUMN 23

Line 26, "unformly" should read --uniformly--.

COLUMN 24

Line 24, "then" should read --now--.
Line 62, "as those" should read --to those--.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 25

Line 46, "an" should be deleted.
    Line 48, "since" should be deleted.
    Line 63, "amorphour" should read --amorphous--.

COLUMN 26

Line 34, "105" should read --105'--.

COLUMN 27

Line 68, "c$_8$" should read --C$_8$--.

COLUMN 29

Line 11, "respeatingly." should read --respectively.--.

line 54, "interhanogen" should read --inter-halogen--;
    line 67, "SiHCl$_3$.SiH$_2$Br$_2$," should read
    --SiHCl$_3$, SiH$_2$Br$_2$,--."

Line 68, "material" should read --materials--.

COLUMN 30

Line 12, "amount of" should read --amount for--.
    Line 66, "to," should read --to--.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 31

Line 1, "halide" should read --halides--.
Line 3, "SbF$_5$SbCl$_3$," should read --SbF$_5$, SbCl$_3$,--.

COLUMN 32

Line 57, "as for" should read --for--.

COLUMN 35

Line 62, "gages" should read --gauges--.
Line 67, "1017" should read --1917--.

COLUMN 36

Line 20, "at a" should read --at--.
Line 25, "a Si-(H, X)" should read --a-Si(H, X)--.
Line 31, "a" should be deleted.
Line 36, "upon" should be deleted.
Line 60, "dimple" should read --dimples--.

COLUMN 40

TABLE 6, "NHJ$_3$" should read --NH$_3$--.
Line 62, "EXAMPLE 8-13" should read --EXAMPLES 8-13--.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 42

TABLE 9, "$SiF_4$ = eoo" should read --$SiF_4$ = 300--.

TABLE 11, "power (W)  (μm)    should   --power (W)  (μm)
           300        3       read      300         3
           1          "                             1 --.

COLUMN 45

TABLE 16, "Second step   $SiF_4$    $SiF_4$ = 350" should read
          --Second step              $SiF_4$ = 350--.
TABLE 16, "third step" should read --Third step--.
TABLE 19, "charg:" should read --chart:--.

COLUMN 47

TABLE 20, "Layer" should read --layer-- and
          "$B_2H_6H_2$ = 180" should read --$B_2H_6/H_2$ = 180--.

COLUMN 50

Lines 28-29, "In the examples each" should read
             --In each--.

COLUMN 51

TABLE 28, "$B_2H_6$ = 300 → 0" should read
          --$B_2H_6/H_2$ = 300 → 0--.

TABLE 29, "$B_2H_6$ = 180" should read --$B_2H_6/H_2$ = 180--.

TABLE 29, "$B_2H_6$ = 180 → 0" should read
          --$B_2H_6/H_2$ = 180 → 0--.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 56

TABLE 36, "$B_2H_6 = 300 \rightarrow 0$" should read --$B_2H_6/H_2 = 300 \rightarrow 0$--.

TABLE 37, "$B_2H_6H_2$" should read --$B_2H_6/H_2$--.

TABLE 37, "$B_2H_6=$" should read --$B_2H_6/H_2=$-- (both occurrences).

COLUMN 57

TABLE 41, "first" should read --First--.

TABLE 44, "Gas used    should     --Gas used
        $SiF_4 = 300$   read        $SiF_4$
        $H_2 = 120$                 $H_2$
        $NH_3 = 5$"                 $NH_3$ --

COLUMN 59

TABLE 45, "$B_2H_4 = 180$" should read --$B_2H_6/H_2 = 180$--.

COLUMN 60

TABLE B, "9   0" should read --9   10--.

COLUMN 62

TABLE E, "Layer      should     --Layer
        No.         read        No.--.
        No."

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 63

TABLE E-continued, "Layer   should   --Layer
                   No.      read     No.--.
                   No."

COLUMN 65

Line 14, "$CeO_2$ $CeF_3$," should read --$CeO_2$, $CeF_3$,--.
Line 21, "from a" should read --from--.
Line 59, "$CeO_2$ $CeF_3$," should read --$CeO_2$, $CeF_3$,--.

COLUMN 66

Line 3, "$CeO_2$ $CeF_3$," should read --$CeO_2$, $CeF_3$,--.
Line 33, "consising" should read --consisting--.
Line 34, "$CeO_2$ $CeF_3$," should read --$CeO_2$, $CeF_3$,--.
Line 68, "constituting the photosensitive" should be deleted.

UNITED STATES PATENT AND TRADEMARK OFFICE
CERTIFICATE OF CORRECTION

PATENT NO. : 4,798,776
DATED : January 17, 1989
INVENTOR(S) : MITSURU HONDA, ET AL.

It is certified that error appears in the above-identified patent and that said Letters Patent is hereby corrected as shown below:

COLUMN 67

Line 1, "layer interfacing with the" should be deleted.
    Line 7, "atoms at" should read --atoms, at--.
    Line 13, "$CeO_2$ $CeF_3$," should read --$CeO_2$, $CeF_3$,--.
    Line 25, "$CeO_2$ $CeF_3$," should read --$CeO_2$, $CeF_3$,--.

Signed and Sealed this

Tenth Day of November, 1992

Attest:

DOUGLAS B. COMER

Attesting Officer    Acting Commissioner of Patents and Trademarks